US010248856B2

(12) United States Patent
Moore et al.

(10) Patent No.: US 10,248,856 B2
(45) Date of Patent: Apr. 2, 2019

(54) SMART NECKLACE WITH STEREO VISION AND ONBOARD PROCESSING

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 231 days.

(21) Appl. No.: 14/480,590

(22) Filed: Sep. 8, 2014

(65) Prior Publication Data

US 2015/0199566 A1 Jul. 16, 2015

Related U.S. Application Data

(63) Continuation-in-part of application No. 14/154,714, filed on Jan. 14, 2014, now Pat. No. 9,578,307.

(51) Int. Cl.
*G06K 9/00* (2006.01)
*G01C 21/20* (2006.01)
(Continued)

(52) U.S. Cl.
CPC ....... *G06K 9/00442* (2013.01); *G01C 21/206* (2013.01); *G06K 9/00671* (2013.01); *H04N 13/239* (2018.05); *H04N 13/296* (2018.05)

(58) Field of Classification Search
CPC .................. G06K 9/00442; H04N 13/0239
See application file for complete search history.

(56) References Cited

U.S. PATENT DOCUMENTS 4,520,501 A 5/1985 DuBrucq
4,586,827 A 5/1986 Hirsch et al.
(Continued)

FOREIGN PATENT DOCUMENTS

CN 201260746 6/2009
CN 101527093 9/2009
(Continued)

OTHER PUBLICATIONS

Merino-Garcia, et al.; "A Head-Mounted Device for Recognizing Text in Natural Sciences"; *CBDAR' 11 Proceedings of the 4th International Conference on Camera-Based Document Analysis and Recognition*; 6 pages; Sep. 22, 2011.
(Continued)

*Primary Examiner* — Anner N Holder
*Assistant Examiner* — Hesham K Abouzahra
(74) *Attorney, Agent, or Firm* — Snell & Wilmer LLP

(57) ABSTRACT

A wearable neck device and a method of operating the wearable neck device are provided for outputting optical character recognition information to a user. The wearable neck device has at least one camera, and a memory storing optical character or image recognition processing data. A processor detects a document in the surrounding environment and adjusts the field of view of the at least one camera such that the detected document is within the adjusted field of view. The processor analyzes the image data within the adjusted field of view using the optical character or image recognition processing data. The processor determines output data based on the analyzed image data. A speaker of the wearable neck device provides audio information to the user based on the output data.

20 Claims, 28 Drawing Sheets

(51) Int. Cl.
*H04N 13/296* (2018.01)
*H04N 13/239* (2018.01)

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovszky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevielle |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A * | 5/2000 | Wellner .......... G06F 3/033 348/136 |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi et al. |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |

(56) References Cited

U.S. PATENT DOCUMENTS

| | | |
|---|---|---|
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Arthur Hunter |
| 2003/0133008 A1 | 7/2003 | Stephenson |
| 2003/0133085 A1* | 7/2003 | Tretiakoff ............ G03G 15/605 355/25 |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0020845 A1 | 9/2005 | Suzuki et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1* | 4/2009 | Athsani ............ G06F 17/289 704/3 |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1* | 7/2010 | Kumar ............... H04N 1/00002 348/229.1 |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King et al. |
| 2011/0234584 A1 | 9/2011 | Endo |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West et al. |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0021373 A1* | 1/2013 | Vaught ................ G02B 27/017 345/633 |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1* | 6/2013 | Roach ................. G06Q 20/322 358/505 |
| 2013/0157230 A1 | 6/2013 | Morgan |
| 2013/0184982 A1 | 7/2013 | DeLuca |

(56) References Cited

U.S. PATENT DOCUMENTS

| | | | |
|---|---|---|---|
| 2013/0201344 A1 | 8/2013 | Sweet, III | |
| 2013/0202274 A1* | 8/2013 | Chan | H04N 5/77 386/362 |
| 2013/0204605 A1 | 8/2013 | Illgner-Fehns | |
| 2013/0211718 A1 | 8/2013 | Yoo et al. | |
| 2013/0218456 A1 | 8/2013 | Zelek et al. | |
| 2013/0228615 A1 | 9/2013 | Gates et al. | |
| 2013/0229669 A1 | 9/2013 | Smits | |
| 2013/0243250 A1 | 9/2013 | France | |
| 2013/0245396 A1 | 9/2013 | Berman et al. | |
| 2013/0250078 A1 | 9/2013 | Levy | |
| 2013/0250233 A1 | 9/2013 | Blum et al. | |
| 2013/0253818 A1 | 9/2013 | Sanders et al. | |
| 2013/0265450 A1 | 10/2013 | Barnes, Jr. | |
| 2013/0271584 A1 | 10/2013 | Wexler et al. | |
| 2013/0290909 A1 | 10/2013 | Gray | |
| 2013/0307842 A1 | 11/2013 | Grinberg et al. | |
| 2013/0311179 A1 | 11/2013 | Wagner | |
| 2013/0328683 A1 | 12/2013 | Sitbon et al. | |
| 2013/0332452 A1 | 12/2013 | Jarvis | |
| 2014/0009561 A1 | 1/2014 | Sutherland | |
| 2014/0031081 A1 | 1/2014 | Vossoughi | |
| 2014/0031977 A1 | 1/2014 | Goldenberg et al. | |
| 2014/0032596 A1 | 1/2014 | Fish et al. | |
| 2014/0037149 A1 | 2/2014 | Zetune | |
| 2014/0055353 A1 | 2/2014 | Takahama | |
| 2014/0071234 A1 | 3/2014 | Millett | |
| 2014/0081631 A1 | 3/2014 | Zhu et al. | |
| 2014/0085446 A1 | 3/2014 | Hicks | |
| 2014/0098018 A1 | 4/2014 | Kim et al. | |
| 2014/0100773 A1 | 4/2014 | Cunningham et al. | |
| 2014/0125700 A1 | 5/2014 | Ramachandran | |
| 2014/0132388 A1 | 5/2014 | Alalawi | |
| 2014/0133290 A1 | 5/2014 | Yokoo | |
| 2014/0160250 A1 | 6/2014 | Pomerantz | |
| 2014/0184384 A1 | 7/2014 | Zhu et al. | |
| 2014/0184775 A1 | 7/2014 | Drake | |
| 2014/0204245 A1 | 7/2014 | Wexler | |
| 2014/0222023 A1 | 8/2014 | Kim et al. | |
| 2014/0233859 A1 | 8/2014 | Cho | |
| 2014/0236932 A1 | 8/2014 | Ikonomov | |
| 2014/0249847 A1 | 9/2014 | Soon-Shiong | |
| 2014/0251396 A1 | 9/2014 | Subhashrao et al. | |
| 2014/0253702 A1 | 9/2014 | Wexler | |
| 2014/0278070 A1 | 9/2014 | McGavran | |
| 2014/0281943 A1 | 9/2014 | Prilepov | |
| 2014/0287382 A1 | 9/2014 | Villar Cloquell | |
| 2014/0309806 A1 | 10/2014 | Ricci | |
| 2014/0313040 A1 | 10/2014 | Wright, Sr. | |
| 2014/0335893 A1 | 11/2014 | Ronen | |
| 2014/0343846 A1 | 11/2014 | Goldman et al. | |
| 2014/0345956 A1 | 11/2014 | Kojina | |
| 2014/0347265 A1 | 11/2014 | Aimone | |
| 2014/0368412 A1 | 12/2014 | Jacobsen | |
| 2014/0369541 A1 | 12/2014 | Miskin | |
| 2014/0379251 A1 | 12/2014 | Tolstedt | |
| 2014/0379336 A1 | 12/2014 | Bhatnager | |
| 2015/0002808 A1 | 1/2015 | Rizzo, III et al. | |
| 2015/0016035 A1 | 1/2015 | Tussy | |
| 2015/0058237 A1 | 2/2015 | Bailey | |
| 2015/0063661 A1 | 3/2015 | Lee | |
| 2015/0081884 A1 | 3/2015 | Maguire | |
| 2015/0099946 A1 | 4/2015 | Sahin | |
| 2015/0109107 A1 | 4/2015 | Gomez et al. | |
| 2015/0120186 A1 | 4/2015 | Heikes | |
| 2015/0125831 A1 | 5/2015 | Chandrashekhar Nair et al. | |
| 2015/0135310 A1 | 5/2015 | Lee | |
| 2015/0141085 A1 | 5/2015 | Nuovo et al. | |
| 2015/0142891 A1 | 5/2015 | Haque | |
| 2015/0154643 A1 | 6/2015 | Artman et al. | |
| 2015/0196101 A1 | 7/2015 | Dayal et al. | |
| 2015/0198454 A1 | 7/2015 | Moore et al. | |
| 2015/0198455 A1 | 7/2015 | Chen | |
| 2015/0199566 A1 | 7/2015 | Moore et al. | |
| 2015/0201181 A1 | 7/2015 | Moore et al. | |
| 2015/0211858 A1 | 7/2015 | Jerauld | |
| 2015/0219757 A1 | 8/2015 | Boelter et al. | |
| 2015/0223355 A1 | 8/2015 | Fleck | |
| 2015/0256977 A1 | 9/2015 | Huang | |
| 2015/0257555 A1 | 9/2015 | Wong | |
| 2015/0260474 A1 | 9/2015 | Rublowsky | |
| 2015/0262509 A1 | 9/2015 | Labbe | |
| 2015/0279172 A1 | 10/2015 | Hyde | |
| 2015/0324646 A1 | 11/2015 | Kimia | |
| 2015/0330787 A1 | 11/2015 | Cioffi et al. | |
| 2015/0336276 A1 | 11/2015 | Song | |
| 2015/0338917 A1 | 11/2015 | Steiner et al. | |
| 2015/0341591 A1 | 11/2015 | Kelder et al. | |
| 2015/0346496 A1 | 12/2015 | Haddick et al. | |
| 2015/0356345 A1 | 12/2015 | Velozo | |
| 2015/0356837 A1* | 12/2015 | Pajestka | A61H 3/061 340/4.14 |
| 2015/0364943 A1 | 12/2015 | Vick | |
| 2015/0367176 A1 | 12/2015 | Bejestan | |
| 2015/0375395 A1 | 12/2015 | Kwon | |
| 2016/0007158 A1 | 1/2016 | Venkatraman | |
| 2016/0028917 A1 | 1/2016 | Wexler | |
| 2016/0042228 A1 | 2/2016 | Opalka | |
| 2016/0078289 A1 | 3/2016 | Michel | |
| 2016/0098138 A1 | 4/2016 | Park | |
| 2016/0156850 A1 | 6/2016 | Werblin et al. | |
| 2016/0198319 A1 | 7/2016 | Huang | |
| 2016/0350514 A1 | 12/2016 | Rajendran | |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 201012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO1995004440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |

(56) References Cited

FOREIGN PATENT DOCUMENTS

| WO | WO2012163675 | 12/2012 |
|---|---|---|
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Yi, Chucai; "Assistive Text Reading from Complex Background for Blind Persons"; CBDAR' 11 Proceedings of the 4th International Conference on Camera-Based Document Analysis and Recognition; 6 pages; Sep. 22, 2011.

Yang, et al.; "Towards Automatic Sign Translation" 4 pages; 2001.

"Mobile OCR, Face and Object Recognition for the Blind"; www.seeingwithsound.com/ocr.htm; 7 pages; Apr. 18, 2014.

Optical Character Recognition Sensor User's Manual; 450 pages; 2012.

Voice Stick by Sungwoo Park; www.yankodesign.com/2008/08/21/voice-stick; 4 pages; Aug. 21, 2008.

Wu et al. "Fusing Multi-Modal Features for Gesture Recognition", Proceedings of the 15th ACM on International Conference on Multimodal Interaction, Dec. 9, 2013, ACM, pp. 453-459.

Pitsikalis et al. "Multimodal Gesture Recognition via Multiple Hypotheses Rescoring", Journal of Machine Learning Research, Feb. 2015, pp. 255-284.

Shen et al. "Walkie-Markie: Indoor Pathway Mapping Made Easy" 10th USENIX Symposium on Networked Systems Design and Implementation (NSDI'13); pp. 85-98, 2013.

Tu et al. "Crowdsourced Routing II D2.6" 34 pages; 2012.

De Choudhury et al. "Automatic Construction of Travel Itineraries Using Social Breadcrumbs" pp. 35-44; Jun. 2010.

Bharathi et al.; "Effective Navigation for Visually Impaired by Wearable Obstacle Avoidance System;" 2012 International Conference on Computing, Electronics and Electrical Technologies (ICCEET); pp. 956-958; 2012.

Pawar et al.; "Review Paper on Multitasking Stick for Guiding Safe Path for Visually Disable People;" IJPRET; vol. 3, No. 9; pp. 929-936; 2015.

Ram et al.; "The People Sensor: A Mobility Aid for the Visually Impaired;" 2012 16th International Symposium on Wearable Computers; pp. 166-167; 2012.

Singhal; "The Development of an Intelligent Aid for Blind and Old People;" Emerging Trends and Applications in Computer Science (ICETACS), 2013 1st International Conference; pp. 182-185; Sep. 13, 2013.

Aggarwal et al.; "All-in-One Companion for Visually Impaired;" International Journal of Computer Applications; vol. 79, No. 14; pp. 37-40; Oct. 2013.

"Light Detector" EveryWare Technologies; 2 pages; Jun. 18, 2016.

Arati et al. "Object Recognition in Mobile Phone Application for Visually Impaired Users;" IOSR Journal of Computer Engineering (IOSR-JCE); vol. 17, No. 1; pp. 30-33; Jan. 2015.

Yabu et al.; "Development of a Wearable Haptic Tactile Interface as an Aid for the Hearing and/or Visually Impaired;" NTUT Education of Disabilities; vol. 13; pp. 5-12; 2015.

Mau et al.; "BlindAid: An Electronic Travel Aid for the Blind;" The Robotics Institute Carnegie Mellon University; 27 pages; May 2008.

Shidujaman et al.; "Design and navigation Prospective for Wireless Power Transmission Robot;" IEEE; Jun. 2015.

Zhang, Shanjun; Yoshino, Kazuyoshi; A Braille Recognition System by the Mobile Phone with Embedded Camera; 2007; IEEE.

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

The Nex Band; http://www.mightycast.com/#faq; May 19, 2015; 4 pages.

Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.

Bujacz et al.; "Remote Guidance for the Blind—A Proposed Teleassistance System and Navigation Trials"; Conference on Human System Interactions; May 25-27, 2008; 6 pages.

Rodriguez et al; "CrowdSight: Rapidly Prototyping Intelligent Visual Processing Apps"; AAAI Human Computation Workshop (HCOMP); 2011; 6 pages.

Chaudary et al.; "Alternative Navigation Assistance Aids for Visually Impaired Blind Persons"; Proceedings of ICEAPVI; Feb. 12-14, 2015; 5 pages.

Garaj et al.; "A System for Remote Sighted Guidance of Visually Impaired Pedestrians"; The British Journal of Visual Impairment; vol. 21, No. 2, 2003; 9 pages.

Coughlan et al.; "Crosswatch: A System for Providing Guidance to Visually Impaired Travelers at Traffic Intersections"; Journal of Assistive Technologies 7.2; 2013; 17 pages.

Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.

Paladugu et al.; "GoingEasy® with Crowdsourcing in the Web 2.0 World for Visually Impaired Users: Design and User Study"; Arizona State University; 8 pages.

Kammoun et al.; "Towards a Geographic Information System Facilitating Navigation of Visually Impaired Users"; Springer Berlin Heidelberg; 2012; 8 pages.

Bigham et al.; "VizWiz: Nearly Real-Time Answers to Visual Questions" Proceedings of the 23nd annual ACM symposium on User interface software and technology; 2010; 2 pages.

Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.

Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.

Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.

Dowling et al.; "Intelligent Image Processing Constraints for Blind Mobility Facilitated Through Artificial Vision"; 8th Australian and NewZealand Intelligent Information Systems Conference (ANZIIS); Dec. 10-12, 2003; 7 pages.

Heyes, Tony; "The Sonic Pathfinder An Electronic Travel Aid for the Vision Impaired"; http://members.optuszoo.com.au/aheyew40/pa/pf_blerf.html; Dec. 11, 2014; 7 pages.

Lee et al.; "Adaptive Power Control of Obstacle Avoidance System Using via Motion Context for Visually Impaired Person." International Conference on Cloud Computing and Social Networking (ICCCSN), Apr. 26-27, 2012 4 pages.

Wilson, Jeff, et al. "Swan: System for Wearable Audio Navigation"; 11th IEEE International Symposium on Wearable Computers; Oct. 11-13, 2007; 8 pages.

Borenstein et al.; "The GuideCane—A Computerized Travel Aid for the Active Guidance of Blind Pedestrians"; IEEE International Conference on Robotics and Automation; Apr. 21-27, 1997; 6 pages.

Bhatlawande et al.; "Way-finding Electronic Bracelet for Visually Impaired People"; IEEE Point-of-Care Healthcare Technologies (PHT), Jan. 16-18, 2013; 4 pages.

(56) References Cited

OTHER PUBLICATIONS

Blenkhorn et al.; "*An Ultrasonic Mobility Device with Minimal Audio Feedback*"; Center on Disabilities Technology and Persons with Disabilities Conference; Nov. 22, 1997; 5 pages.

Mann et al.; "*Blind Navigation with a Wearable Range Camera and Vibrotactile Helmet*"; 19$^{th}$ ACM International Conference on Multimedia; Nov. 28, 2011; 4 pages.

Shoval et al.; "*The Navbelt—A Computerized Travel Aid for the Blind*"; RESNA Conference, Jun. 12-17, 1993; 6 pages.

Kumar et al.; "*An Electronic Travel Aid for Navigation of Visually Impaired Persons*"; Communications Systems and Networks (COMSNETS), 2011 Third International Conference; Jan. 2011; 5 pages.

Pawar et al.; "*Multitasking Stick for Indicating Safe Path to Visually Disable People*"; IOSR Journal of Electronics and Communication Engineering (IOSR-JECE), vol. 10, Issue 3, Ver. II; May-Jun. 2015; 5 pages.

Pagliarini et al.; "*Robotic Art for Wearable*"; Proceedings of EUROSIAM: European Conference for the Applied Mathematics and Informatics 2010; 10 pages.

Greenberg et al.; "*Finding Your Way: A Curriculum for Teaching and Using the Braillenote with Sendero GPS 2011*"; California School for the Blind; 2011; 190 pages.

Helal et al.; "*Drishti: An Integrated Navigation System for Visually Impaired and Disabled*"; Fifth International Symposium on Wearable Computers; Oct. 8-9, 2001; 8 pages.

Parkes, Don; "*Audio Tactile Systems for Designing and Learning Complex Environments as a Vision Impaired Person: Static and Dynamic Spatial Information Access*"; EdTech-94 Proceedings; 1994; 8 pages.

Zeng et al.; "*Audio-Haptic Browser for a Geographical Information System*"; ICCHP 2010, Part II, LNCS 6180; Jul. 14-16, 2010; 8 pages.

AlZuhair et al.; "*NFC Based Applications for Visually Impaired People—A Review*"; IEEE International Conference on Multimedia and Expo Workshops (ICMEW), Jul. 14, 2014; 7 pages.

Graf, Christian; "*Verbally Annotated Tactile Maps—Challenges and Approaches*"; Spatial Cognition VII, vol. 6222; Aug. 15-19, 2010; 16 pages.

Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.

Ramya, et al.; "*Voice Assisted Embedded Navigation System for the Visually Impaired*"; International Journal of Computer Applications; vol. 64, No. 13, Feb. 2013; 7 pages.

Caperna et al.; "*A Navigation and Object Location Device for the Blind*"; Tech. rep. University of Maryland College Park; May 2009; 129 pages.

Burbey et al.; "*Human Information Processing with the Personal Memex*"; ISE 5604 Fall 2005; Dec. 6, 2005; 88 pages.

Ghiani, et al.; "*Vibrotactile Feedback to Aid Blind Users of Mobile Guides*"; Journal of Visual Languages and Computing 20; 2009; 13 pages.

Guerrero et al.; "*An Indoor Navigation System for the Visually Impaired*"; Sensors vol. 12, Issue 6; Jun. 13, 2012; 23 pages.

Nordin et al.; "*Indoor Navigation and Localization for Visually Impaired People Using Weighted Topological Map*"; Journal of Computer Science vol. 5, Issue 11; 2009; 7 pages.

Hesch et al.; "*Design and Analysis of a Portable Indoor Localization Aid for the Visually Impaired*"; International Journal of Robotics Research; vol. 29; Issue 11; Sep. 2010; 15 pgs.

Joseph et al.; "*Visual Semantic Parameterization—To Enhance Blind User Perception for Indoor Navigation*"; Multimedia and Expo Workshops (ICMEW), 2013 IEEE International Conference; Jul. 15, 2013; 7 pages.

Katz et al; "*NAVIG: Augmented Reality Guidance System for the Visually Impaired*"; Virtual Reality (2012) vol. 16; 2012; 17 pages.

Rodriguez et al.; "*Assisting the Visually Impaired: Obstacle Detection and Warning System by Acoustic Feedback*"; Sensors 2012; vol. 12; 21 pages.

Treuillet; "*Outdoor/Indoor Vision-Based Localization for Blind Pedestrian Navigation Assistance*"; WSPC/Instruction File; May 23, 2010; 16 pages.

Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.

Wang, et al.; "*Camera-Based Signage Detection and Recognition for Blind Persons*"; 13$^{th}$ International Conference (ICCHP) Part 2 Proceedings; Jul. 11-13, 2012; 9 pages.

Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.

Lee et al.; "*A Walking Guidance System for the Visually Impaired*"; International Journal of Pattern Recognition and Artificial Intelligence; vol. 22; No. 6; 2008; 16 pages.

Ward et al.; "*Visual Experiences in the Blind Induced by an Auditory Sensory Substitution Device*"; Journal of Consciousness and Cognition; Oct. 2009; 30 pages.

Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.

Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.

Glover et al.; "*A Robotically-Augmented Walker for Older Adults*"; Carnegie Mellon University, School of Computer Science; Aug. 1, 2003; 13 pages.

OrCam; www.orcam.com; Jul. 22, 2014; 3 pages.

Eccles, Lisa; "*Smart Walker Detects Obstacles*"; Electronic Design; http://electronicdesign.com/electromechanical/smart-walker-detects-obstacles; Aug. 20, 2001; 2 pages.

Graft, Birgit; "*An Adaptive Guidance System for Robotic Walking Aids*"; Journal of Computing and Information Technology—CIT 17; 2009; 12 pages.

Frizera et al.; "*The Smart Walkers as Geriatric Assistive Device. The SIMBIOSIS Purpose*"; Gerontechnology, vol. 7, No. 2; Jan. 30, 2008; 6 pages.

Rodriquez-Losada et al.; "*Guido, The Robotic Smart Walker for the Frail Visually Impaired*"; IEEE International Conference on Robotics and Automation (ICRA); Apr. 18-22, 2005; 15 pages.

Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.

Kalra et al.; "*A Braille Writing Tutor to Combat illiteracy in Developing Communities*"; Carnegie Mellon University Research Showcase, Robotics Institute; 2007; 10 pages.

Blaze Engineering; "*Visually Impaired Resource Guide: Assistive Technology for Students who use Braille*"; Braille 'n Speak Manual; http://www.blaize.com; Nov. 17, 2014; 5 pages.

AppleVis; *An Introduction to Braille Screen Input on iOS 8*; http://www.applevis.com/guides/braille-ios/introduction-braille-screen-input-ios-8, Nov. 16, 2014; 7 pages.

Dias et al.; "*Enhancing an Automated Braille Writing Tutor*"; IEEE/RSJ International Conference on Intelligent Robots and Systems; Oct. 11-15, 2009; 7 pages.

D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.

Trinh et al.; "*Phoneme-based Predictive Text Entry Interface*"; Proceedings of the 16th International ACM SIGACCESS Conference on Computers & Accessibility; Oct. 2014; 2 pgs.

Merri et al.; "*The Instruments for a Blind Teacher of English: The challenge of the board*"; European Journal of Psychology of Education, vol. 20, No. 4 (Dec. 2005), 15 pages.

Kirinic et al.; "*Computers in Education of Children with Intellectual and Related Developmental Disorders*"; International Journal of Emerging Technologies in Learning, vol. 5, 2010, 5 pages.

(56) References Cited

OTHER PUBLICATIONS

Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.
EBAY; MATIN (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.
NEWEGG; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
NEWEGG; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.

\* cited by examiner

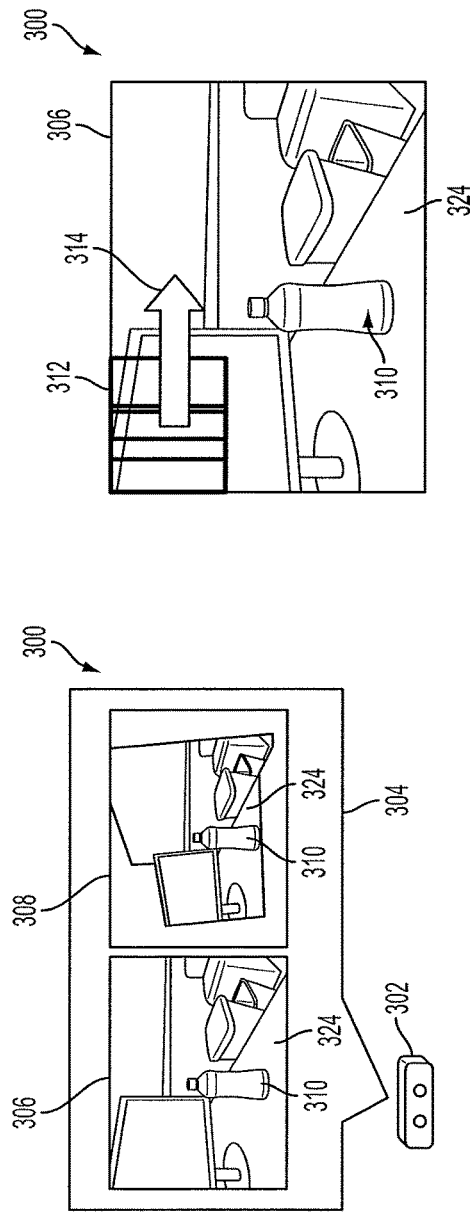
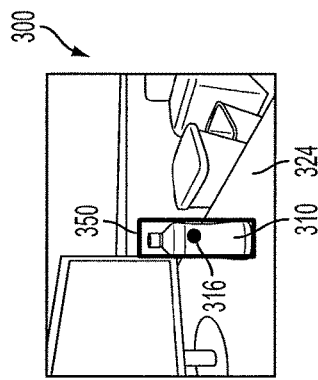
FIG. 3A
FIG. 3B
FIG. 3C

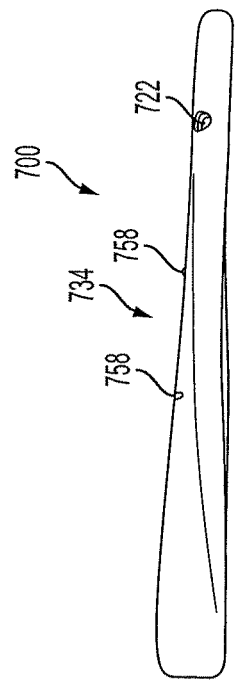
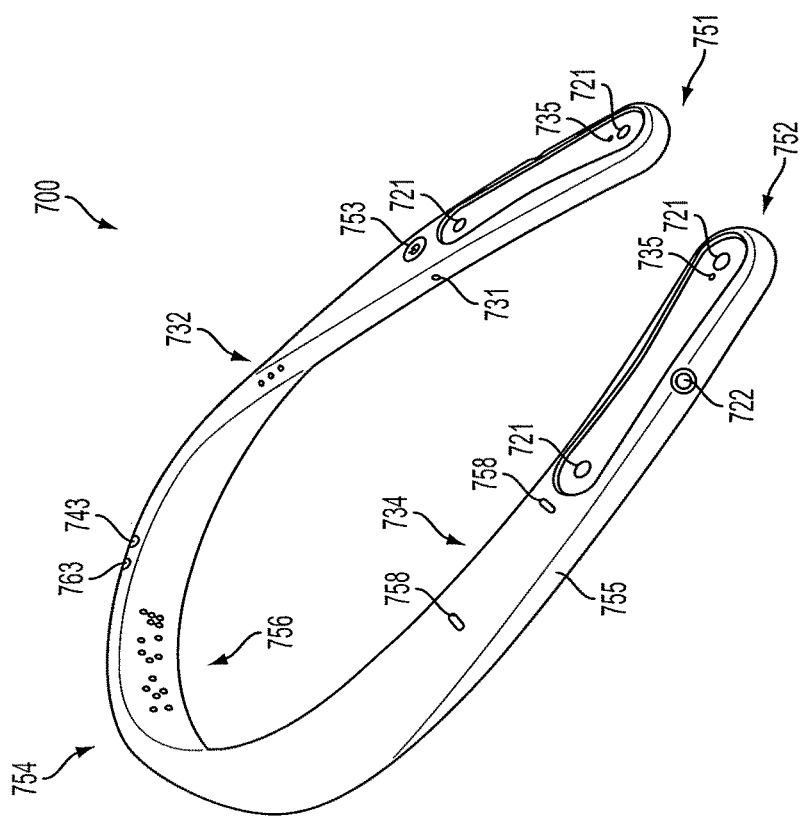

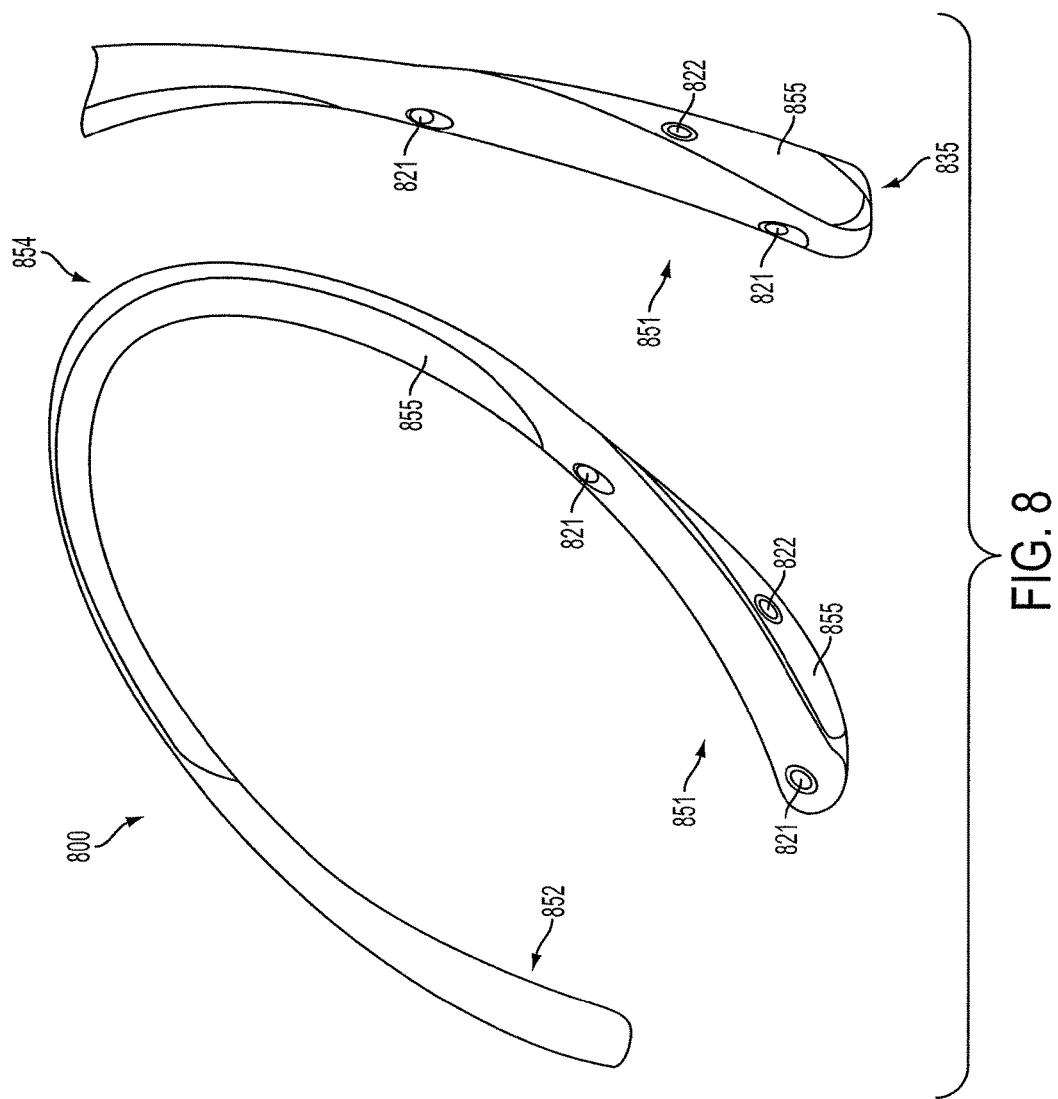

SMART NECKLACE WITH STEREO VISION AND ONBOARD PROCESSING

CROSS REFERENCE TO RELATED APPLICATIONS

This application is a continuation-in-part of U.S. application Ser. No. 14/154,714, filed on Jan. 14, 2014, the entire contents of which are hereby incorporated by reference herein.

BACKGROUND

Field

The present disclosure relates to a wearable device, which provides haptic and audio feedback based on stereo camera input.

Description of the Related Art

Static and passive recorders have been provided for recognizing characters on a document. Users have to manually identify the documents themselves and place portions of a document in front of a camera of the static and passive recorder. Certain users, such as persons with visual impairments, desire additional assistance in locating a document and additional dynamic feedback relating to identified documents. Static and passive recorders known in the art do not dynamically recognize documents and do not dynamically provide helpful information about the documents. Furthermore, static and passive records known in the art do not have enhanced user-interactive features.

Thus, there is a need for an unobtrusive device which dynamically assists a user in identifying documents and interactively provides helpful information about the document.

SUMMARY

A wearable neck device and a method of operating the wearable neck device are provided for outputting optical character or image recognition information to a user. The wearable neck device has one or more cameras, and a memory storing optical character recognition processing data. A processor detects a document in the surrounding environment. The processor adjusts the field of view of the one or more cameras to be focused downwards such that the detected document is within the adjusted field of view. The processor analyzes the image data within the adjusted field of view using the optical character recognition processing data. The processor determines output data based on the analyzed image data. A speaker of the wearable neck device provides audio information to the user based on the output data.

The one or more cameras may include a first camera positioned at a first end of the band, and a second camera positioned at the second end of the band. The first camera and the second camera form a pair of stereo cameras configured to operate in conjunction to capture the image data. Alternatively, the one or more cameras may include an omni-directional camera or a wide-angle camera. The processor may re-adjust the field of view of the one or more cameras when a portion of the document is outside the field of view of the one or more cameras.

The wearable neck device may have a mechanical rotating device connected with the one or more cameras. The processor controls the mechanical rotating device to rotate the one or more cameras in order to adjust the field of view of the one or more cameras to cover the document.

The wearable neck device may have a first vibratory motor coupled to the left portion and a second vibratory motor coupled to the right portion. The first vibratory motor and the second vibratory motor provide stereo vibration data based on the determined output data.

The wearable neck device may include an antenna for establishing a wireless connection with another portable electronic device or computer having a second processor. The processors operate in conjunction with one another to analyze the image data based on the optical character recognition processing data.

The wearable neck device may also include a microphone configured to detect a speech of the user. The processor detects an input from the user requesting scanning of the environment or requesting information about the document. The processor detects the document in response to the detected input from the user.

Also described is a method for providing optical character recognition information to a user of a wearable neck device. A memory is provided for storing optical character recognition processing data corresponding to an algorithm or a set of instructions for identifying characters of documents. A document is detected by analyzing image data detected by the one or more cameras. The field of view of the one or more cameras is adjusted to be focused downwards such that the detected document is within the adjusted field of view. Image data within the adjusted field of view of the one or more cameras is captured. The image data within the adjusted field of view is analyzed using the processor and the optical character recognition processing data. Output data is determined based on the analyzed image data. A speaker outputs audio information to the user based on the output data.

Another aspect of the invention relates to a neck worn device for a user with visual impairment. The device includes a tube having a left end, a right end and a center portion positioned between the left end and the right end. A left side camera is mounted proximal to the left end for recording images. A right side camera is mounted proximal to the right end for recording images. The left side camera and the right side camera form a pair of stereo cameras. A memory is positioned within the tube for storing an optical character recognition software program. A processor is positioned within the tube and coupled to the left side camera, the right side camera and the memory. The processor identifies characters on a document using the optical character recognition software program. The processor generates a feedback signal based on the identified characters. The neck worn device has a speaker that provides audio information based on the feedback signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 3A illustrates an object recognition logic applied to a visual data set according to an embodiment of the present invention;

FIG. 3B further illustrates the object recognition logic shown in FIG. 3A;

FIG. 3C further illustrates the object recognition logic shown in FIG. 3A;

FIG. 7A is a view of a smart necklace with a "paddle" design according to an embodiment of the present invention;

FIG. 7B is a side view of the smart necklace in FIG. 7A;

FIG. 8 is a view of a smart necklace with a "twist" design according to an embodiment of the present invention;

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
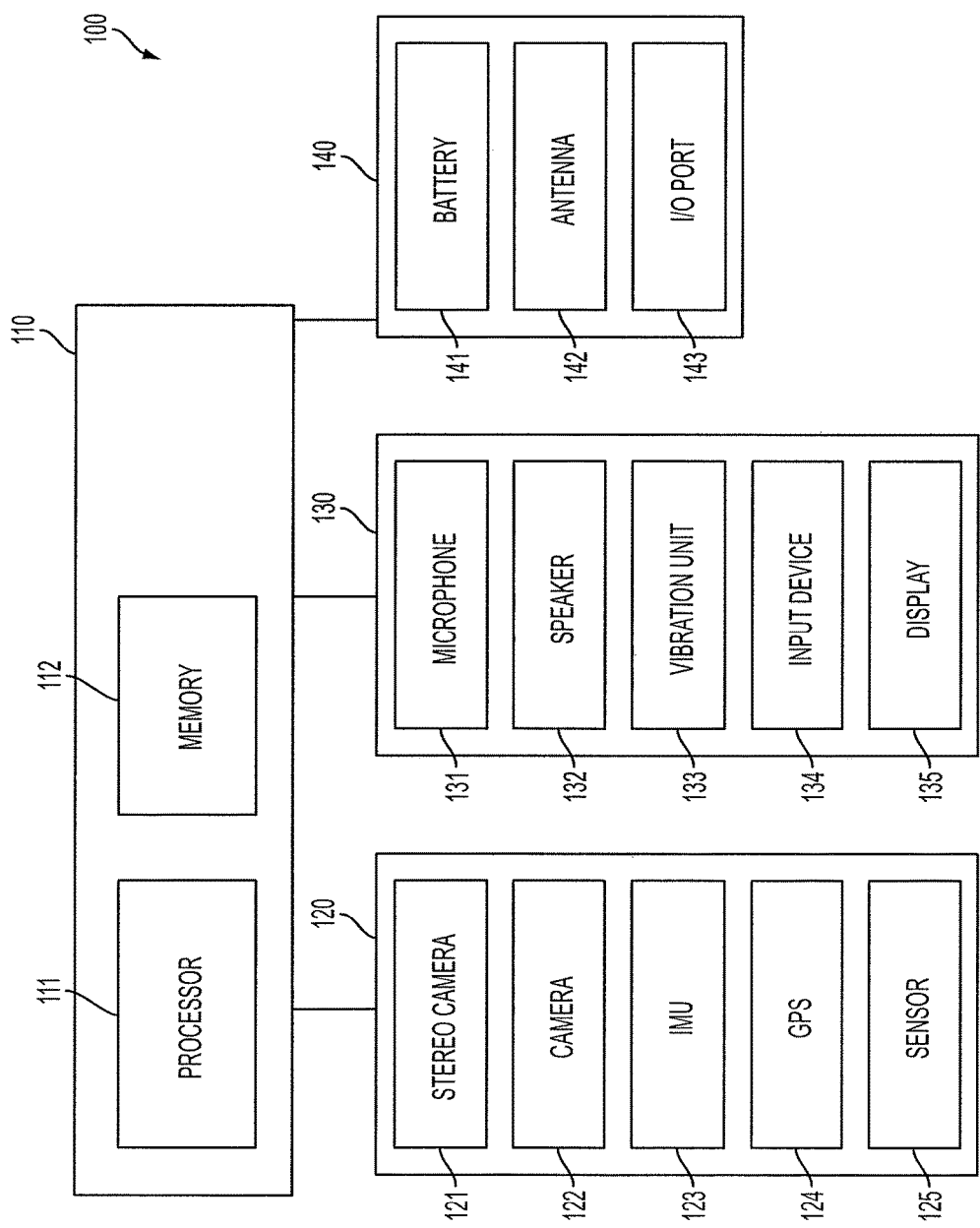
FIG. 1 is a block diagram of a smart necklace according to an embodiment of the present invention.

In one implementation, a smart necklace 100 includes an onboard processing array 110, which communicates with a sensor array 120, an interface array 130, and a component array 140. The onboard processing array 110, the sensor array 120, the interface array 130, and the component array 140 are exemplary groupings to visually organize the components of the smart necklace 100 in the block diagram of FIG. 1 and are not limiting or necessarily representative of any physical groupings. In addition, certain implementations may have more or less components shown in FIG. 1.

The onboard processing array 110 includes a processor 111 and a memory 112. The processor 111 may be a computer processor such as an ARM processor, DSP processor, distributed processor, or other form of central processing. The processor 111 may be positioned on the smart necklace 100, may be a remote processor or it may be a pairing of a local and a remote processor.

The memory 112 may be one or any combination of the following: a RAM or other volatile or nonvolatile memory, a non-transitory memory or a data storage device, such as a hard disk drive, a solid state disk drive, a hybrid disk drive, or other appropriate data storage, and may further store machine-readable instructions, which may be loaded into the memory 112 and executed by the processor 111. As with the processor 111, the memory 112 may be positioned on the smart necklace 100, may be positioned remote from the smart necklace 100 or it may be a combination of a local or remote memory.

The sensor array 120 includes stereo cameras 121, a camera 122, an inertial measurement unit (IMU) 123, a global positioning system (GPS) 124, and a sensor 125. The stereo cameras 121 may be a stereo camera pair comprising two cameras offset by a stereo distance. The stereo distance may be optimized for the two cameras. The smart necklace 100 may have more than one pair of stereo cameras 121, as will be further described below. The camera 122 may be a camera or other optical sensor not part of a stereo camera pair. The IMU 123 may be an IMU which may further comprise one or more of an accelerometer, a gyroscope, and/or a magnetometer. The GPS 124 may be one or more GPS units. The sensor 125 may be one or more sensors which provide further information about the environment in conjunction with the rest of the sensor array 120. The sensor 125 may be, for example, one or more of a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, or other sensor.

The interface array 130 includes a microphone 131, a speaker 132, a vibration unit 133, an input device 134, and a display 135. The microphone 131 may be a microphone or other device capable of receiving sounds, such as voice activation/commands or other voice actions from the user, and may be integrated with or external to the smart necklace 100. The speaker 132 may be one or more speakers or other devices capable of producing sounds and/or vibrations. The vibration unit 133 may be a vibration motor or actuator capable of providing haptic and tactile output. In certain implementations, the vibration unit 133 may also be capable of producing sounds, such that the speaker 132 and the vibration unit 133 may be the same or integrated. The vibration unit 133 may include a left vibration motor in the left portion, and a right vibration motor in the right portion. This advantageously allows various combinations of haptic feedback using a left-side vibration that may differ from a right-side vibration.

The input device 134 may be an input device such as a touch sensor and/or one or more buttons. For example, the input device 134 may be a touch sensor used as a slider to adjust settings as well as act as a button for making selections, similar to a touchpad. The display 135 may be a display, integrated into the smart necklace 100 or wirelessly connected to the smart necklace 100, and may be capable of displaying visual data from the stereo cameras 121 and/or the camera 122. In other implementations, the display 135 may be another visual alert device, such as one or more LEDs or similar light source.

The component array 140 includes a battery 141, an antenna 142, and an input/output (I/O) port 143. The battery 141 may be a battery or other power supply capable of powering the smart necklace 100. The battery 141 may have a connection port for recharging, or may be wirelessly recharged, such as through induction charging. The antenna 142 may be one or more antennas capable of transmitting and receiving wireless communications. For example, the antenna 142 may be a Bluetooth or WiFi antenna, may be a radio frequency identification (RFID) antenna or reader, and/or a near field communication (NFC) unit. The I/O port 143 may be one or more ports for connecting additional peripherals. For example, the I/O port 143 may be a headphone jack, or may be a data port.

The antenna 142 and/or the I/O port 143 allows the smart necklace 100 to connect to another device or network for data downloads, such as updates or map information or other relevant information for a particular application, and data uploads, such as status updates. Further, the antenna 142 and/or the I/O port 143 allows the smart necklace 100 to communicate with other smart devices for distributed computing or sharing resources.

The smart necklace 100 described herein is generally a stand-alone device. However, in other implementations, the smart necklace 100 may be configured or optimized to work in conjunction with other devices. For example, smartphones, tablets, or other mobile devices may wirelessly connect to the smart necklace 100 for shared resources and processing. The mobile device may act as a display unit for the smart necklace 100. The smart necklace 100 may further have specific protocols for interacting with mobile devices or other smart necklaces 100. Additionally, the smart necklace 100 may connect over the internet to remote processing and/or remote storage, such as a cloud.

The smart necklace 100 is a lightweight, wearable smart device that is worn around the user's neck for environmental awareness, navigation, social interactions, and obstacle avoidance through real-time feedback. The smart necklace 100 is capable of recognizing objects around the user, in order to alert the user. For example, the smart necklace 100 may be used by a blind person to aid in environmental awareness and navigate safely around obstacles. The smart necklace 100 provides the user audio and haptic feedback through the speaker 132 and the vibration unit 133 based upon camera input from the stereo cameras 121 and the camera 122.

In one implementation, the smart necklace 100 includes two pairs of stereo cameras 121, which may be positioned on either side of the user's neck. Stereo cameras provide depth information in both indoor and outdoor environments. The stereo cameras 121 may face forward, in front of a user, to establish a field of view. The stereo cameras 121 may have, for example, a field of view of around 90 degrees. The stereo cameras 121 provide 3D information such as depth in front of the user. Stereo cameras 121 having different focal lengths may be provided. In various embodiments, one set of stereo cameras 121 may be positioned a relatively small distance apart (such as on a single side of the smart necklace 100) and another pair of stereo cameras 121 may be positioned a relatively large distance apart (such as positioning one of the pair of stereo cameras 121 on a first side of the smart necklace 100 and the other pair of stereo cameras 121 on a second side of the smart necklace 100). The pair of stereo cameras 121 having the relatively small distance apart can have a relatively short focal length, and thus provide detailed depth information for objects that are relatively close to the user. The pair of stereo cameras 121 having the relatively large distance apart can have a relatively long focal length, and thus provide detailed depth information for objects that are relatively far away from the user.

Additional cameras 122, which may be placed to the sides of the stereo cameras 121, may be wide angle cameras. Wide angle cameras can increase the field of view of the smart necklace 100 so that the smart necklace may have a field of view that is near 120 degrees. In various embodiments, the cameras 122 may be placed where needed, such as behind the user's neck to provide data for an area behind the user.

Although the cameras 122 may be monocular, they can provide simple recognition, even without depth or distance information. For example, the cameras 122 can detect moving objects in the user's periphery. The stereo cameras 121 and the cameras 122 may continuously passively recognize objects in the environment. Working in conjunction with the other sensors in the sensor array 120, the smart necklace 100 can provide the user with guidance and navigation commands by way of audio and haptic feedback. In a preferred embodiment, the stereo cameras 121 are utilized in part because they can advantageously provide depth information. In another embodiment, one or more omnidirectional cameras may be utilized in addition to or in lieu of the stereo cameras 12 and the cameras 122.

The GPS 124 provides location information, which works with the inertial guidance information, including velocity and orientation information, provided by the IMU 123 to help direct the user. The memory 112 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the stereo cameras 121 and/or cameras 122 may passively recognize additional points of interest and update the map data.

For example, the user may give a voice command, "Take me to building X in Y campus." The smart necklace 100 may then download a relevant map if not already stored, or may navigate based on perceived images from the stereo cameras 121 and the cameras 122. As the user follows the navigation commands from the smart necklace 100, the user may walk by a coffee shop in the morning, and the smart necklace 100 would recognize the coffee shop and the time of day, along with the user's habits, and appropriately alert the user. The smart necklace 100 may verbally alert the user through the speaker 132. The user may use the input device 134 to adjust settings, which for example may control the types of alerts, what details to announce, and other parameters which may relate to object recognition or alert settings. The user may turn on or off certain features as needed.

When navigating indoors, the standalone GPS units may not provide enough information to a blind user to navigate around obstacles and reach desired locations or features. The smart necklace 100 may recognize, for instance, stairs, exits, and restrooms and appropriately store them in the memory 112. In another example, the smart necklace 100 may determine empty seats for the user to navigate to, or may remember the user's specific seat in order to navigate away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks. With wireless connectivity, local processing can be reduced, as high level data and processing may be available from the cloud or other remote data centers.

The smart necklace 100 may determine paths for navigation, which may be further modified for the user's needs. For example, a blind person may prefer routes that follow walls. Using the IMU 123 and/or the GPS 124 and other sensors, the smart necklace 100 can determine the user's location and orientation to guide them along the path, avoiding obstacles. The vibration unit 133 and the speaker 132 provide audio and haptic cues to help guide the user along the path.

For example, the speaker 132 may play a command to move forward a specified distance. Then, special audio tones or audio patterns can play when the user is at a waypoint, and guide the user to make a turn through additional tones or audio patterns. A first tone, audio pattern or vibration can alert the user to the start of a turn, such as a single tone or a vibration from the left side of the smart necklace may indicate a left turn. A second tone, audio pattern or vibration can alert the user that the turn is complete such as two tones, or the vibration may stop, such as the left side ceases to vibrate when the turn is complete. Different tones, patterns or vibrations may also signify different degrees of turns, such as a specific tone for a 45 degree turn and a specific tone for a 90 degree turn. Alternatively or in addition to tones and vibrations, the smart necklace 100 may provide verbal cues, similar to a car GPS navigation command.

High level alerts may also be provided through audio feedback. For example, as the smart necklace 100 reaches a predetermined distance—such as a foot or other value which may be stored in the memory 112 and may be adjusted—from an obstacle or hazard, the speaker 132 and/or the vibration unit 133 may provide audible alerts. As the smart necklace 100 gets closer to the obstacle, the audible alerts may increase in intensity or frequency.

The vibration unit 133 may include a left vibration motor in the left portion of the smart necklace 100 and a right vibration motor in the right portion of the smart necklace 100 for providing stereo haptic feedback to the user. Vibration patterns on the left portion can be different than vibration patterns on the right portion. In this manner, different combination of left/right vibration patterns can convey more variety of useful information to the user (as opposed to outputting the same pattern in both left and right vibration). For example, certain vibration patterns on the left that are lacking on the right may be used to signal to the user that the user should turn left.

The microphone 131 may detect additional environmental data, such as sounds of moving cars or other possible hazards. The microphone 131 may work in conjunction with the speaker 132, and may be placed away from the speaker 132 to prevent interference. The microphone 131 may alternatively work in conjunction with an attached audio device, such as bone conduction devices, to provide the user with audio feedback without broadcasting the audio feedback.

The smart necklace 100 may improve social interactions. For example, the smart necklace 100 may recognize faces in a room to identify potential friends, and provide the user with audio feedback identifying friends. The stereo cameras 121 and/or the camera 122 may be further able to determine additional details about persons, such as moods or expressions, or if they are engaging in physical activities, in order to alert the user. For example, the potential friend may extend a hand for a handshake or a "high five," and the smart necklace 100 may use audio or haptic feedback to notify the user. The microphone 131 may recognize voices of other persons to identify and appropriately notify the user, or may recognize a new voice to save for future identification.

Although the smart necklace 100 is described with respect to a blind user, the smart necklace 100 may be used in other applications. For example, the smart necklace 100 may be used by peace officers and law enforcement officers as a recorder which provides additional environmental awareness. The smart necklace 100 may be further used by athletes to record sports in a real-time, first person view. For example, performing certain actions such as a swing can be recorded, including inertial motions, to analyze the motions. The smart necklace 100 may also be used in hazardous environments to provide additional safety warnings. For example, the smart necklace 100 may be used in a factory to provide a factory worker additional warning about possible hazardous conditions or obstacles.

In such applications, the sensor 125 may be specifically chosen to provide particularly relevant measurements. For instance, in an environment with harmful gas, the sensor 125 may detect dangerous levels of gas and accordingly alert the user. The sensor 125 may provide low-light viewing, or the stereo cameras 121 and/or the camera 122 may be capable of night vision, to provide the user with additional environmental awareness in low-light conditions, such as outdoors at night or photo-sensitive environments. The sensor 125, the stereo cameras 121 and/or the camera 122 may be adapted to detect a light spectrum other than the visible light spectrum. The smart necklace 100 can be a memory device to aid persons, such as Alzheimer's patients. The smart necklace 100 can aid in shopping or otherwise navigating inventories by helping to keep track of goods. The antenna 142 may be an RFID or NFC reader capable of identifying RFID or NFC tags on goods.

In certain embodiments, the smart necklace 100 is designed to accommodate blind or partially blind users. In such embodiments, a low-light viewing or night-vision camera (e.g., infrared camera) may also be utilized. For example, a camera 122 may be directed to normal lighting and another directed to night vision. For example, a blind user may be more likely to turn off the lights because he/she does not depend on the lighting. The smart necklace 100 would still function properly by processing images of the night-vision camera. The image processed may be limited in night-vision. For example, facial recognition may not be feasible, but the presence of another person can be detected. As a result, helpful information can be provided to the user.

The smart necklace 100 may include an infrared camera in combination with the stereo cameras 121 and/or camera 122. For example, a wide angle camera 122 and/or stereo cameras 121 may be utilized for image detection for normal lighting situations and an infrared camera may be utilized for image detection for darker situations.

Because the smart necklace 100 may be used for environmental awareness and detection, other light spectrums may be useful. The visible light spectrum allows humans to detect certain details that other light spectrums may not provide. However, other light spectrums may provide certain details that human visible light spectrum cannot provide. Details of certain objects may not be easily detected by the visible light spectrum during a cloudy or foggy day. Another spectrum of light may provide better details of objects during certain conditions. These spectrums may include extreme ultraviolet, near infrared, mid infrared, far infrared, etc. For maximum efficiency and object detection, different sensors 125, stereo cameras 121 and/or cameras 122 may be provided for detecting various light spectrum data. In some embodiments, a single camera 122 is provided that detects a spectrum of light other than the visible light spectrum.

Figure 2:
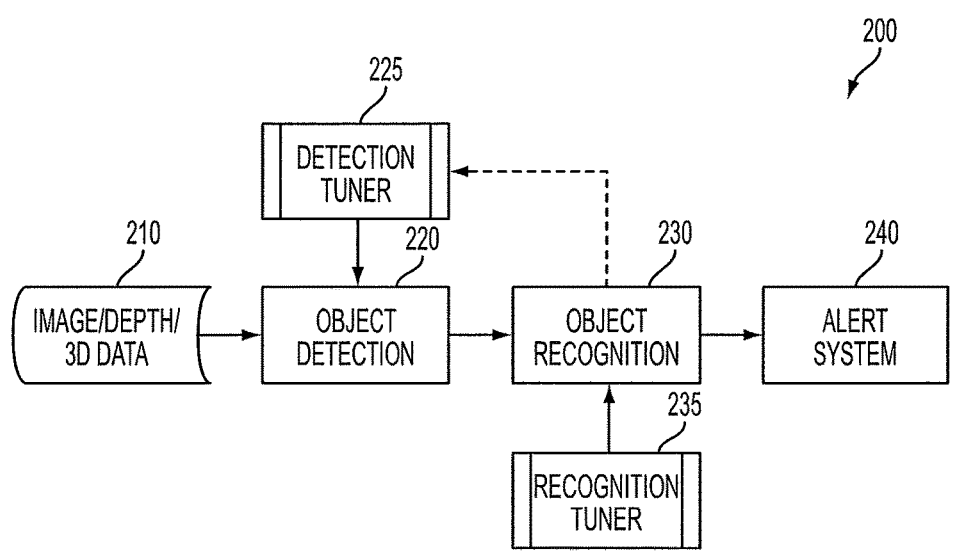
FIG. 2 is a flowchart of an object recognition logic according to an embodiment of the present invention.

Referring now to FIG. 2, a flowchart of a method 200 of adjusting object detection parameters, object recognition parameters, or both object detection parameters and object recognition parameters is schematically depicted. In some implementations, the method 200 may be implemented as logic within the machine readable instructions that, when executed by the processor 111, automatically adjust object detection parameters, object recognition parameters, or both object detection parameters and object recognition parameters. It is noted that, while the method 200 depicts a specific sequence, additional implementations of the present disclosure are not limited to any particular sequence.

Referring now to FIG. 2, at block 210 the smart necklace 100 receives image data representative of the environment. As noted above, in some implementations, the smart necklace 100 is configured to acquire video or image data, which may be video frames, of the field of view of the user from the stereo cameras 121 and the cameras 122, and to then send the acquired image data of the environment to the processor 111 and/or the memory 112 for storage and/or processing. In some implementations, the smart necklace 100 may receive image data from a source external to the smart necklace 100, such as via the antenna 142 through a wireless network.

The image data received at block 210 may be data of a variety of forms, such as, but not limited to red-green-blue ("RGB") data, depth image data, three dimensional ("3D") point data, and the like. In some implementations, the smart necklace 100 may receive depth image data from an infrared sensor or other depth sensor, such as an infrared sensor or depth sensor integrated with the stereo cameras 121 and/or the camera 122. In other implementations that include a depth sensor (e.g., an infrared sensor), the depth sensor may be separate from the stereo cameras 121 and/or the camera 122.

Still referring to FIG. 2, at block 220, the machine readable instructions stored in the memory 112, when executed by the processor 111, cause the smart necklace 100 to detect a candidate object, with the onboard processing array 110, based on the image data received at block 210. In some implementations, the onboard processing array 110 may detect the candidate object by identifying a candidate region of the received image data, such as a region of the image that includes high entropy. For example, the onboard processing array 110 may detect a high entropy region in the acquired target image data that includes a spray bottle. In some implementations, the onboard processing array 110 may utilize a sliding window algorithm to identify the candidate region of the received image data. In implementations, the onboard processing array 110 may detect the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some implementations, the onboard processing array 110 may bias detections to one or more spatially located regions of interest based on application, scene geometry and/or prior information.

The onboard processing array 110 includes at least one object detection parameter to facilitate the detection of the candidate object. In some implementations, the at least one object detection parameter is a window size, a noise filtering parameter, an estimated amount of light, an estimated noise level, a feature descriptor parameter, an image descriptor parameter, or the like.

Still referring to FIG. 2, at block 230, the machine readable instructions stored in the memory 112, when executed by the processor 111, cause the smart necklace 100 to recognize an object, with the onboard processing array 110, based on the image data received at block 210. In some implementations, the object recognition module may recognize the object based on a candidate region identified by the onboard processing array 110.

In some implementations, the onboard processing array 110 may recognize the candidate object by utilizing a feature descriptor algorithm or an image descriptor algorithm, such as scale invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some implementations in which the onboard processing array 110 utilizes a feature descriptor or image descriptor algorithm, the onboard processing array 110 may extract a set of features from a candidate region identified by the onboard processing array 110. The onboard processing array 110 may then access a reference set of features of an object recognition reference model from an object recognition database stored in the memory 112 and then compare the extracted set of features with the reference set of features of the object recognition reference model. For example, the onboard processing array 110 may extract a set of features from the high entropy region of the acquired target image data that includes a bottle and compare the extracted set of features to reference sets of features for one or more reference bottle models. When the extracted set of features match the reference set of features, the onboard processing array 110 may recognize an object (e.g., recognizing a bottle when the extracted set of features from the high entropy region of the acquired target image data that includes the bottle match the reference set of features for a reference bottle model). When the extracted set of features does not match the reference set of features, an object recognition error has occurred (e.g., an object recognition error indicating that no object recognition reference model matches the candidate object). When an object recognition error has occurred (e.g., referring to the example, no reference bottle model exists in the memory 112), the at least one object detection parameter may be adjusted to improve the accuracy of the object detection module, as described below with reference to block 225.

In some implementations, the object recognition module may assign an identifier to the recognized object. For example, the identifier may be an object category identifier (e.g., "bottle" when the extracted set of features match the reference set of features for the "bottle category" or "cup" when the extracted set of features match the reference set of features for the "cup" object category) or a specific object instance identifier (e.g., "my bottle" when the extracted set of features match the reference set of features for the specific "my bottle" object instance or "my cup" when the extracted set of features match the reference set of features for the specific "my cup" object instance).

The onboard processing array 110 includes at least one object recognition parameter to facilitate the recognition of the object. In some implementation, the at least one object recognition parameter is a window size, a noise filtering parameter, an estimated amount of light, an estimated noise level, a feature descriptor parameter, an image descriptor parameter, or the like.

Still referring to FIG. 2, at block 240, the machine readable instructions stored in the memory 112, when executed by the processor 111, cause the smart necklace 100 to send control signals to the vibration unit 133 and/or the speaker 132 to provide appropriate haptic and audio feedback to the user. For example, if the object recognized is categorized as an obstacle, the vibration unit 133 may vibrate at an increasing rate as the smart necklace approaches it. If the object is categorized as a hazard, the speaker 132 may play a warning sound. If the object is categorized as a point of interest, the speaker 132 may play an appropriate notice, or may remain silent. As noted above, when an object recognition error has occurred, the at least one object detection parameter may be adjusted to improve the accuracy of the onboard processing array 110.

Still referring to FIG. 2, at block 225, the machine readable instructions stored in the memory 112, when executed by the processor 111, cause the smart necklace 100 to adjust at least one object detection parameter of the onboard processing array 110, with a detection tuner module, when an object recognition error has occurred. The detection tuner module may be implemented as instructions executed by the processor 111 and data stored on the memory 112. By way of non-limiting example, in some implementations, the detection tuner module may adjust the window size utilized by the onboard processing array 110 when an object recognition error has occurred. In some implementations, the detection tuner module includes a detection tuner model and the detection tuner model adjusts the at least one object detection parameter based on the object recognition error. In some implementations, the detection tuner model maps the object recognition error to the adjusted at least one object detection parameter. In some implementations, the detection tuner model is a learned correlation model, such as a support vector machine ("SVM") model.

Still referring to FIG. 2, at block 235, the machine readable instructions stored in the memory 112, when executed by the processor 111, cause the smart necklace 100 to adjust at least one object recognition parameter of the onboard processing array 110, with a recognition tuner module, when object recognition error has occurred. The recognition tuner module may be implemented as instructions executed by the processor 111 and data stored on the memory 112. By way of non-limiting example, in some implementations, the recognition tuner module may adjust the window size utilized by the onboard processing array 110 when object recognition error has occurred. In some implementations, the recognition tuner module includes a recognition tuner model and the recognition tuner model adjusts the at least one object recognition parameter based on the object recognition error. In some implementations, the recognition tuner model maps the object recognition error to the adjusted at least one object recognition parameter. In some implementations, the recognition tuner model is a learned correlation model, such as a support vector machine ("SVM") model.

FIGS. 3A-3C present one example of a method of object recognition according to an implementation of the present disclosure. In FIG. 3A, for example, the first visual data 306 corresponds to a 2-D image of the target object 310 positioned on a plane 324 (e.g., a table). The second visual data 308 corresponds to 3-D depth data of the target object 310 positioned on the plane 324. Category object recognition is performed for analyzing, using the processor 111 and the first visual data 306. The first visual data 306 is analyzed based on a plurality of object models stored in a database, which may be stored in the memory 112. For example, the plurality of object models may include primitive shapes such as cylinders, boxes, and the like associated with corresponding parameters defining the primitive shapes. For example, the processor 111 may determine whether any portion of the first visual data 306 corresponds in shape, structure, or in terms of other pose information, to the plurality of object models stored in the database. Each of the plurality of object models may have at least one parameter. For example, an object model may be a cylinder with parameters of a height and a radius. For example, an object model may be a box with three parameters of a width, a height, and a length.

When the processor 111 searches for an object model of the plurality of object models, more than one object model may be similar in shape or structure to a portion of the first visual data 306. For example, a body of a bottle (e.g., the target object 310) may be similar in shape or structure to either a cylinder or a box. The processor 111 is configured to determine which of the plurality of object models has the closest fit for the analyzed portion of the first visual data 306. For example, the processor 111 may assign a score (for example, a recognition accuracy percentage) as to the degree of similarity between a particular object model of the plurality of object models and the analyzed portion of the first visual data 306. For example, the processor 111 may choose the object model of the plurality of object models associated with the highest associated score (e.g., recognition accuracy percentage), as the object model that corresponds to the analyzed portion of the first visual data 306. As such, in one implementation, the processor 111 determines the parameters of the chosen object model.

As described below, the plurality of object models are not fixed. The stored object models and their corresponding parameters may be supplemented or modified. In addition or in the alternative, new category object models may be learned and stored in the database based on the recognized target objects. The discussion at this juncture assumes that the method is detecting the target object 310 for the first time, and objects having similar shapes, structure, or pose information to the target object 310 as a whole are not yet encountered and stored.

Referring to FIG. 3B, an example of the category object recognition of the method is illustrated. For example, the processor 111 may examine the first visual data 306 adjacent to, around, or within the sliding enclosure 312 from left to right, starting from the top left corner of the 2-D image represented by the first visual data 306 moving right thereafter in the direction 314. The processor 111 may recognize objects within the first visual data 306 that are similar in shape or structure to an object model of the plurality of object models stored in the database. In other implementations, instead of the sliding enclosure 312, the visual data set 304, the first visual data 306, the second visual data 308, or combinations thereof may be examined as a whole to determine whether any portion of the first visual data 306 matches an object model stored in the database.

FIG. 3C illustrates a result of the category object recognition. The processor 111 may recognize that the target object 310 is similar to one of the object models. The first enclosure 350 may be a bounding box, a bounding circle, or any other shape without limiting the scope of the invention. The first enclosure 350 has a first center point 316. When the first enclosure 350 is a bounding box, the first center point 316 is the point with approximately equal distance from each side of the bounding box. When the first enclosure 350 is a bounding circle, the first center point 316 may be the center of the bounding circle. In one embodiment, the processor 111 may determine the first center point 316 such that the first center point 316 is positioned on, corresponds to, or falls within a portion of the visual data set 304 corresponding to the target object 310. The target object 310 may, for example, be positioned within, around, or adjacent to the first enclosure 350. The processor 111 determines that a first target data (which is a portion of the first visual data 306) corresponds to the target object 310 to recognize the target object 310.

Although the method described above uses a bottle as an exemplary object, the method may be used to recognize points of interest and other features, such as stairs, empty seats or buildings.

Figure 4:
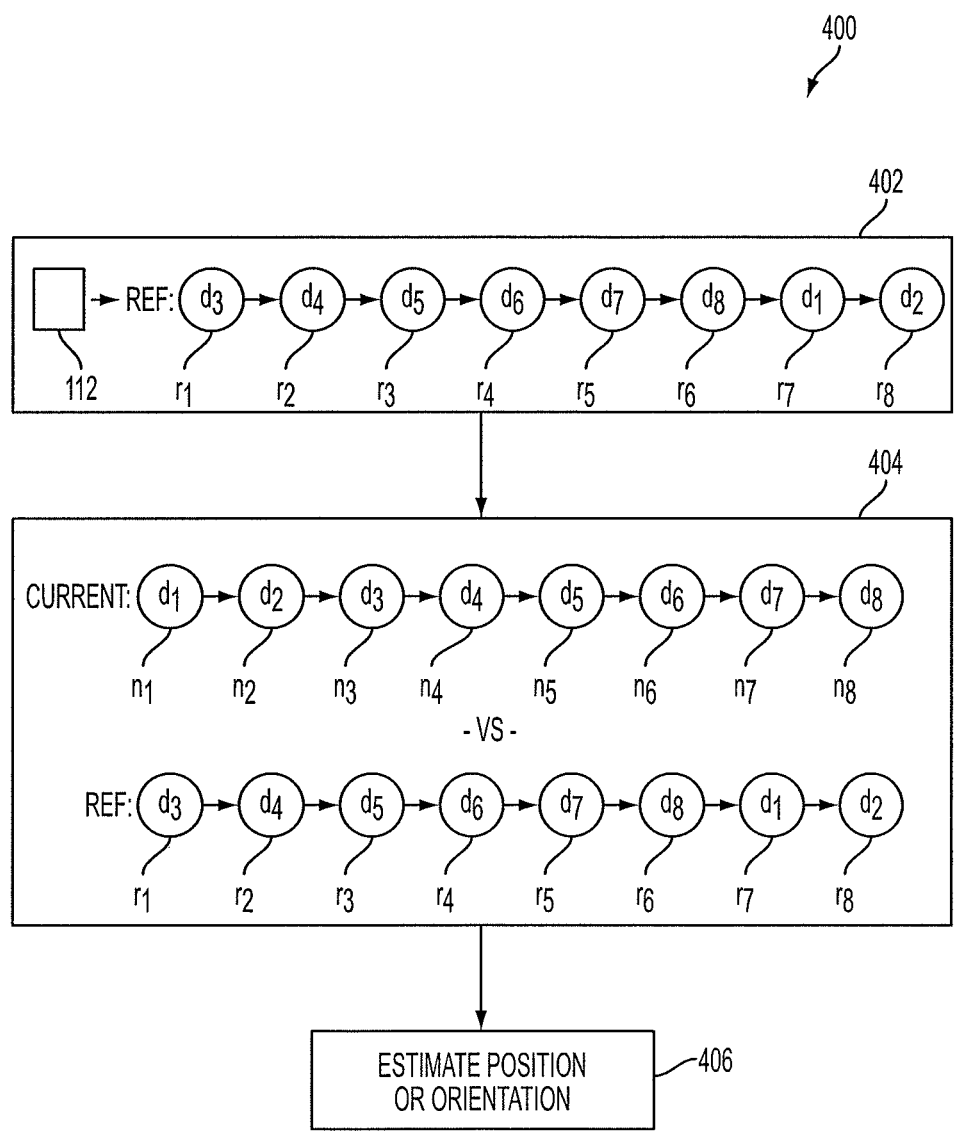
FIG. 4 is a flowchart illustrating a method of estimating a position or orientation based on slice descriptors according to an embodiment of the present invention.

Referring now to FIG. 4, which shows a flowchart 400 of a method of estimating position or orientation based on slice descriptors. The onboard processing array 110 receives omni-directional image data representative of a panoramic field of view from the stereo cameras 121 and the cameras 122. In some implementations, the stereo cameras 121 and the cameras 122 operate within a physical environment and is configured to acquire omni-directional image data, and to then send the acquired omni-directional image data of the physical environment to the onboard processing array 110 for storage and/or processing. In some implementations, the onboard processing array 110 may receive omnidirectional image data from a source external to the smart necklace 100, such as via the antenna 142. The acquired omni-directional image data may be in the form of digital video and/or one or more digital photographs.

The onboard processing array 110 segments the omni-directional image data into a plurality of image slices. In one exemplary implementation, the received omni-directional image is segmented into eight slices (S1, S2, S3, S4, S5, S6, S7, and S8). In some implementations, the omni-direction image may be segmented into any number of slices. In some implementations, the number of slices may be between 8 and 36. However, it should be understood that the number of slices may be less than 8 or greater than 36.

Each of the plurality of slices is representative of at least a portion of the panoramic field of view of the omni-directional image data or the partially panoramic field of view of the omni-directional image data. In some implementations, the plurality of image slices includes a middle image slice (e.g., slice S2), a preceding image slice (e.g., slice S1), and a subsequent image slice (e.g., slice S3), such that a field of view of the middle image slice (e.g., slice S2) is adjacent to or overlaps a preceding field of view of the preceding image slice (e.g., slice S1) and the middle field of view of the middle image slice (e.g., slice S2) is adjacent to or overlaps a subsequent view of the subsequent image slice (e.g., slice S3).

In some implementations, each image slice of the plurality of image slices is representative of an equal portion of the panoramic field of view of the omni-directional image data and the collective fields of view of the plurality of image slices is the same as the panoramic field of view of the omni-directional image data. For example, each of the eight slices captures an eighth of the full panoramic view of the omnidirectional image data and the collective field of view of the eight image slices is the same as the panoramic field of view of the omni-directional image data. In some implementations, the field of view of a first slice of the plurality of views may be greater than a field of view of a second slice of the plurality of slices. In some implementations, the collective fields of view of the plurality of slices may be smaller than the full panoramic field of view. In some implementations, the field of views of neighboring slices may overlap.

The onboard processing array 110 calculates a slice descriptor for each image slice of the plurality of image slices. As used herein, "slice descriptor" refers to a description of the visual features (e.g., color, texture, shape, motion, etc.) of the image data of a particular slice of the omni-directional image data. For example, a slice descriptor d1 is calculated for slice S1, a slice descriptor d2 is calculated for slice S2, a slice descriptor d3 is calculated for slice S3, a slice descriptor d4 is calculated for slice S4, a slice descriptor d5 is calculated for slice S5, a slice descriptor d6 is calculated for slice S6, a slice descriptor d7 is calculated for slice S7, and a slice descriptor d8 is calculated for slice S8.

In some implementations, the slice descriptor may be calculated using an algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. However, it should be understood that other algorithms may be used to calculate the slice descriptor. In some implementations, the slice descriptor may include a decimal vector. In some implementations, the slice descriptor may include a binary vector. In other implementations, the slice descriptor may be represented in a format other a binary vector or a decimal vector. Depth information resulting from the application of stereo algorithms may also be used to calculate the slice descriptor.

The onboard processing array 110 generates a current sequence of slice descriptors for the omni-directional image data received. The current sequence of slice descriptors includes the calculated slice descriptor for each image slice of the plurality of image slices. For example, node n1 includes the slice descriptor d1 corresponding to slice S1, node n2 includes the slice descriptor d2 corresponding to slice S2, node n3 includes the slice descriptor d3 corresponding to slice S3, node n8 includes the slice descriptor d8 corresponding to slice S8, etc.

In some implementations, the current sequence of slice descriptors may be structured such that a middle node (e.g., node n2) corresponds to a middle image slice (e.g., slice S2), a preceding node (e.g., node n1) corresponds to a preceding image slice (e.g., slice S1), and a subsequent node (e.g., node n3) corresponds to a subsequent image slice (e.g., slice S3). The preceding node (e.g., node n1) is linked to the middle node (e.g., node n2), and the middle node (e.g., node n2) is linked to the subsequent node (e.g., node n3).

In some implementations, the current sequence of slice descriptors are stored in the memory 112. In some implementations, the memory 112 may include a database of reference sequences of slice descriptors, each of which corresponds to a previously processed omni-directional image encountered by the onboard processing array 110.

In some implementations, the current sequence of slice descriptors may be stored in the memory 112 as a current linked list of slice descriptors. In implementations in which the current sequence of slice descriptors is stored in the memory 112 as a current linked list of slice descriptors, each node of the linked list may be linked to the subsequent node of the linked list (e.g., node n1 is linked to node n2, node n2 is linked to node n3, etc.). In some implementations, the current sequence of slice descriptors may be stored in the memory 112 as a circular linked list of slice descriptors, such that the first node is linked to the second node (e.g., node n1 is linked to node n2), the second node is linked to the third node (e.g., node n2 is linked to node n3), . . . , and the last node is linked back to the first node (e.g., node n8 is linked to node n1). In some implementations, the current sequence of slice descriptors may be stored in the memory 112 as a current doubly linked list of slice descriptors. It should be understood that in other implementations, the current sequence of slice descriptors may be stored in the memory 112 using a data structure other than a linked list, such as an array, and the like.

While the omni-directional image received was not unwarped prior to segmenting the omni-directional image, in other implementations, the omni-directional image may be unwarped prior to segmentation.

Returning to FIG. 4, at block 402, the machine readable instructions stored in the memory 112, when executed by the processor 111, may cause the onboard processing array 110 to access a reference sequence of slice descriptors in the memory 112. For example, in the implementation depicted in FIG. 4, the reference sequence of slice descriptors includes a reference slice descriptor d3 corresponding to a reference node r1, a reference slice descriptor d4 corresponding to a reference node r2, a reference slice descriptor d5 corresponding to a reference node r3, a reference slice descriptor d6 corresponding to a reference node r4, a reference slice descriptor d7 corresponding to a reference node r5, a reference slice descriptor d8 corresponding to a reference node r6, a reference slice descriptor d1 corresponding to a reference node r7, and a reference slice descriptor d2 corresponding to a reference node r8.

Still referring to FIG. 4, at block 404, the machine readable instructions stored in the memory 112, when executed by the processor 111, may cause the onboard processing array 110 to determine whether the current sequence of slice descriptors matches the reference sequence. In some implementations, whether the current sequence of slice descriptors matches the reference sequence of slice descriptors is determined by determining a current order of slice descriptors, determining a reference order of slice descriptors, and comparing the current order of slice descriptors to the reference order of slice descriptors. For example, a current order of slice descriptors in the embodiment depicted in FIG. 4 may be determined as {d1, d2, d3, d4, d5, d6, d7, d8}. A reference order of slice descriptors in the embodiment depicted in FIG. 4 may be determined as {d3, d4, d5, d6, d7, d8, d1, d2}. The current order of slice descriptors {d1, d2, d3, d4, d5, d6, d7, d8} may be compared to the reference order of slice descriptors {d3, d4, d5, d6, d7, d8, d1, d2} in order to determine whether the current order of slice descriptors matches the reference order of slice descriptors.

In some implementations, the current sequence of slice descriptors is a current circular linked list of slice descriptors and the reference sequence of slice descriptors is a reference circular linked list of slice descriptors. In such implementations, the current order of slice descriptors may be determined by traversing the current circular linked list of slice descriptors starting at a current starting node (e.g., the current order of slice descriptors may be determined to be {d1, d2, d3, d4, d5, d6, d7, d8} by traversing the current circular linked list starting from node n1 of the current circular linked list of slice descriptors). The reference order of slice descriptors may be determined by traversing the reference circular linked list of slice descriptors starting at a reference starting node (e.g., the reference order of slice descriptors may also be determined to be {d1, d2, d3, d4, d5, d6, d7, d8} by traversing the reference circular linked list starting from node r7 of the reference circular linked list of slice descriptors). The current sequence of slice descriptors matches the reference sequence of slice descriptors when the current order of slice descriptors is the same as the reference order of slice descriptors. In the embodiment depicted in FIG. 4, the current sequence of slice descriptors may be determined to match the reference sequence of slice descriptors because the reference order of slice descriptors when traversing the reference circular linked list of slice descriptors starting from node r7 is the same as the current order of slice descriptors when traversing the current circular linked list of slice descriptors starting from node n1.

Still referring to FIG. 4, at block 406, the machine readable instructions stored in the memory 112, when executed by the processor 111, may cause the onboard processing array 110 to estimate an orientation or position based on the current sequence of slice descriptors and the reference sequence of slice descriptors. For example, differences between the current sequence of slice descriptors and the reference sequence of slice descriptors may be used to determine a current position or orientation with reference to a known position or orientation associated with the reference sequence of slice descriptors. In some implementations, standard filtering techniques, such as the extended Kalman filter, the particle filter, and the like may be used to determine the current position or orientation based on the comparison between the current sequence of slice descriptors and the reference sequence of slice descriptors.

FIGS. 5A-9 illustrate various exemplary implementations of the smart necklace 100. Although FIGS. 5A-9 depict specific locations of components, in other implementations the exact locations and configurations may vary, as more or less components may be added or rearranged depending on specific applications. For example, the onboard processing array 110 may generally be located in the band portion of the smart necklace. Other hidden components, such as the IMU 123, the GPS 124, the sensor 125, the vibration unit 133, the battery 141, and the antenna 142, may be placed along the inside of the smart necklace as needed. The use of specialized sensors may require specific sensor placement and rearrangement of the other components. In addition, although the various implementations described generally take on a U-shape, in other implementations, other shapes, such as an O-shape or Ω-shape, may be used.

Figure 5B:
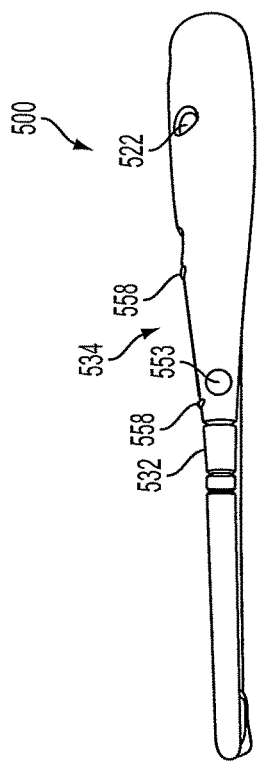
FIG. 5B is a side view of the smart necklace in FIG. 5A.
Figure 5C:
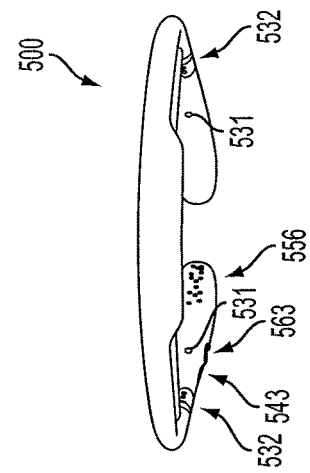
FIG. 5C is a back view of the smart necklace in FIG. 5A.
Figure 5A:
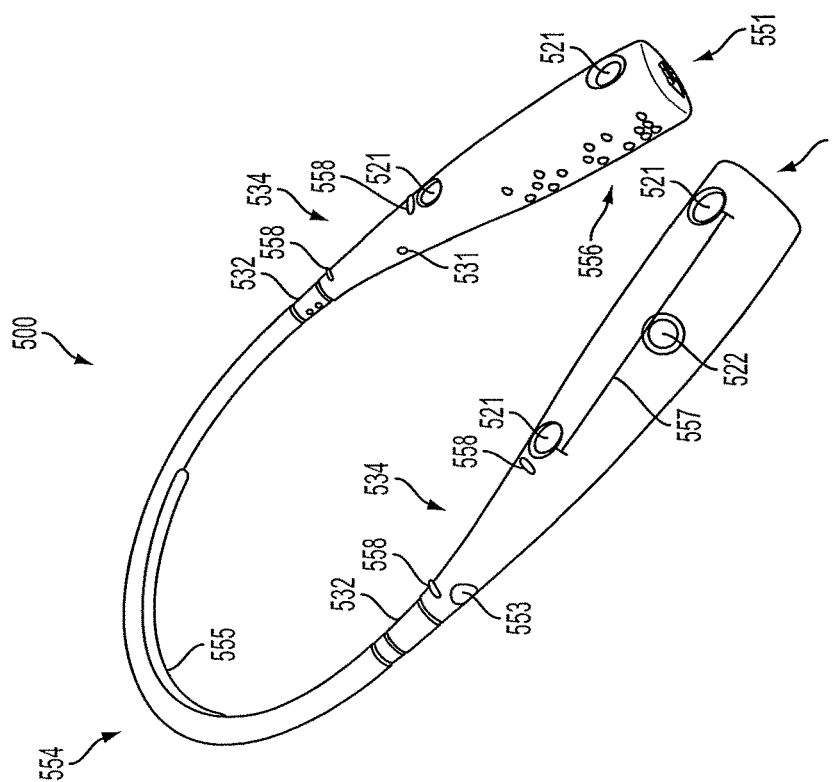
FIG. 5A is a view of a smart necklace with a "stalk" design according to an embodiment of the present invention.

Turning to FIGS. 5A-5C, FIGS. 5A-5C depict one implementation of a smart necklace 500 having a "stalk" design. The smart necklace 500 has a left stalk 551 and a right stalk 552, connected by a tube 554, which may be a flexible tube for added comfort. The smart necklace 500 corresponds to the smart necklace 100, and has similar components as the smart necklace 100, which are located within the left stalk 551, the right stalk 552, and the tube 554. Specifically, the tube 554 defines a cavity which houses the unseen components of the smart necklace 500.

The left stalk 551 and the right stalk 552 each have a pair of stereo cameras 521, which may be offset by a stereo distance 557. Although in FIG. 5A the stereo distance 557 is the same for both pairs of stereo cameras 521, in other implementations the stereo distance 557 may be different for each pair of stereo cameras 521. Cameras 522 are placed to the sides of the stereo cameras 521 to increase the field of view.

Speakers 532 are placed above the left stalk 551 and the right stalk 552. A microphone 531 is placed away from the speakers 532. A button 553 may be used as a power button or on/off switch, or other input. A touch sensor 534, which may be delimited with bump indicators 558, may provide another input for the user. A headphone jack 543 provides a port for attaching, for example, a 3.5 mm headphone set. A data port 563 may provide an additional port for data connections. The headphone jack 543 and the data port 563 may be located on the underside of the smart necklace 500, as seen in FIG. 5C. A texture strip 555, which may be rubber or silicone, lines the tube 554 to provide added cushioning and grip. In addition, the smart necklace 500 may have braille 556 for identification or a label for blind persons.

In various embodiments, the processor 111, the memory 112, the IMU 123, the GPS 124, the battery 141, and all other components of the smart necklace 100 are distributed throughout the smart necklace 100. For the comfort of the user, it is desired for the weight of the smart necklace 100 to be distributed evenly between the right side and the left side of the smart necklace. If the weight is significantly greater on one side of the smart necklace 100 than the other side, then the smart necklace 500 may be uncomfortable for the user to wear.

In various embodiments, all components of the smart necklace 100 are balanced between the front and the back of the smart necklace 100. The embodiment illustrated in FIGS. 5A-5C have a balance of weight that is almost all directed to the front of the smart necklace 500 (i.e., most components are positioned on the left stalk 551 and the right stalk 552). The tube 554 may be soft and/or flexible for added comfort.

If too much weight is distributed towards the back (the neck area) of the smart necklace 100, then the smart necklace 100 may be pulled backwards by the weight of the components. This can result in the smart necklace 100 falling off of the user or in unsteady imaging.

If the smart necklace 100 shifts too much when the user moves (because of the heavy weight towards the back), then the stereo cameras 121 and/or the camera 122 may shift positions by a significant amount and not be able to capture data from a uniform vantage point. By evenly distributing the weight between the front and the back, the weight towards the front of the smart necklace 100 will pull the front of the smart necklace 100 down so that the position of the stereo cameras 121 and the camera 122 does not shift while the user is moving. It has been discovered that optimum weight distribution may be an even distribution between the front and the back of the smart necklace 100, or slightly towards the front of the smart necklace 100.

Figure 6B:
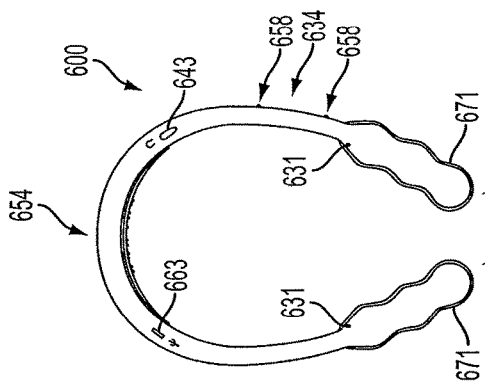
FIG. 6B is an under-side view of the smart necklace in FIG. 6A.
Figure 6C:
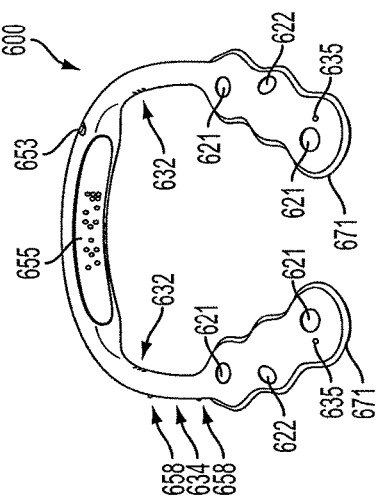
FIG. 6C is another view of the smart necklace in FIG. 6A.
Figure 6A:
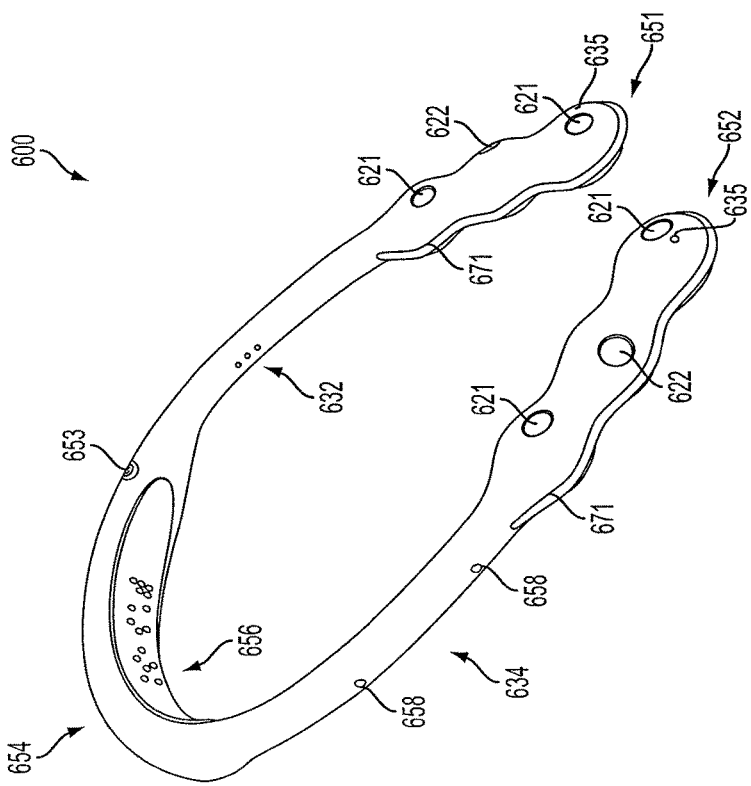
FIG. 6A is a view of a smart necklace with a "pod" design according to an embodiment of the present invention.

FIGS. 6A-6C depict one implementation of a smart necklace 600 having a "pod" design, which may resemble two peapods connected by a band. The smart necklace 600 has a left pod 651 and a right pod 652, connected by a band 654, which may be a flexible band for added comfort. The smart necklace 600 corresponds to the smart necklace 100, and has similar components as the smart necklace 100, which are located within the left pod 651, the right pod 652, and the band 654. Specifically, the band 654 defines a cavity which houses the unseen components of the smart necklace 500.

The left pod 651 and the right pod 652 each have a pair of stereo cameras 621. Cameras 622 are placed to the sides of the stereo cameras 621 to increase the field of view. Each of the stereo cameras 621 and cameras 622 may be placed on its own "pea," as seen in the three peas in FIGS. 6A and 6C. In other implementations, more or less peas may be used to house additional cameras or sensors. In certain other implementations, one or more of the peas may be removable and modular, to create custom combinations of sensors. For example, additional peas may be screwed on, magnetically attached, or otherwise removably attached, with electrical connector points between adjacent peas for sending power and signals.

Speakers 632 are placed above the left pod 651 and the right pod 652. Microphones 631 are placed behind the left pod 651 and the right pod 652 and away from the speakers 632, as seen in FIG. 6B. A headphone jack 643, which may be located on an underside of the smart necklace 600, provides a port for attaching, for example, a 3.5 mm headphone set. A data port 663, which may be a universal serial bus (USB) port or other similar data port, provides an additional data connection to other devices. A touch sensor 634, which may be delimited with bump indicators 658, may provide another input for the user. A button 653 may be used as a power button or on/off switch, or other input. A texture strip 655, which may be rubber or silicone, lines the band 654 to provide added cushioning and grip.

In addition, the smart necklace 600 may have braille 656 for identification or a label for blind persons. LEDs 635, placed near the bottom of the left pod 651 and the right pod 652, provide visual indicators, such as status indicators, and may have different colors or flashing patterns to indicate various statuses. An overmold 671, which may be rubber or silicone, lines each of the left pod 651 and the right pod 652, and may be soft and flexible to provide additional grip and cushioning.

Figure 6D:
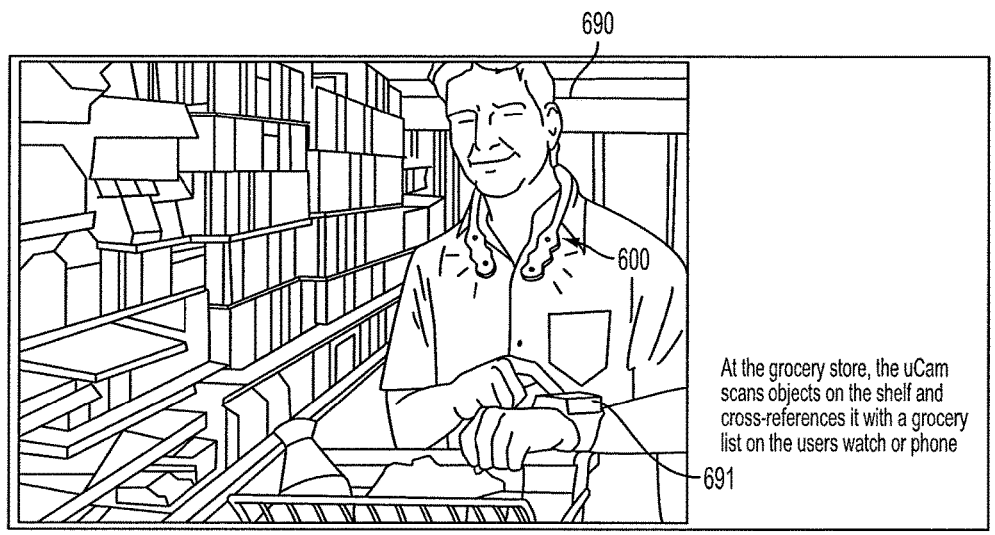
FIG. 6D is an image of a user utilizing the smart necklace in FIG. 6A along with a portable electronic device according to an embodiment of the present invention.

FIG. 6D is an image of a user 690 utilizing the smart necklace 600 in FIG. 6A along with a smart watch 691. Instead of the smart watch 691, the user 690 may be using a smartphone, a tablet, or the like. The user 690 may be in a grocery store and have created an electronic grocery list that is stored in remote memory or a memory of the smart watch 691. In various embodiments, the grocery list may be stored in the memory 112 of the smart necklace 600. The smart necklace 600 may be in data communication with the smart watch 691 such that the smart necklace 600 can access the grocery list.

As the user 690 strolls through the grocery store, the stereo cameras 621 and/or the cameras 622 may scan the aisles and detect items. The smart necklace may determine whether each detected item in the store matches an item on the grocery list. When an item is detected in the grocery store, the smart necklace 600 may alert the user 690 to the presence of a matched item. The smart necklace 600 may inform the user 690 of the precise item and the precise location of the item. The smart necklace 600 may also or instead direct the user 690 to the precise item via audio tones/patterns or vibration patterns. The smart necklace 600 may determine directions given to the user 690 by comparing the location of the smart necklace 600 and/or an arm of the user 690 to the precise location of the item, and guide the user's arm to the item.

FIGS. 7A-7B depict one implementation of a smart necklace 700 having a "paddle" design, which may resemble two paddles connected by a band. The smart necklace 700 has a left paddle 751 and a right paddle 752, connected by a band 754, which may be a flexible band for added comfort. The smart necklace 700 corresponds to the smart necklace 100, and has similar components as the smart necklace 100, which are located within the left paddle 751, the right paddle 752, and the band 754. Specifically, the band 754 defines a cavity which houses the unseen components of the smart necklace 500.

The left paddle 751 and the right paddle 752 each have a pair of stereo cameras 721. Cameras 722 are placed to the sides of the stereo cameras 721 to increase the field of view. Speakers 732 are placed above the left paddle 751 and the right paddle 752. Microphones 731 are placed on the sides of the left paddle 751 and the right paddle 752 and towards the inside of the U-shape of the smart necklace 700, as seen in FIG. 7A. A headphone jack 743 provides a port for attaching, for example, a 3.5 mm headphone set. A data port 763 may provide an additional port for data connections. A touch sensor 734, which may be delimited with bump indicators 758, may provide another input for the user. A button 753 may be used as a power button or on/off switch, or other input.

An overmold 755, which may be rubber or silicone, may line a portion or a majority of the smart necklace 700 to provide added cushioning and grip. In addition, the smart necklace 700 may have braille 756 for identification or a label for blind persons. LEDs 735, placed near the bottom of the left paddle 751 and the right paddle 752, provide visual indicators, such as status indicators, and may have different colors or flashing patterns to indicate various statuses.

Figure 7D:
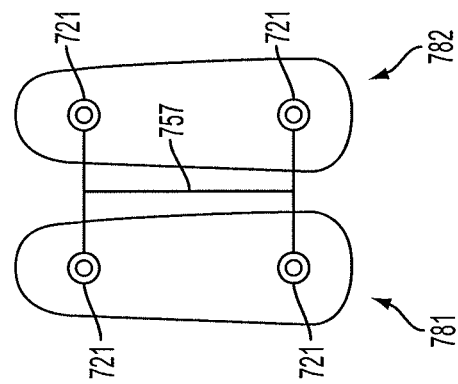
FIG. 7D is a close-up view of detachable pucks of the smart necklace in FIG. 7A.
Figure 7C:
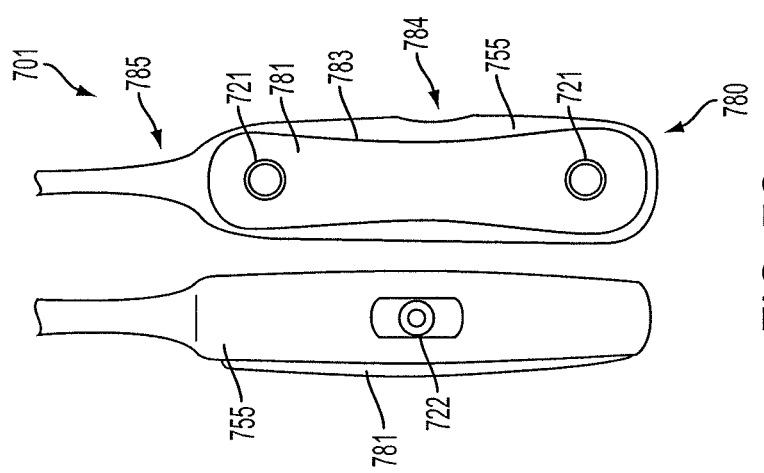
FIG. 7C is a close-up view of a paddle of the smart necklace in FIG. 7A.

FIGS. 7C-7D illustrate a smart necklace 701, which is similar to the smart necklace 700 with a modified paddle design. A modified paddle 780, which may be either a right paddle or a left paddle or both, has the overmold 755, but narrows at a neck portion 785. The modified paddle 780 is configured to have removable pucks, such as a left puck 781 and a right puck 782 in FIG. 7D. The overmold 755 has a large, oblong puck opening 783 for housing the left puck 781 or the right puck 782. The overmold 755 further includes a side opening 784 to allow the cameras 722 to have a side view. The left puck 781 and the right puck 782 may be removed from the overmold 755 through the puck opening 783.

In other implementations, the left puck 781 and the right puck 782 may be slid out of an additional hole in the overmold 755, or other similar method as needed. For example, in other implementations the left puck 781 and the right puck 782 may be magnetically attachable, and may further be connected by a retractable tether. The neck portion 785 may contain a connection port for the left puck 781 and the right puck 782 to send signals to and from the smart necklace 700, and to receive power. The left puck 781 and the right puck 782 may further include its own battery, respectively.

In FIG. 7D, the left puck 781 has stereo cameras 721 separated by a stereo distance 757. The right puck 782 has the same stereo distance 757. However, in other implementations the stereo distance 757 may be different. In yet other implementations, the stereo distance 757 may be variable, giving the user the option to remove the left puck 781 and focus on a smaller object, or to get a wider view. For example, the user may wish to have more information about a specific item. By placing the left puck 781 near the item, the stereo cameras 721 may be better able to detect finer details and provide isolated object recognition to provide the user more descriptive information. In certain other implementations, the left puck 781 and/or the right puck 782 may have other sensors, such that the pucks are interchangeable with cameras or sensors as needed in a particular application.

Turning now to FIG. 8, FIG. 8 depicts one implementation of a smart necklace 800 having a "twist" design, which may resemble a twisted band or tube. The smart necklace 800 has a left prong 851 and a right prong 852, connected by a band 854, which may be a flexible band for added comfort. The smart necklace 800 corresponds to the smart necklace 100, and has similar components as the smart necklace 100, which are located within the left prong 851, the right prong 852, and the band 854. The left prong 851 and the right prong 852 each have a pair of stereo cameras 821. Cameras 822 are placed to the sides of the stereo cameras 821 to increase the field of view. An overmold 855, which may be rubber or silicone, may line a portion or a majority of the smart necklace 800 to provide added cushioning and grip. As seen in FIG. 8, the overmold 855 twists around the smart necklace 800, starting from the left prong 851 and twisting around the band 854. An LED 835, placed near the bottom of at least the left prong 851, provides a visual indicator, such as a status indicator, and may have different colors or flashing patterns to indicate various statuses.

Figure 9A:
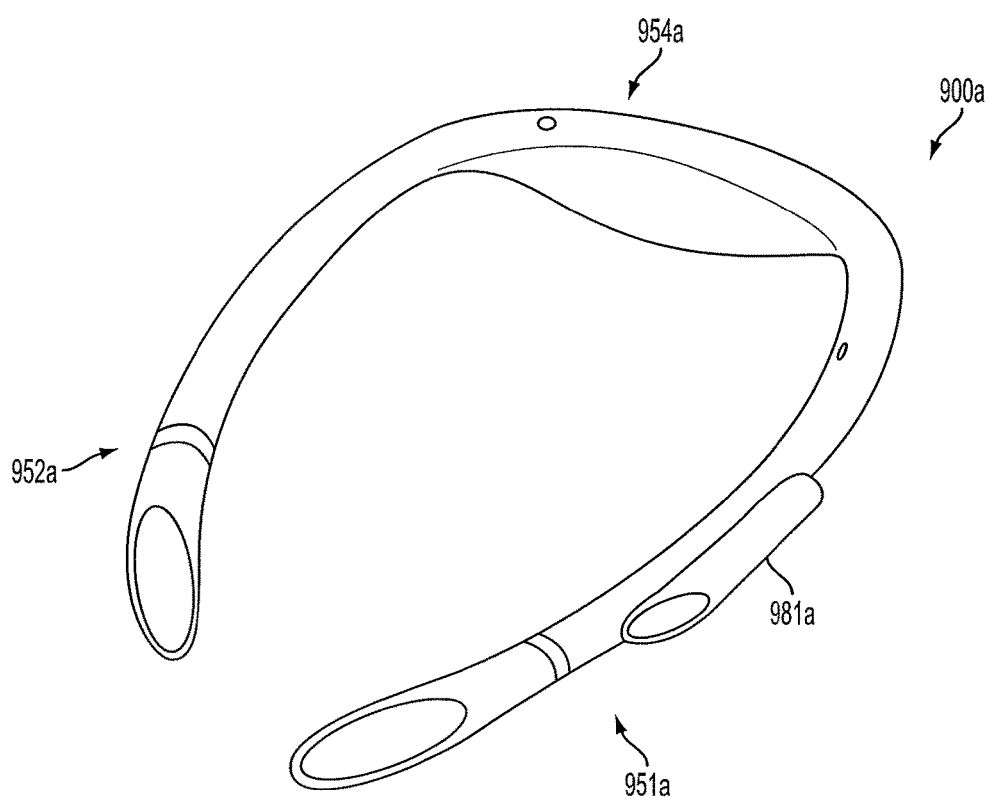
FIG. 9A is a view of a smart necklace with a removable tube having a camera according to an embodiment of the present invention.

Turning now to FIG. 9A, FIG. 9A depicts one implementation of a smart necklace 900a having a removable tube 981a with a camera, according to an implementation of the present disclosure. The smart necklace 900a corresponds to the smart necklace 100, and has similar components as the smart necklace 100, which are located within the left portion 951a, the right portion 952a, and the band 954a. The left portion 951a and the right portion 952a may each have a pair of stereo cameras (not shown) similarly as discussed above with respect to FIGS. 5A-8. In one embodiment, the smart necklace 900a may include input devices (e.g., a microphone), output devices (e.g., a speaker and/or haptic feedback), other units, or combinations thereof as described above with respect to embodiments shown in FIGS. 5A-8.

Similar to the embodiments described above with respect to FIGS. 7A-7D, a removable tube 981a may be equipped with a camera. For example, the removable tube 981 may be magnetically attachable; attachable with a clip; connected by a retractable tether, wire or cable; or combinations thereof. For example, the user may wish to have more information about a specific item. By placing the camera of the removable tube 981a near the item, the smart necklace 900 may be better able to detect finer details and provide isolated object recognition to provide the user more descriptive information. In other embodiments, removable tubes 981a may be provided on the right portion 952a or both portions 951a and 952a, or other portions of the smart necklace 900. In addition to or instead of the removable tube 981, other removable cameras may be provided using various other attaching mechanisms based on practical design and aesthetic concerns in order to allow the user to enhance detection of information.

The modularity of the smart necklace 900 provides for customization of the smart necklace 900. In some embodiments, it may be preferred for the smart necklace 900 to include a faster processor 111, a higher-quality camera 922, a night vision sensor 125, etc. instead of standard components. Because the removable tube 981a can be easily detached and attached, a new removable tube 981a can be provided having the desired components. This provides for the smart necklace 900 to be used in various situations instead of having to purchase smart necklaces 900 having different components thereon.

Figure 9B:
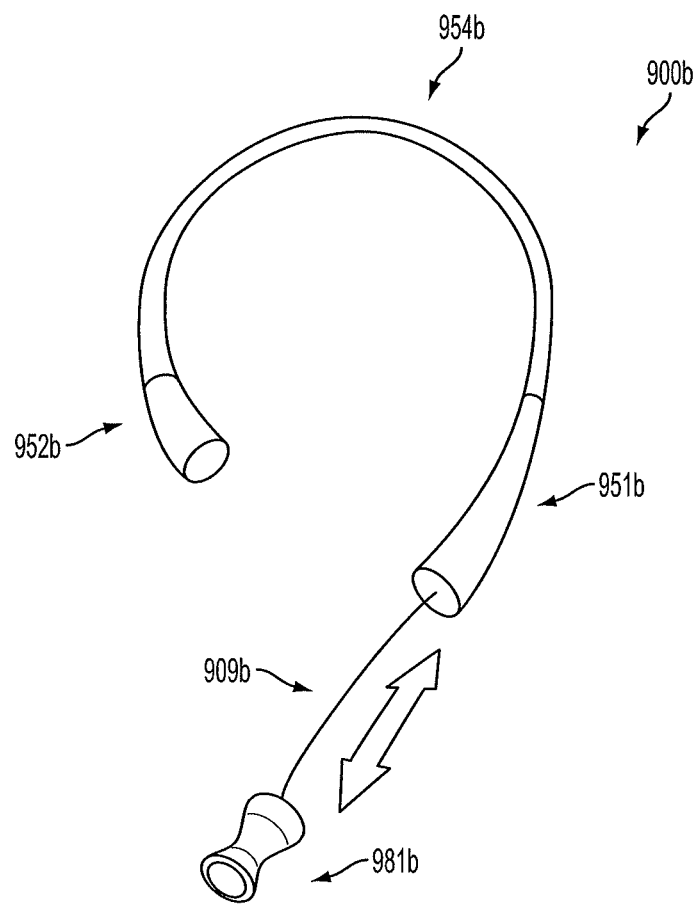
FIG. 9B is a view of a smart necklace with a removable tube connected to the smart necklace via a retractable cord according to an embodiment of the present invention.

FIG. 9B is a view of a smart necklace with a removable tube 981b connected to the smart necklace 900b via a retractable cord 909, according to an alternative implementation. Smart necklace 900b corresponds to the smart necklace 100, and has similar components as the smart necklace 900a, which are located within the left portion 951b, the right portion 952b, and the band 954b. A feature of this embodiment is that the removable tube 981b is configured to be removed from an end of the left portion 951b using a retractable cord 909b. The retractable cord 909b is preferably long enough for the user to remove the removable tube 981b and direct a camera positioned on the removable tube 981b towards any object.

A benefit of the smart necklace 900b is that the removable tube 981b cannot become lost. If a user removes the removable tube 981b in order to enhance detection of information and the user forgets to reattach the removable tube 981b, the removable tube 981b will still be attached to the smart necklace 900b.

Figure 10A:
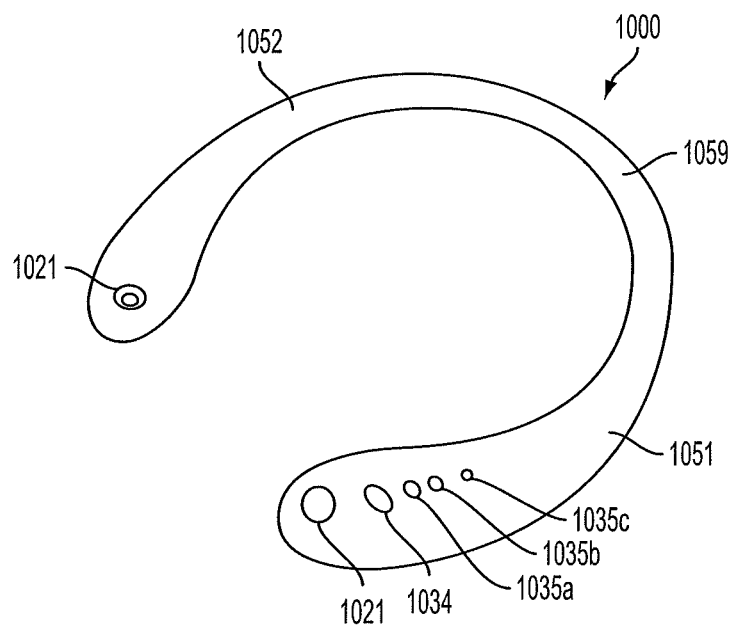
FIG. 10A is a view of a smart necklace with status indicators according to an embodiment of the present invention.

FIG. 10A is a view of a smart necklace 1000 with indicators 1035, according to an implementation of the present disclosure. The smart necklace 1000 corresponds to the smart necklace 100, and has similar components as the smart necklace 100, which are located within the left portion 1051, the right portion 1052, and the band 1054. The smart necklace 1000 includes a stereo cameras pair 1021 distributed between the left portion 1051 and the right portion 1052. The left portion 1051 also includes a button 1034 and three indicators 1035. The button 1034 and/or one or more indicators 1035 may be positioned on the right portion 1052 instead of the left portion 1051.

The button 1034 may act as an input to the smart necklace 1000. The button 1034 may function as a power button for turning the smart necklace 1000 on and off. A press of the button 1034 may also serve other purposes, such as signaling to the smart necklace 1000 that a verbal instruction will be provided from the user, changing modes of operation of the smart necklace 1000, etc.

The indicators 1035 may be LEDs that are capable of displaying one or more colors. The indicators 1035 can provide information about the status of the smart necklace. One indicator 1035a may indicate a power status of the smart necklace 1000. Another indicator 1035b may indicate a mode of operation of the smart necklace 1000. Another indicator 1035c may indicate connectivity to a remote device, such as a smartphone, a smart watch, a tablet, etc. Any of the indicators 1035 may indicate the information mentioned above or any other information, such as wireless connection strength or status, a malfunction within the smart necklace 1000, a volume setting of the smart necklace 1000, or the like.

Figure 10B:
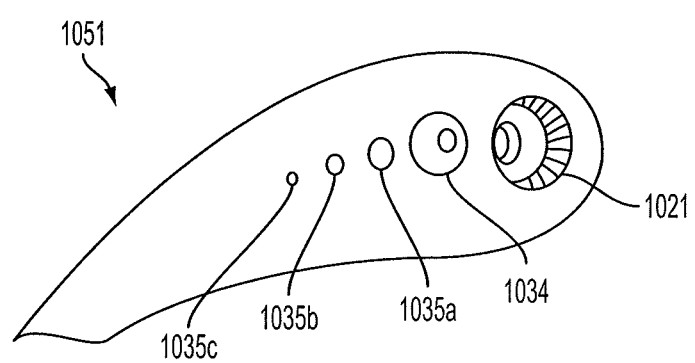
FIG. 10B is a view of a left or right portion of a smart necklace having status indicators and at least one camera according to an embodiment of the present invention.

FIG. 10B is an enlarged view of the left portion 1051 of the smart necklace 1000 including indicators 1035 and one camera from the stereo camera pair 1021 according to an implementation of the present disclosure. As illustrated, the camera from the stereo camera pair 1021 is positioned distal to the band 1081 on the left portion 1051. Towards the band 1081 from the camera from the stereo camera pair 1021 is the button 1034. The indicator 1035a is positioned towards the band 1081 from the button 1034. The indicator 1035b is positioned further the band 1081 from the indicator 1035a, and the indicator 1035c is positioned towards the band 1081 from the indicator 1035b.

It may be desirable for the indicators 1035 to be adjacent. This allows the display of information to be central to a particular location, so that all display information can be gathered by looking at one location of the smart necklace 1000. It may be desirable for the indicators 1035 to be not visible. They may become disturbing to others, such as during a movie at a movie theatre, at a nice restaurant, etc. To prevent this disturbance, the indicators 1035 may be positioned at a location where they are not visible to others. By grouping the indicators 1035 together, it may be easier to conceal the indicators 1035.

Figure 11:
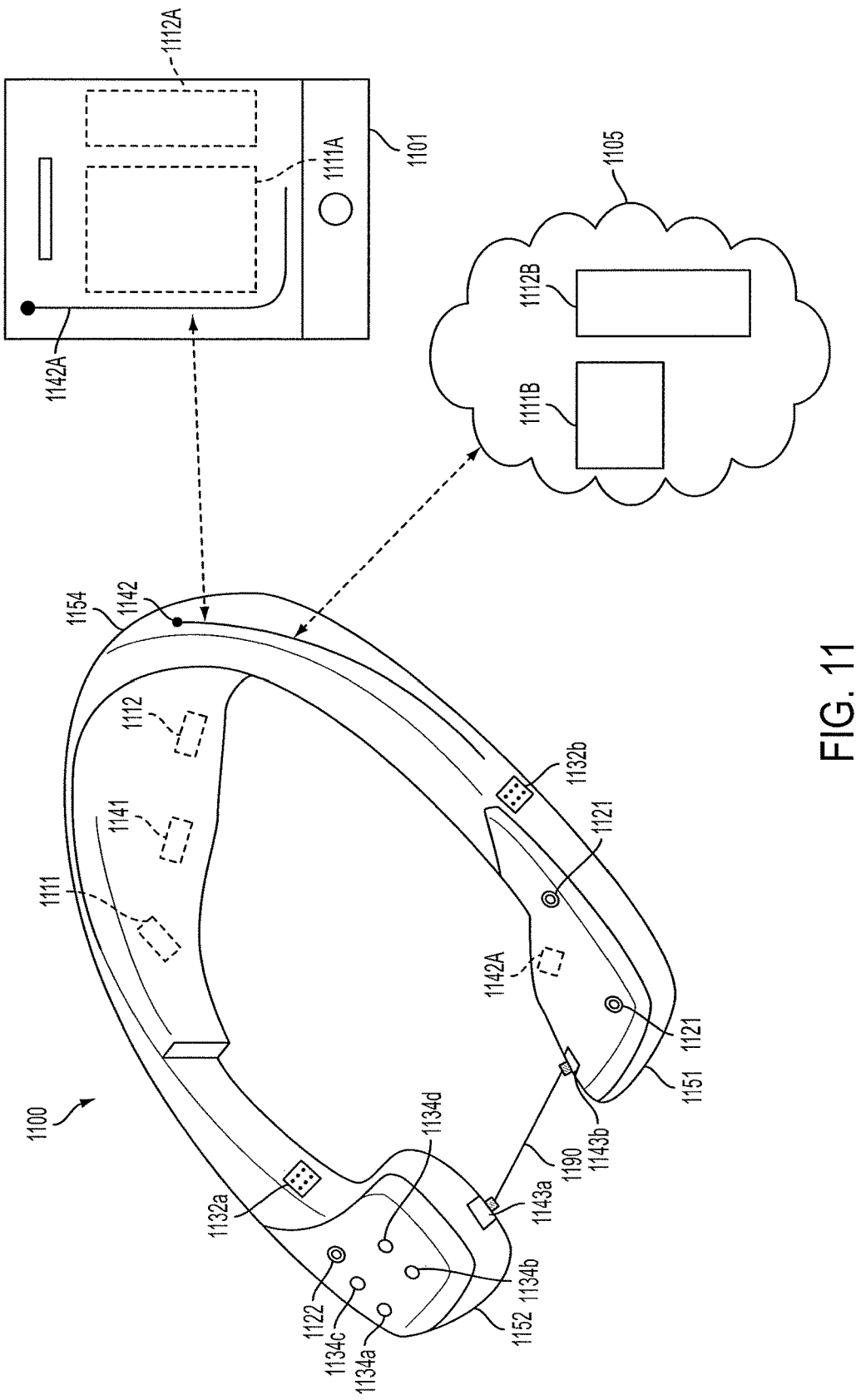
FIG. 11 is a view of a smart necklace with additional back-space for integrated electronics according to an embodiment of the present invention.

FIG. 11 is a view of a smart necklace with additional back-space for integrated electronics. The smart necklace 1100 corresponds to the smart necklace 100, and has similar components as the smart necklace 100, which are located within the left portion 1151, the right portion 1152, and the band 1154. The components illustrated on the left portion 1151 may instead be positioned on the right portion 1152, and the components illustrated on the right portion 1152 may instead be positioned on the left portion 1151. Additional components that are not illustrated may be positioned on the smart necklace 1100, and some of the components illustrated on the smart necklace 1100 may be removed.

The band 1154 may be enlarged as compared to other embodiments illustrated herein. The enlarged band 1154 may provide additional space for components to be positioned. The enlarged band 1154 may also provide additional comfort to the user. For some users, a skinny band may result in an uncomfortable amount of force being applied to a small area of the user's neck. By enlarging the band 1154, more surface is provided such that the weight of the smart necklace 1100 is distributed across a larger portion of the user's neck.

The enlarged band 1154 also provides additional space to house components. This additional space can improve the weight distribution within the smart necklace 1100. If most or all components were positioned on the right portion 1152 and the left portion 1151 and not the band 1154, then most of the weight would be towards the front of the smart necklace 1100. This may be uncomfortable for the users, and may result in too much swinging of the necklace. By distributing the weight between the front and the back, the smart necklace 1100 will be more comfortable to wear and will rest on the user's neck more easily.

As illustrated, the band 1154 includes a processor 1111, a memory 1112 and a battery 1141. Additional components may be positioned on the band as well. The components positioned on the band 1154 may be positioned such that the weight is evenly distributed about a center line that extends from the band 1154 through the middle of the left portion 1151 and the right portion 1152.

The left portion 1151 may include a flattened surface that is distal to the band 1154. The left portion 1151 includes stereo cameras 121. Also included in the left portion 1151 is a left speaker 1132*b*. The left portion 1151 also includes a Bluetooth interface 1142A for facilitating wireless communications with any Bluetooth capable device, such as a cellphone, a laptop, a Bluetooth headset, etc. Also included in the left portion 1151 is an I/O port 1143*b*. The I/O port 1143*b* may be any port capable of receiving and transmitting data, such as a USB port, a mini-USB port, an HDMI port, or the like.

The right portion 1152 includes a right speaker 1123*a*. The right speaker 1123*a* may communicate with the left speaker 1123*b* such that the speakers can provide stereo audio. Also included is a camera 1122. The camera 1122 may be a wide angle camera, such as one capable of capturing data across a 120 degree field of view.

The right portion 1152 (or in various embodiments, the left portion 1151) may include a surface that is at least partially flattened. The surface may include buttons 1134. Because the surface is flattened, user interaction with the buttons 1134 may be easier. In a preferred embodiment, the buttons 1134 may each correlate to a mode of operation of the smart necklace 1100, such that when one of the buttons 1134 is pressed, the smart necklace 1100 operates in a particular mode. In various embodiments, a user may scan through the modes in other manners, such as repeated clicking of one of the buttons 1134, repeatedly clicking one of the buttons 1134 to scroll in one direction and another of the buttons 1134 to scroll in the other, voice commands or the like.

Using the one-button-per-mode system provides simplified user input. In many situations, it may be preferred for the user to be able to switch modes without drawing attention to himself. By learning the location of the buttons 1134 and which mode of operation each button causes, the user can quietly and easily select a preferred operating mode without drawing attention of other people around him. Situations may also arise where it would be difficult for the smart necklace 1100 to understand the user's voice over the ambient noise. This one-button-per-mode system prevents this issue, as no speaking may be required of the user.

The smart necklace 1100 may operate in four modes: explorer mode, scan mode, find mode and capture. While in the explorer mode, the smart necklace 1100 provides data to the user associated with the surroundings of the user. In some embodiments, the smart necklace 1100 may describe data collected by the stereo cameras 1121, the camera 1122 and/or any other sensor to the user. In some embodiments, the smart necklace 1100 may only described data that is collected while the user is moving (i.e., the field of view of the stereo cameras 1121 and/or the camera 1122 is changing). The data may only be certain data, such as hazards, whether a friend of the user is passing by, whether a user's favorite restaurant is detected, etc.

While in the scan mode, the smart necklace 1100 may describe everything that is in the field of view of the stereo cameras 1121, the camera 1122 and/or any other sensor. For example, the smart necklace 1100 may describe everything in the field of view, such as by telling the user that object X is at your 10:00, object Y is at your 11:00, objects Z and W are at your 12:00, etc. The smart necklace 1100 may operate in the scan mode even if it is not in motion and/or being worn. For example, the user could place the smart necklace 1100 in a charging dock or in any other position in which the smart necklace 1100 could capture data with the stereo cameras 1121 and/or the camera 1122. The smart necklace 1100 could then continue to describe information that is in the field of view of the stereo cameras 1121 and/or the camera 1122.

While in the find mode, the smart necklace 1100 can navigate the user to a desired object, place, person, etc. The user can provide data about the desired object, place, person, etc., such as by speaking the name of the object, place, person, etc. The smart necklace 1100 can then determine the location of the object, place, person, etc. and provide navigation directions to the user.

The capture mode may allow the smart necklace 1100 to store its current position in the memory 1112 so that it can guide the user back to the same location at a later time. The capture mode may include 2 instructions—capture and return. Capture stores the position information (and possibly any obstacles that may arise during a return trip to the position) while return causes the smart necklace 1100 to provide navigation instructions to the user for a return to the position. In various embodiments, a single press of the capture button may indicate the capture instruction and a double click indicates the return instruction.

The right portion 1152 includes an I/O port 1143*a*. The I/O port 1143*a* may be any port capable of receiving and transmitting data, such as a USB port, a mini-USB port, an HDMI port, or the like. A strap 1190 may also be provided. In various embodiments, the strap 1190 may electrically connect the components positioned on the left portion 1151 to the components positioned on the right portion 1152 via the I/O ports 1143. The electrical connection between the left portion 1151 and the right portion 1152 may increase robustness of the smart necklace 1100. By allowing the components on the left portion 1151 to communicate with the components on the right portion 1152 via a shorter path (i.e., the strap 1190), the components may become better synchronized. This may allow for faster data processing as well as more synchronized stereo output of the speakers 1132 and/or vibration units 1133.

The strap 1190 may physically attach to the left portion 1151 and/or the right portion 1152 via a snap connector, a magnetic connection, a buckle or the like. This physical connection may increase stability of the smart necklace 1100. The strap 1190 may act as a safety against the smart necklace 1100 falling off of the user and becoming damaged. The strap 1190 may also help to stabilize the smart necklace 1100 so that the smart necklace does not shift while the user is in motion.

In various embodiments, the strap 1190 may provide only a physical connection or only an electrical connection.

The smart necklace 1100 also includes an antenna 1142. The antenna 1142 may be adapted to communicate wirelessly with another smart device 1101, a cloud 1105, a tablet or the like.

The smart device 1101 may include a processor 1111A, a memory 1112A and an antenna 1142A. The antenna 1142A may be adapted to communicate with the antenna 1142 of the smart necklace 1100. The smart necklace 1100 may take advantage of the connection to the processor 1111A and/or the memory 1112A of the smart device 1101. For example, the smart necklace 1100 may cause the processor 1111A to perform some or all of the processing normally performed by the processor 1111. Additionally, the smart necklace 1100 may use the memory 1112A for storage instead of or in addition to the memory 1112. In some embodiments, the smart necklace 1100 does not include the processor 1111 and/or the memory 1112 and relies solely on the remote device 1101 for processing and storage.

The cloud 1105 may include a processor 1111B and a memory 1112B. The antenna 1142 may be able to communicate with the cloud 1105. The smart necklace 1100 may take advantage of the connection to the processor 1111B and/or the memory 1112B of the cloud 1105. For example, the smart necklace 1100 may cause the processor 1111B to perform some or all of the processing normally performed by the processor 1111. Additionally, the smart necklace 1100 may use the memory 1112B for storage instead of or in addition to the memory 1112. In some embodiments, the smart necklace 1100 does not include the processor 1111 and/or the memory 1112 and relies solely on the cloud 1105 for processing and storage.

Figure 12:
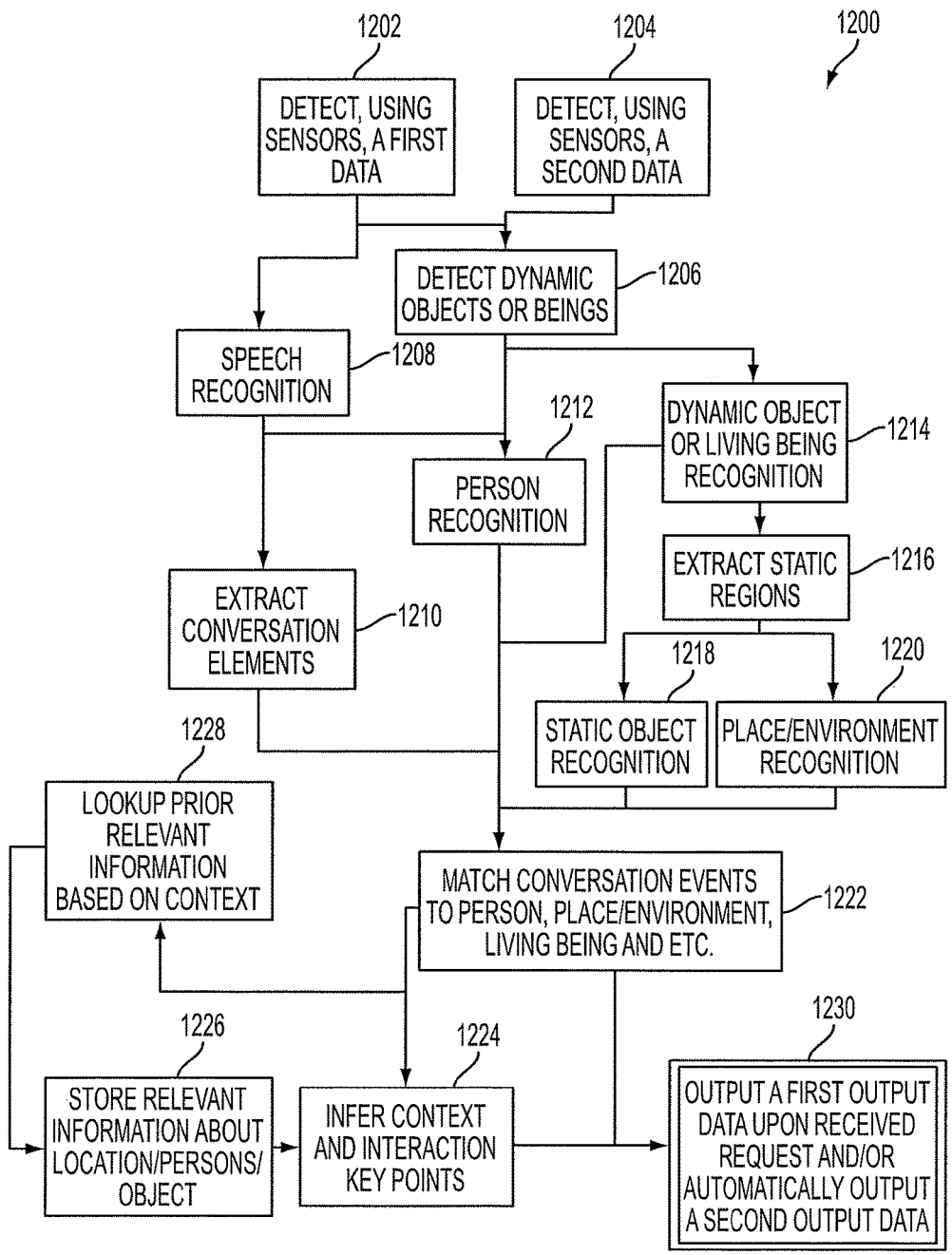
FIG. 12 is a flowchart for outputting first and/or second output data for providing assistance or navigation information to a user of a smart necklace according to an embodiment of the present invention.

FIG. 12 illustrates an exemplary method 1200 for human interaction using the smart necklace 100. The method 1200 is only an example of the detection and analysis or processing of the first detected data and/or the second detected data. The blocks of method 1200 may be performed simultaneously or in various combinations of orders. In blocks 1202 and 1204, the first data and the second data are detected using the camera 122 (including the stereo cameras 121 and/or the omnidirectional camera 122) and/or additional sensor 125. The degree to which data can be collected regarding the surrounding environment of the user and matters therein may depend on what or which camera 122 and/or additional sensor 125 are available and the processing limitations of the processor 111 and/or the external device and/or cloud. As such, the method 1200 may be adjusted accordingly in real time by monitoring such limitations.

The processor 111 may work in concert with the cameras 122 (including the stereo cameras 121 and/or the omnidirectional camera 122) and/or additional sensor 125 for improving collection of the first detected data and/or the second detected data. The processor 111 may also consider whether the user or a person is requesting or attempting to convey information. For example, if a user is making a facial expression without speech to communicate with the smart necklace 100, the processor 111 can direct the speaker 132 to pose follow-up questions or inquiries in order to supplement or clarify the detected data. For example, the method 1200 may direct an output speech to be generated, thereby asking the user to clarify the facial expression. The user may then respond in a voice command clarifying the conveyed information. In other embodiments, this facial expression recognition setup may be performed by a person other than the user.

In block 1206, the method 1200 detects dynamic objects or beings. In one embodiment, the method 1200 may detect movement, changes in a scene or other dynamic regions as observed by cameras in order to focus the cameras 122 and/or additional sensor 125 on the detected dynamic regions. The processor 111 classifies the detected dynamic region as described below.

For example, detection of a person, living being, and/or a dynamic object may be performed by looking for changes in data detected by the cameras 122 and/or additional sensor 125. Changes in data received from the cameras 122 and/or additional sensor 125 may be identified by first estimating the motion of the smart necklace 100 using the GPS 124, the IMU 123 or techniques such as visual odometry which allow estimation of the motion of a camera by tracking corner or blob features between two camera frames. As such, the smart necklace 100 may identify motion in the surrounding environment of the user which does not correspond to the motion of the smart necklace 100.

Upon identifying the changing parts of the scene within the first detected data and the second detected data, the smart necklace 100 seeks to recognize the changing elements, using techniques such as "eigenfaces" and "skeletal recognition" to recognize persons and faces. Additionally, standard techniques like Support Vector Machines, Deformable Parts Model and dynamic programming can be used to learn different models for various object/person classes. The types of features that can be used in these recognition tasks can be any combination of features like SIFT (Scale-Invariant Feature Transform), SURF (Speeded Up Robust Features), Gist modeling, Sobel, Fast, and other features and/or techniques that enable the method 1200 to recognize a person, object, living being, or place/environment within a proximity of the user.

Thus, by detecting the dynamic regions, a new person entering the environment within the proximity of the user may be detected in block 1212 and a dynamic object or being can be detected in block 1206 and classified by the processor 111 accordingly. Simultaneously or thereafter, the smart necklace 100 extracts the remaining static regions in block 1216. In one embodiment, in block 1216, additional second detected data are collected from static objects in block 1218 and from an environment or place within a proximity of the user in block 1220.

The microphone 131 may communicate with a speech recognition module to detect speech, conversation or interaction as shown in block 1208. The smart necklace 100 may further extract conversation elements containing useful data in block 1210. In block 1222, the processor 111 matches extracted conversation or speech elements from block 1210 to the detected person, object, living being, place/environment, or combinations thereof.

In block 1228, the method 1200 looks up prior relevant information or learned data based on context and based on the matched conversation events from block 1222 regarding the person, object, living being, place/environment, or combinations thereof. In block 1226, the processor 111 stores relevant information for later use in the memory 112 based on prior relevant information. For example, if the processor 111 detects facial features of a person entering the environment and also detects that the new person is speaking, the speech elements can be matched with the new person. Speech data related to the person may be stored in the memory 112 for later use. The microphone 131 may include a 3-D microphone or a microphone array to localize the origin of the sound or voice. The smart necklace 100 can track and log data related to the person in order to supplement the first detected data. The method 1200 may actively and automatically output a second output data in block 1250 based on the matched conversation events to the corresponding person, place/environment, living beings, or combinations thereof of block 1222 and further based on the inferred context and interaction key points from block 1224.

The processing of data (e.g., in blocks 1206-1250) can be performed by continuously analyzing data gathered by the cameras 122 and/or additional sensor 125 in real time. The external device and/or cloud may be utilized due to restraints on the information storage capacity of the memory 112, energy capacity challenges associated with processing using solely the processor 111, and processing power limits of the processor 111. However, in one embodiment, both on-board and off-board processing capabilities are utilized to prepare for events in which the on-board processing may be preferable (e.g., a poor connection in cloud communications) to ensure a minimal level of capability. For example, if the method 1200 is implemented in a neck worn device/platform that may not have sufficient capacity to perform the blocks described herein, the external device and/or cloud can provide assistance in sharing the load of the processing.

In block 1230, the processor 111 may passively output, using the speaker 132, a first output data upon an input/request received by the processor 111 or a predetermined or scheduled event stored in the memory 112.

The processor 111 may further actively and automatically output, using the speaker 132, a second output data based on the first detected data and/or the second detected data, the previously detected, processed, and stored first and/or second data, the pre-programmed algorithm stored in the memory 112.

As discussed above, the interface array 130 communicates with the user or another person based on the detected data. The interface array 130 may communicate via the display 135 or a projection system in communication with the processor 111. The display 135 or projection system may be positioned on a remote device, such as a cellular telephone wirelessly connected to the smart necklace 100. The interface array may also communicate via the speaker 132.

The output images/videos may be displayed using an LCD, an organic light emitting display, a plasma display, light-emitting diodes, or any other display mechanism for displaying the output images/videos.

Figure 13A:
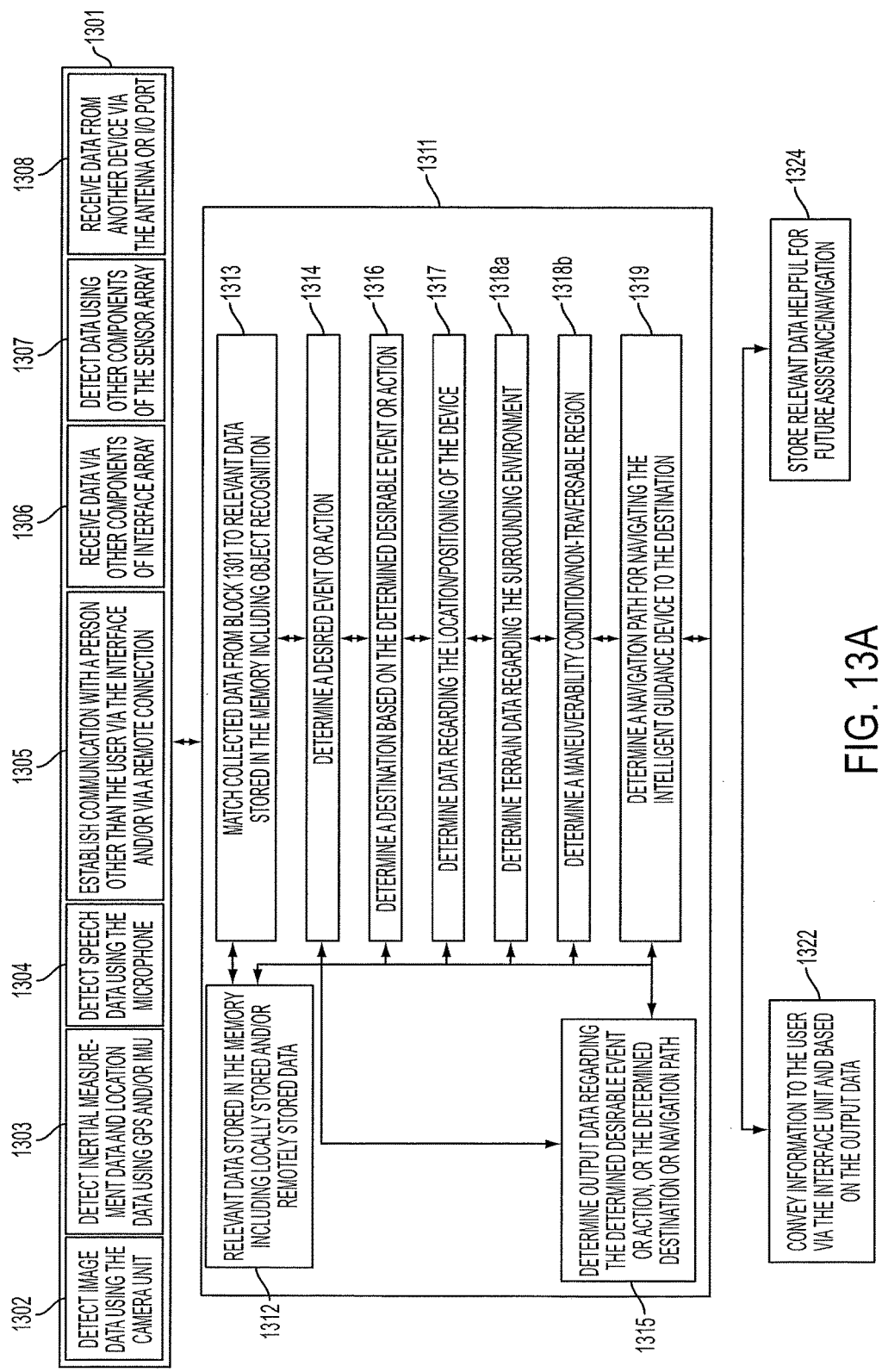
FIG. 13A illustrates an exemplary method for providing assistance or navigation information to a user of a smart necklace based on detected data according to an embodiment of the present invention.

FIG. 13A illustrates an exemplary method for navigating a smart necklace 100 and/or providing helpful information to a user of the smart necklace 100 based on detected data.

Block 1301 refers to various methods of data collection using the smart necklace 100.

In block 1302, the smart necklace 100 may detect image data using the camera 122. The image data may correspond to the surrounding environment, objects or living beings therein, the user, and/or other surrounding elements. For example, the image data may be associated with the shape of a room or objects within the room. As another example, the smart necklace 100 may detect image data including facial recognition data.

In block 1303, an IMU 123 is coupled to the platform and configured to detect inertial measurement data corresponding to a positioning, velocity, or acceleration of the intelligent navigation device. A GPS unit (GPS) 124 is configured to detect location data corresponding to a location of the intelligent navigation device.

In block 1304, speech data or audio data is detected using the microphone 131. This information may be information associated with the user, with the environment, with other people, actions, events, and various other items regarding social interaction and the surrounding environment. For example, when in a particular room, the smart necklace 100, via the interface array 130, may receive information from the user or another person, such as the type of room (i.e., "this is the living room"). As another example, a user may want to name or add information regarding a particular person. In this instance, the smart necklace 100, via the interface array 130, may receive information from the user such as to name the person (i.e., "he is Johnny"). Alternatively, the processor 111 may actively infer this information by parsing a conversation with the other person, without a user input that is directed to the smart necklace 100.

Referring to another example, the user may provide input to the smart necklace 100 that the user is performing a particular action, such as going to lunch. As another example, the user may provide input to the device that a hazard exists at the current position and a description of the hazard. Alternatively, the processor 111 may actively infer this information by parsing conversations, analyzing detected image data, etc. as discussed above with respect to FIG. 5 and as discussed further below.

The data may further include a request. This request may be, for example, a request to identify a person, identify a room, identify an object, identify any other place, navigate to a certain location such as an address or a particular room in a building, to remind the user of his current action, what color an object is, if an outfit matches, where another person is pointing or looking, etc. The output of block 1314 (determining a desirable event or action) or of block 1316 (determining a destination) can be based on the requested information. Although speech data is discussed with respect to block 1304, the information can be gathered using any combination of components of the interface array 130 and/or the sensor array 120.

In block 1305, the processor 111 may establish communication with a person other than the user via the interface array 130 and/or via a connection with a remote device. The remote connection may be established via a wireless communication antenna 142, as discussed further below.

The processor 111 may determine whether communication with a person other than the user is desirable or requested. For example, when the detected data suggests that the user requires an opinion of another person, a communication channel may be established with a device of another person. For example, when the detected speech regarding an outfit of the user, facial recognition data regarding the user being indecisive or wondering about what to wear, and/or perceived action of a user in front of a mirror indicate that the user needs fashion advice from another person, a video teleconference between the user and a friend of the user may be established. From prior conversations/interactions, the processor 111 may have previously stored a user's friend's contact information. The processor 111 may categorize types of friends of the user and recognize that this communication needs to be with a friend that the user is comfortable with. The processor 111 may output data to the user letting the user know that a video conference or teleconference will be established with the friend. The smart necklace 100 may provide a video connection to a friend of the user or send a picture of the outfit to a friend of the user. In this example, the friend may provide a response as to whether or not the outfit matches. The friend may also assist the user in finding an alternate outfit that matches.

In block 1306, data is received from the user, the environment, and/or other objects/beings via the interface array 130. For example, data may be detected from a touch-screen display 135, from a keyboard or buttons of an input device 134, or other devices capable of interfacing with the user or another person to receive input data.

In block 1307, data may be detected using other components of the sensor array 120. For example, data may be detected from the other sensors 125 as discussed above. This information may be information associated with the user, with the environment, objects within the environment, and/or with other living beings/people.

In block 1308, the smart necklace 100 may also receive data from another device using the antenna 142 or the I/O port, such as data regarding a map of a building, or any other data. Data may be shared among the smart necklace 100, other devices of the user (for example, a portable electronic device of the user such as a smart phone or tablet), a remote server, or devices of others connected and with permission to access (for example, devices of the friends of the user).

In block 1308, data is retrieved via the antenna 142 and/or I/O port 143. This data may be information indicating to the smart necklace 100 that the user should be performing a particular set of actions. For example, the user may be in a hospital. The received information may be processed real time or stored for later use in the memory 112. The information may relate to mealtimes of the user. The smart necklace 100 may then know that the user is to eat lunch at 12:00 pm in the cafeteria every day. As another example, the smart necklace 100 may access the user's cellular phone and download the user's schedule.

In block 1311, the processor 111 matches collected data from block 1301 to relevant data stored in the memory. This includes object recognition. The processor 111 recognizes an object in the surrounding environment by analyzing the detected data based on the stored object data and at least one of the inertial measurement data or the location data. The object data stored in the memory 112 can be obtained from block 1312.

In block 1312, the memory 112 stores relevant data locally and/or remotely. For example, locally stored data may be data stored in a memory coupled to the smart necklace 100. Remotely stored data may include data accessed from a remote server or another device via the antenna 142 and/or I/O port 143. A schedule of the user may be periodically transmitted to the smart necklace 100 via the antenna 142.

In block 1313, the processor 111 matches data collected in block 1301 to relevant data stored in the memory. This includes object recognition as discussed above. The processor 111 recognizes an object in the surrounding environment by analyzing the detected data based on the stored object data and at least one of the inertial measurement data or the location data. The retrieved data can include data stored in the cloud or the internet. The processor 111 determines what information is desirable to process the request. For example, if the user requested to be navigated to the living room, the smart necklace 100 may need to know where the living room is, a layout of an entire route from the user to the living room and any hazards that may be present. As another example, if the user asked if his clothes match, then the smart necklace 100 may need to know what type of clothes match, what colors match and what the user is wearing.

The processor 111 accesses the memory 112 to retrieve the information desired to process the request. For example, if the user requested to be navigated to the living room, the smart necklace 100 may retrieve the location of the living room, a layout of the route from the user to the living room and any known hazards.

The processor 111 may determine whether or not the memory 112 has sufficient helpful information regarding the detected data. For example, when the user requests walking directions between two points, and a layout of a route is not available in the memory 112, the smart necklace 100 may access the internet or the cloud via the antenna 142 and/or the I/O port 143 to retrieve this missing information.

In block 1314, the processor 111 determines a desirable event or action. The processor 111 may determine a desirable event or action based on the recognized object, the previously determined user data and a current time or day. Current day or time is relevant for determining the current desirable event, action, destination, speech, etc. as discussed below.

The smart necklace 100 may determine whether or not the user should be at a particular location and/or performing a particular action at any given time. For example, the processor 111 may match a previously stored lunch event to a current date/time (i.e., noon). The processor 111 may also match the previously stored lunch event to a time before the event. For example, if the user is to have lunch at noon somewhere that is 30 minutes away, the processor may determine a match at 11:30 am. As another example, a desirable action may be to wear certain clothes with other matching items. A desirable event may be to go to lunch if the current day/time indicates that the user in a nursing home should attend a lunch gathering event.

In block 1315, the smart necklace 100, via the interface array 130, may output data based on the inferred current desirable event, action/destination, etc. For example, if the inferred action is to find matching clothes, the processor may determine whether or not the outfit matches. As another example, if a destination is inferred, the processor may determine a viable navigation route for the user. The output may be, for example, a series of verbal phrases (i.e., step-by-step walking directions) via the speaker 132. The output may also be, for example, vibrations informing the user of the data. For example, a vibration in the left side of the smart necklace 100 may signify to turn left, a vibration in the right side of the smart necklace 100 may signify to turn right, a vibration in both sides may signify to stop, a continuous vibration in both the right and the left sides of the smart necklace 100 may signify to slow down, or any other combination of vibrations may indicate any of these or any other command.

Discussion now turns to navigation features of the smart necklace 100. In order to provide navigation information to the user, the processor 111 at least determines two sets of data: (I) data regarding positioning and/or location of the smart necklace 100 and/or the user and (II) data regarding the surrounding environment, persons, objects, living beings, etc.

Referring back to block 1302, data regarding the surrounding terrain of the smart necklace 100 is detected using the camera 122. As discussed above, the blocks in FIG. 13A are not necessarily performed in the order shown. The processor 111 may determine, for example, that further image data is required to learn about the terrain after a destination is determined. When navigating indoors, the standalone GPS units may not provide enough information to a blind user to navigate around obstacles and reach desired locations or features. The smart necklace 100 may recognize, for instance, stairs, exits, and restrooms and appropriately store them in the memory 112.

For example, the stereo cameras 121 may provide depth information of the surrounding environment and obstacles. Alternatively or in addition, one or more other cameras 122 may be utilized to provide information regarding the surrounding environment.

Referring back to block 1303, data using the GPS 124 and/or the IMU 123 is detected. This data can be used along with data obtained from the camera 122 to gain an understanding of the terrain.

In blocks 1317, 1318a, and 1318b, the processor 111 analyzes data obtained using the camera 122 based on the data obtained from the GPS 124 and/or the IMU 123, and vice versa. In block 1317, information set (II) can be used to gain a better/more accurate understanding of the information set (I) and vice versa.

In block 1317, the processor determines data regarding the location or positioning of the smart necklace 100 using at least one of image data, inertial measurement data obtained using the IMU 123, location data obtained using the GPS 124, and relevant stored data (for example, map data stored in the memory 112).

In block 1318a, the processor 111 may analyze features of images collected using the camera 122 and recognize the environment objects using object recognition. For example, data collected by the IMU 123 can be used to determine the amount and speed of movement to improve accuracy of detection using data collected by the camera 122. In addition, the IMU 123 may indicate a direction in which the collected information is located. For example, if the IMU 123 indicates that the information is regarding objects from a direction above the smart necklace 100, the processor 111 can determine that the surface is more likely to be ceiling than ground.

In addition, data collected using the GPS 124 can enhance identification of data collected by the camera 122. For example, if the camera 122 provides an image of the building, the processor 111 can determine if the building is detected correctly by utilizing data regarding the location of the user in the world, because building types differ in different parts of the world.

The GPS information may be inadequate because it may not provide sufficiently detailed information about the surrounding environment. However, the GPS information can be utilized along with visual data from the camera 122 to draw inferences that are helpful to the user. For example, if the GPS information indicates that the smart necklace 100 is currently inside a building, and the camera 122 provides information regarding an object, the processor 111 can limit its search to objects that would rationally be inside the building. For example, if an image provided by the camera 122 appears like a truck, the processor 111 can rule out the possibility that the object is a truck based on the GPS information. In other words, it is more likely to be an image of a poster of a truck, because the poster can rationally be within a building and a truck cannot. The GPS 124 provides location information, which along with the inertial guidance information, including velocity and orientation information provided by the IMU 123, allows the processor 111 to help direct the user.

The memory 112 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the camera 122 may passively recognize additional points of interest and update the map data.

In block 1316, the processor 111 determines a desired destination based on the determined desirable action or event.

For example, the smart necklace 100 may direct the user to an empty seat, or may remember the user's specific seat in order to navigate the user away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks.

In block 1318b, based on the analyzed data, a maneuverability condition/non-traversable region is detected. For example, a non-traversable region may be a region where the user cannot safely travel, such as a tar pit.

In block 1319, the processor 111 determines a path over which the user can travel. The path excludes the detected non-traversable regions in block 1318b. The smart necklace 100 may determine paths for navigation, which may be further modified for the user's needs. For example, a blind person may prefer routes that follow walls. Using the IMU 123 and/or the GPS 124 and other sensors, the smart necklace 100 can determine the user's location and orientation to guide them along the path, avoiding obstacles.

For example, the path may be towards a desired object (empty chair) as discussed above. The smart necklace 100 may identify obstacles or paths for the user, and based on either the speed of the traveler or the intended direction of the traveler, be able to filter down what the significant obstacles or potential paths are. The smart necklace 100 may then guide the user based on those significant obstacles or paths. Guidance may be, for example, auditory feedback or vibratory feedback, for either the path or objects to avoid.

In block 1322, the output data from block 1315 may be conveyed to the user using various outputs of the interface array 130. Multimode feedback is provided to the user to guide the user on the path. This feedback is also provided to guide the user towards the desired destination/object and is presented via a combination of speech, vibration, mechanical feedback, electrical stimulation, display, etc. With blind users, the processor 111 may keep the range of vision in mind when outputting information. A blind or partially blind person can identify most of the things that are less than three feet away using a cane. Objects and other items of interest more than 30 feet away may not be of utmost importance because of the distance.

While travelling along the path, the smart necklace 100 may inform the user about signs or hazards along the path. The vibration unit 133 and/or the speaker 132 provide audio and haptic cues to help guide the user along the path. For example, the speaker 132 may play a command to move forward a specified distance. Then, special audio tones or audio patterns can play when the user is at a waypoint, and guide the user to make a turn by providing additional tones or audio patterns. A first tone, audio pattern or vibration can alert the user to the start of a turn. For example, a single tone or a vibration from a left smart necklace may indicate a left turn. A second tone, audio pattern or vibration can alert the user that the turn is complete. For example, two tones may be provided, or the vibration may stop so that a left device ceases to vibrate, when the turn is complete.

Different tones or patterns may also signify different degrees of turns, such as a specific tone for a 45 degree turn and a specific tone for a 90 degree turn. Alternatively or in addition to tones and vibrations, the smart necklace 100 may provide verbal cues, similar to a car GPS navigation command. High level alerts may also be provided through audio feedback. For example, as the smart necklace 100 reaches a predetermined distance—such as a foot or other value which may be stored in the memory 112 and may be adjusted—from an obstacle or hazard, the speaker 132 and/or the vibration unit 133 may provide audible alerts. As the smart necklace 100 gets closer to the obstacle, the audible alerts and/or vibrations may increase in intensity or frequency.

As an example of the method illustrated in FIG. 6A, the user may give a voice command, "Take me to building X in Y campus." The smart necklace 100 may then download or retrieve from memory a relevant map, or may navigate based on perceived images from the camera 122. As the user follows the navigation commands from the smart necklace 100, the user may walk by a coffee shop in the morning, and the smart necklace 100 would recognize the coffee shop. The smart necklace 100 may use this recognition and the time of day, along with the user's habits, and appropriately alert the user that the coffee shop is nearby. The smart necklace 100 may verbally alert the user through the speaker 132. The user may use the input device 134 to adjust settings, which for example may control the types of alerts, what details to announce, and other parameters which may relate to object recognition or alert settings. The user may turn on or off certain features as needed.

FIG. 6B illustrates an exemplary method for providing assistance to a user of the smart necklace 100 based on an inferred current desirable event, action, destination, etc. In block 1350, data is retrieved from the memory 112 and/or via the antenna 142 and/or the I/O port 143. This data may be information indicating to the smart necklace 100 that the user should be performing a particular set of actions. For example, the user may be in a hospital. In this example, let's assume that the memory 112 includes information related to mealtimes of the user. The device may then know that the user is to eat lunch at 12:00 pm in the cafeteria every day. As another example, the user may inform the smart necklace 100 of his/her schedule. For example, the user may inform the device that he/she has a meeting at 5:00 PM this Friday at 600 Anton Blvd.

In block 1352, the smart necklace 100 may determine whether or not the user should be at a particular location and/or performing a particular action at any given time. If not, the process may return to block 1350. If so, the process may proceed to block 1354.

In block 1354, data associated with the current actions of the user is detected by the sensor array 120. For example, the GPS 124 and/or the IMU 123 may sense that the smart necklace 100 is traveling towards the cafeteria or towards 600 Anton Blvd. As another example, the microphone 131 may detect data indicating that the user is busy talking to another person.

In block 1356, it is determined whether the current actions of the user match the particular set of actions from block 1350. For example, if the user is not moving towards the cafeteria and he is supposed be at lunch in 5 minutes, the current actions do not match the particular actions. If the current actions do match the particular actions from block 1350, then the process returns to block 1354 to ensure that the user continues to perform the particular actions.

In block 1358, the user is informed of the particular actions via the interface array 130. For example, if the device is travelling away from the cafeteria, the smart necklace 100 may provide data to the user that he should be going to lunch now. If the user does not begin the particular set of actions retrieved in block 1350, then the smart necklace 100 may again notify the user after a predetermined amount of time. However, the smart necklace 100 may have learned when the user does not want to be interrupted. For example, the user may not want to be interrupted during a conversation. If the microphone 131 detects that the user is having a conversation, the smart necklace 100 may wait until after the conversation to inform the user.

The smart necklace 100 may determine, via the interface array 130, whether or not the user needs more information. The smart necklace 100 may have previously learned preferences of the user, such as if he is wobbling back and forth, he requires directions. The smart necklace 100 may also request navigational information. For example, the user may request directions to the cafeteria. The user can provide data to the smart necklace 100 via the interface array 130 that he does or does not need more information. If the user does not require additional information, the process proceeds to block 1364.

In block 1364, the processor 111 determines whether or not the particular set of actions from block 1350 is complete. If the particular actions are complete, then the process ends. If the particular actions are not complete, then the process returns to block 1354.

Figure 13B:
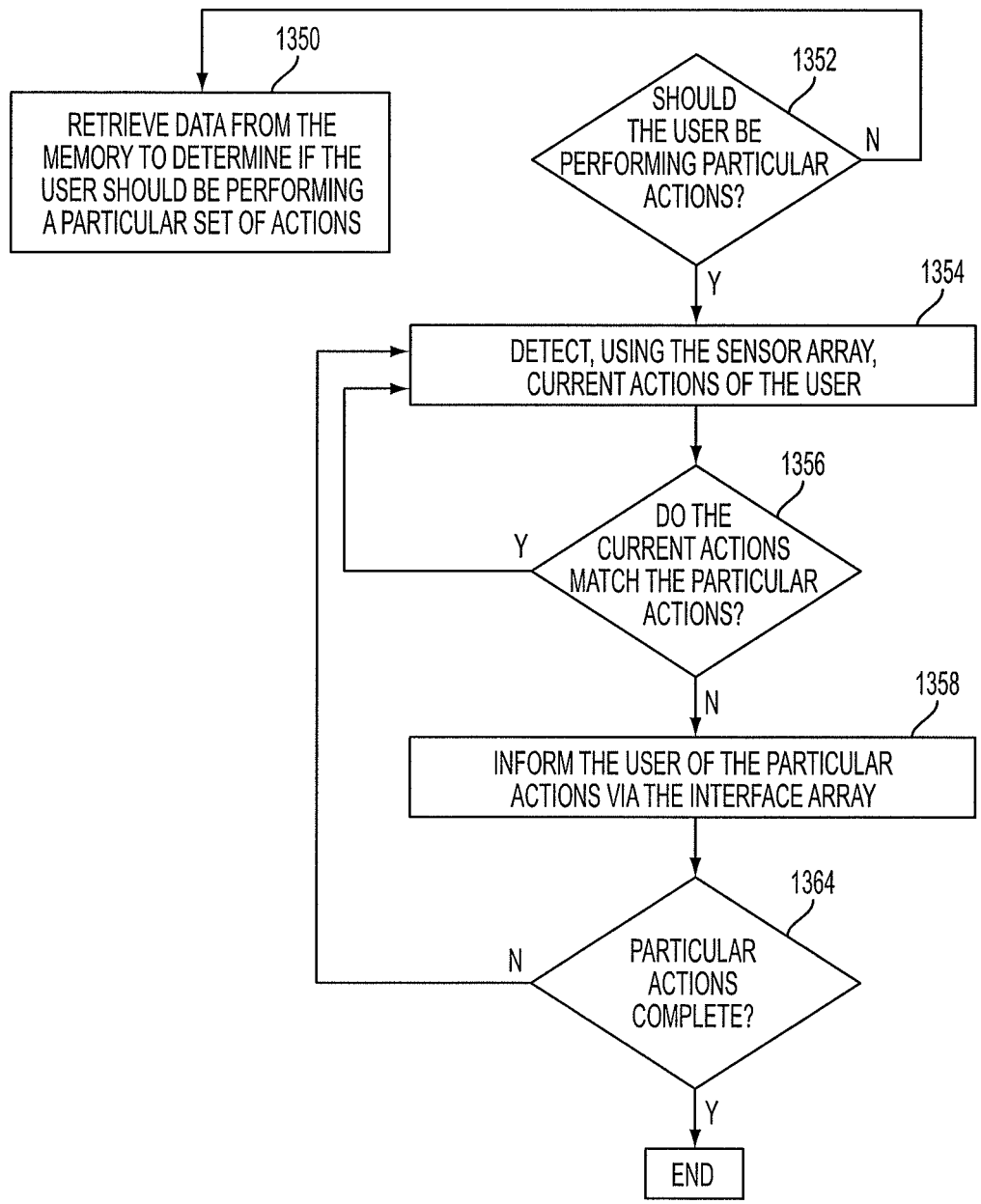
FIG. 13B illustrates an exemplary method for providing assistance or navigation information to a user of a smart necklace based on a determined desirable event, action, and/or destination according to an embodiment of the present invention.

An example of the process in FIG. 13B will now be provided. Assume that the user is supposed to be in the cafeteria for lunch. The smart necklace 100 may determine that the user is supposed to be in the cafeteria and that the user is not moving towards the cafeteria. The smart necklace 100 may then, via the interface array 130, provide feedback to the user, such as audio feedback that says, "time to go to lunch." The user may then return feedback to the smart necklace 100, such as "I'm not ready yet" or "let's go." If the user is not yet ready, the smart necklace 100 may remind the user again that it is lunch time after a predetermined amount of time. When he is ready, the user may provide data to the smart necklace 100 that he is ready to go.

The smart necklace 100 may then request feedback from the user to determine whether he needs directions or not. If the user responds no, then the smart necklace 100 may not provide any current information. However, if the user responds yes, then the smart necklace 100 may navigate the user to the cafeteria. The smart necklace 100 may also be configured so that it communicates with another device. For example, the smart necklace 100 may provide data to a terminal in the cafeteria that the user is on his way for lunch, so that his food can be prepared and a seat ready for him when he arrives. As the user arrives, the smart necklace 100 may provide additional data to the user such as where his table is and who he is sitting with.

In some embodiments, the smart necklace 100 may learn preferences of the user. For example, it may learn what chair the user normally sits at for lunch. In this example, the smart necklace 100 may determine where the user's normal lunchtime chair is. To do so, it may use sensed visual data from the camera 122, position data from the GPS 124, the IMU 123 and/or any other detected data, as well as shape analysis as described above in regards to FIG. 2. Once the smart necklace 100 determines where the chair is, it may guide the user to the chair so that the user can safely get to the chair and sit down.

Figure 14:
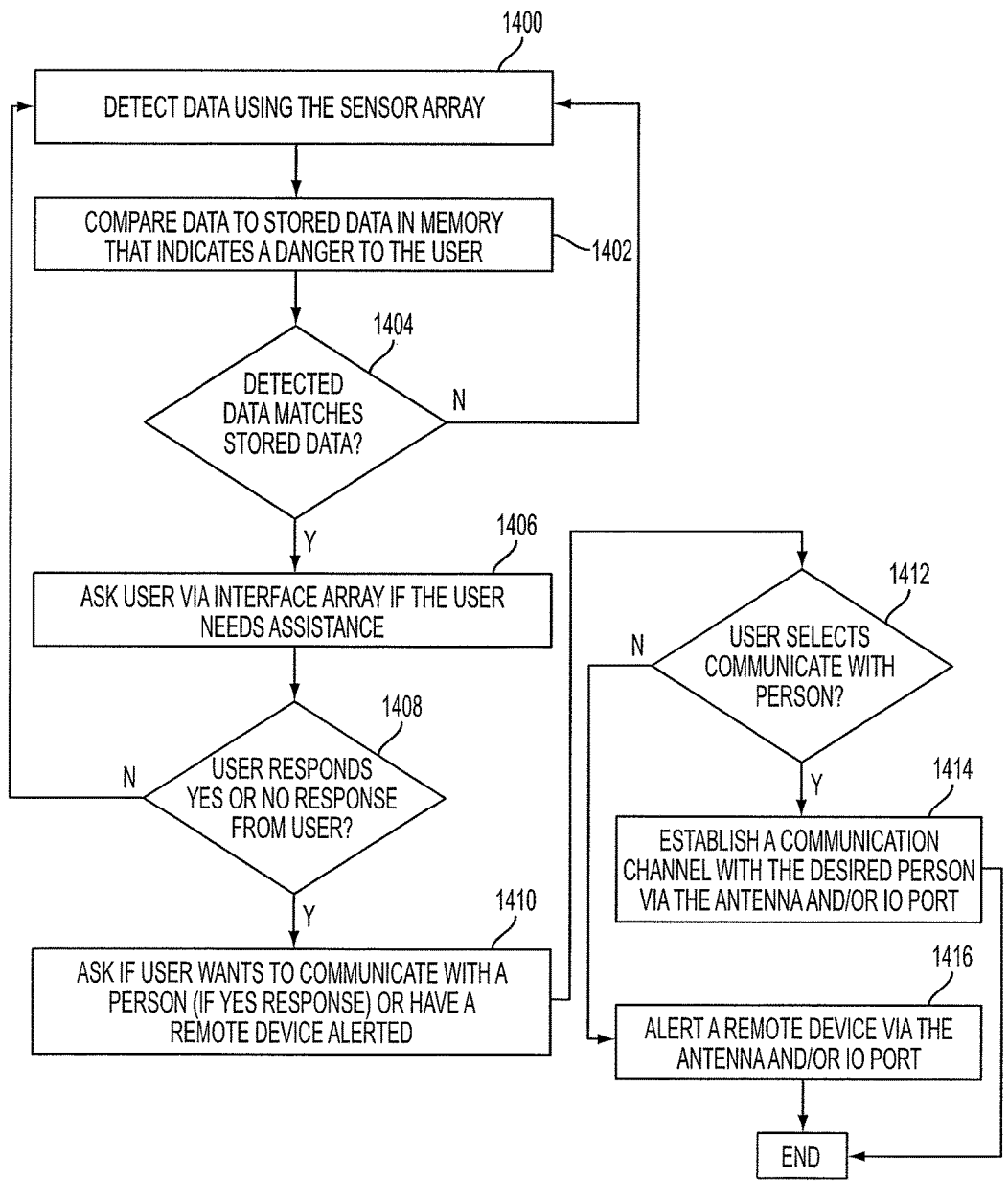
FIG. 14 illustrates an exemplary method for danger assistance by a smart necklace according to an embodiment of the present invention.

FIG. 14 illustrates an exemplary method of danger assistance by the smart necklace 100. In block 1400, data is detected by the sensor array 120. This data may be visual data, position data, or any other data that the sensor array can sense. For example, the IMU 123 may detect data indicating that the user has fallen down or that the user is in an upside down position. The camera 122 may detect visual data such as a large object extremely close to the lens. The sensor array 120 may detect any other information such as data indicating a fire or a flood.

In block 1402, the detected data is compared to data indicative of danger stored in the memory 112. This data in the memory 112 may be, for example, data associated with a falling motion of a user. The data may also be, for example, data associated with an object falling on the user. The processor 111 compares the data indicative of danger from the memory 112 to the detected data to determine if there is a match. For example, if detected data matches data indicating that a large object has fallen on the user, then a match exists.

In block 1404, if no match exists between the data indicative of danger and the detected data, then the process returns to block 1400 where data continues to be detected. If, however, a match does exist, then the process proceeds to block 1406. In block 1406, the smart necklace 100 requests that the user provide information such as whether the user is ok. The user may provide this information via the interface array 130. This information may be, for example, a spoken "yes, I am ok," or "no, I am not ok."

In block 1408, it is determined whether the user responded that he needs assistance, responded that he does not need assistance, or did not respond at all. If the user responded that he does not need assistance, then the process returns to block 1400. If the user responded that he does need assistance or if the user did not respond to the inquiry, then the process proceeds to block 1410.

In block 1410, the smart necklace 100 may, via the interface array 130, request that the user provide information about whether the user wants to communicate with a person or to have a remote device alerted.

In block 1412, it is determined whether or not the user selected to communicate with a person. If the user selected to communicate with a person, then in block 1414, a communication channel may be established between the user and the desired people/person. Additionally, the user may select whom he wants to speak with. For example, he may wish to contact his personal physician, the police, a friend, or any other person or service. The smart necklace 100 may also have learned with whom to open a communication channel. For example, if fire data is detected, the smart necklace 100 may open a communication with a fire department or "911" call center.

The communication may be established, for example, by connecting the smart necklace to a cellular device via the antenna 142 and/or the I/O port 143. After the connection is established, the smart necklace 100 may cause the cellular device to place a video call or a voice call to the requested person or institution. The microphone 131 of the smart necklace 100 may act as the microphone for the cellular device and the speaker 132 of the smart necklace 100 may act as the speaker of the cellular device. Once the communication is established, the user may communicate with the requested person and provide information. The smart necklace 100 may also provide information to a device on the other end of the communication, such as any data associated with the danger, any location data, etc. Any information may also be communicated via a Wi-Fi, Bluetooth, etc. element of the smart necklace 100. For example, the smart necklace 100 may establish a VoIP connection via Wi-Fi.

If, in block 1412, the user did not select to communicate with a person, or the user did not respond, the process may proceed to block 1416. In block 1416, a remote device is alerted of the danger via the antenna and/or the I/O port. This alert may consist of any data captured around the time of the incident, any location data, etc. The alert may be communicated by a connection to a cellular device via the antenna 142 and/or the I/O port 143, Wi-Fi, Bluetooth, etc.

Figure 15A:
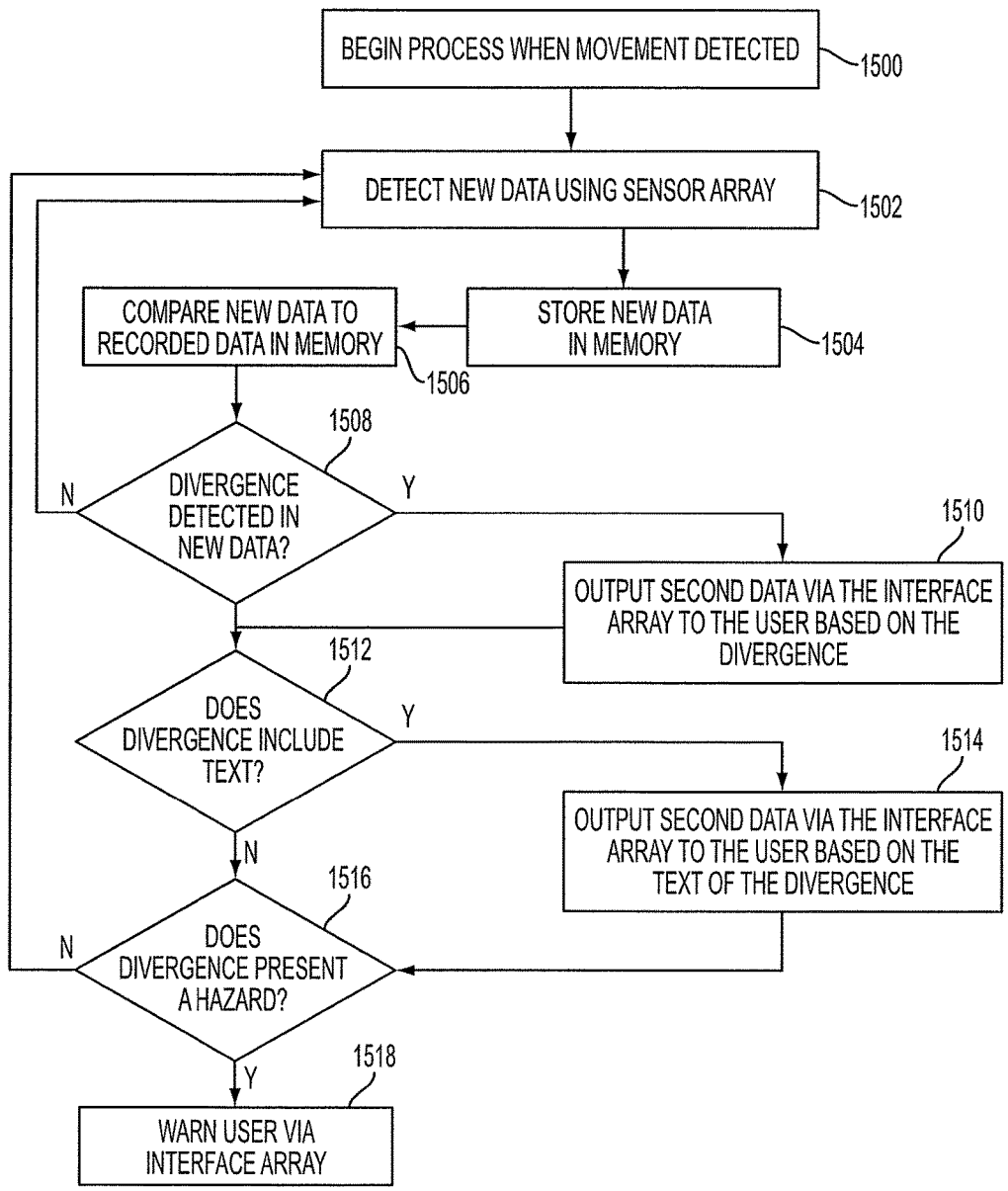
FIG. 15A illustrates an exemplary method for safety monitoring and alerting using a smart necklace according to an embodiment of the present invention.

FIG. 15A illustrates an exemplary method for safety monitoring and alerting. The process begins in block 1500 when movement is detected by the smart necklace 100. This movement may be detected, for example, by the IMU 123 or the GPS 124. After the process begins, in block 1502, new data is detected by the smart necklace using the sensor array 120. This data may include any data detected by the sensor array 120, such as visual data (streets, sidewalks, people), position data (location of the user, direction of travel), audio data (such as a moving car sound, a siren, an alarm), or any other data. In block 1506, this new data is stored in the memory 112.

In block 1506, this new data is compared to data recorded in the memory 112. The data recorded in the memory 112 may include data captured at the same location at a previous time. The data recorded in the memory 112 may also include data captured at the same location or nearby at a time prior to the current time, such as milliseconds, seconds, or minutes prior to the current time. The processor may make this comparison using the object recognition method of FIG. 2.

In block 1508, it is determined whether or not a divergence is detected between the new data and the data recorded in the memory 112. This divergence may include, for example, data indicating that a new object is in the field of view of the smart necklace 100 that was not previously detected. A divergence may also include, for example, that a previously-present object is no longer in the field of view. The divergence may also include, for example, a new sound, such as a police siren.

In block 1510, if a divergence is detected in the new data, a second data may be output to the user via the interface array 130 based on this divergence. As an example, let's assume that a divergence includes a boulder in the middle of the sidewalk. In this example, the smart necklace 100 may provide data to the user indicating the divergence. For example, the smart necklace 100 may, using the speaker 132, inform the user that an object matching the shape of a boulder is 10 feet directly ahead of the user. Alternately or additionally, the smart necklace 100 may provide haptic feedback to the user based on the divergence.

In block 1512, it is determined whether or not the divergence includes text. For example, the divergence may be a sign or police tape including text. The processor 111 may make this determination by comparing the new detected data to data indicating the shape of text characters to determine if any matches exist.

In block 1514, it is determined that the divergence includes text, then the smart necklace 100 may output data to the user via the interface array 130 based on the text of the divergence. For example, the data may include audio data indicating the content of the text of the divergence.

In block 1516, it is determined whether or not the divergence presents a hazard. The memory 112 may have stored data which can be compared to detected data in order to determine if a divergence is hazardous. For example, the memory 112 may have stored therein visual data associated with a bobcat and an indicator that a bobcat is hazardous. As another example, the memory 112 may have stored therein visual data associated with the shape of a caution sign and the word caution, and that this data is an indicator of a hazard.

As another example, instead of having data representing a dangerous object, the memory 112 may store situational data. An example of situational data is that the smart necklace 100 may recognize that if a large object is in the middle of a sidewalk that the user is walking along, the object may present a hazard. Another example of situational data is that the smart necklace may recognize that if visual data of an area had been previously sensed and stored, and the visual data of the area is significantly different in the present sensing of the area, then a danger may exist.

In block 1518, if it is determined that the divergence does present a hazard, the smart necklace 100 may warn the user via the interface array 130. The warning may include, for example, an output via the speaker 132 informing the user that a hazard exists and the location of the hazard. The smart necklace 100 may also output, for example, the type of hazard. If the smart necklace 100 detected a caution sign that read "potholes in the sidewalk," then the smart necklace 100 may output data to the user informing the user that potholes exist in the sidewalk. The smart necklace 100 may also inform the user of the locations of the potholes as the smart necklace 100 detects them. In some embodiments, the smart necklace 100 may provide vibrational data to the user via the vibration unit 133. For example, as the user approaches a hazard, the vibration unit 133 may produce increasingly frequent vibrations.

Next, it is determined whether or not more movement of the smart necklace 100 is detected. If no more movement is detected, then the user is standing still and the process may end. If movement is detected, then the process may return to block 1502. If the process ends because of a lack of movement, it can restart at any time by detection of movement of the smart necklace 100.

Figure 15B:
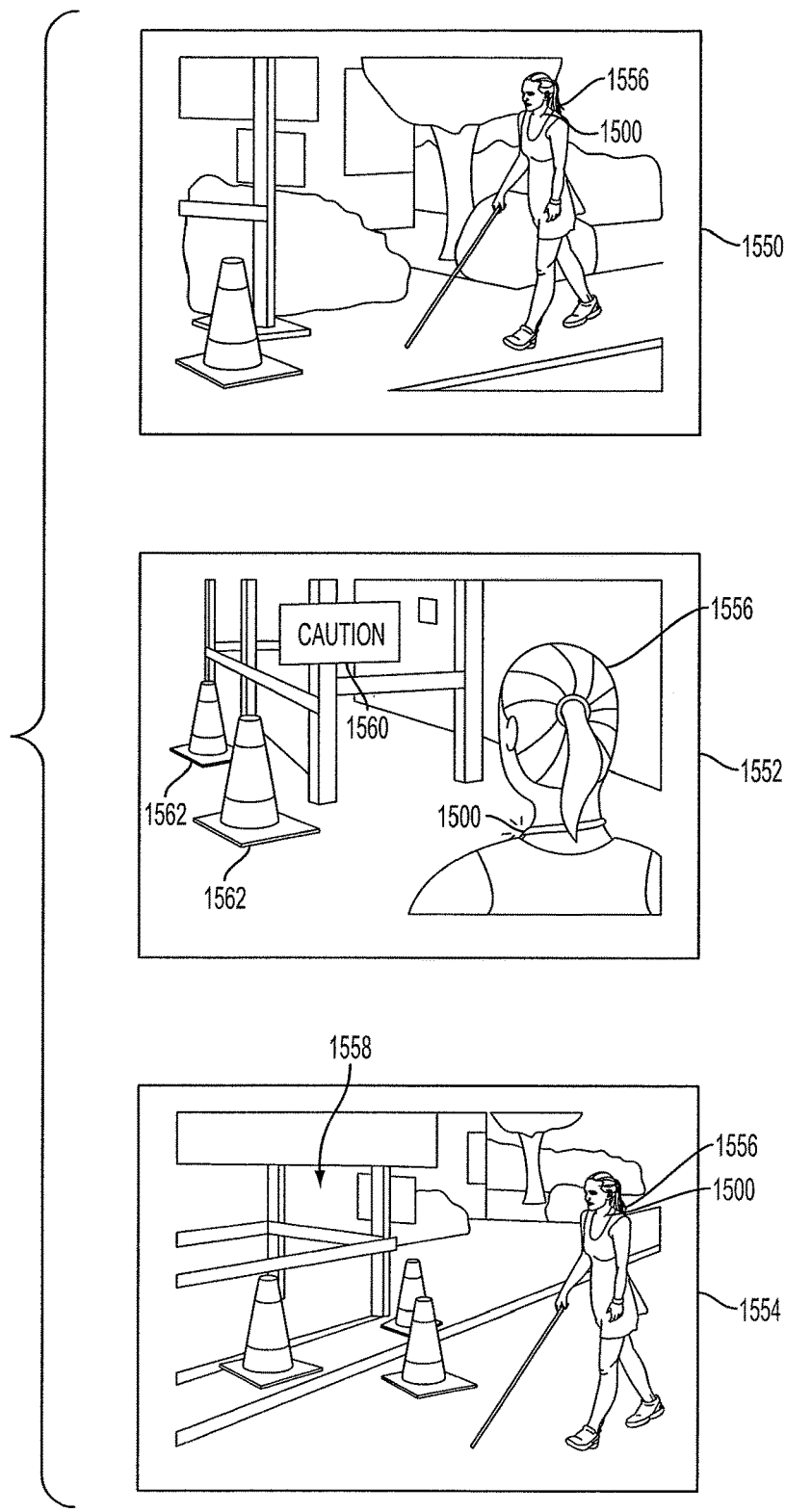
FIG. 15B illustrates an example of the method of FIG. 15A according to an embodiment of the present invention.

FIG. 15B illustrates an example of the method of FIG. 15A. In frame 1550 of FIG. 15B, a user 1556 is walking along a sidewalk. Let's assume that the user has previously walked along the sidewalk and the memory 112 has stored therein data detected by the sensor array 120 during the previous trips along the sidewalk.

In frame 1552, a hazard 1558 is present on the sidewalk in the direction of travel of the user. The hazard includes a caution sign 1560 as well as two caution cones 1562. When the hazard is in the field of view of the smart necklace 100, the smart necklace 100 may compare the detected data to stored data. The processor 111 may then determine that the hazard is a divergence and it may provide data to the user 1556 based on the divergence. The data may include, for example, a description of the two cones 1562, the fact that a sign is present and any other large diversions. The smart necklace 100 may also detect that the diversion includes text. The smart necklace 100 may provide the user 1556 data based on the text, such as reading the text to the user.

The smart necklace 100 may have learned that a caution sign 1560 or a caution cone 1562 presents a hazard, and determine that the caution sign 1560 and/or the caution cone 1562 present a hazard. The smart necklace 100 may also determine this by identifying that the divergence is significant. The smart necklace 100 may use the fact that the caution sign 1560 and/or cones 1562 are positioned in a direction of travel of the user 1556 to determine that they present a hazard. The smart necklace 100 may then provide data to the user 1556 indicating that the hazard 1558 is present. The smart necklace 100 may, for example, output the type and/or location of the hazard 1558 to the user 1556 using the speaker 132. The smart necklace 100 may also, for example, vibrate with increasing frequency as the user approaches the hazard 1558.

For example, in frame 1554, the user may utilize the output from the smart necklace 100 to navigate around the hazard 1558. If the smart necklace 100 includes a vibration unit 133, then the smart necklace 100 may vibrate more on one side than another to indicate the location of the hazard 1558. In frame 1554, the hazard is more to the right side of the user 1556 than the left side. So, the smart necklace 100 may vibrate on the right side and not on the left, indicating that the hazard is on the right. Alternately, the smart necklace 100 may vibrate on the left side and not the right, indicating that it is safer on the left side.

Figure 16A:
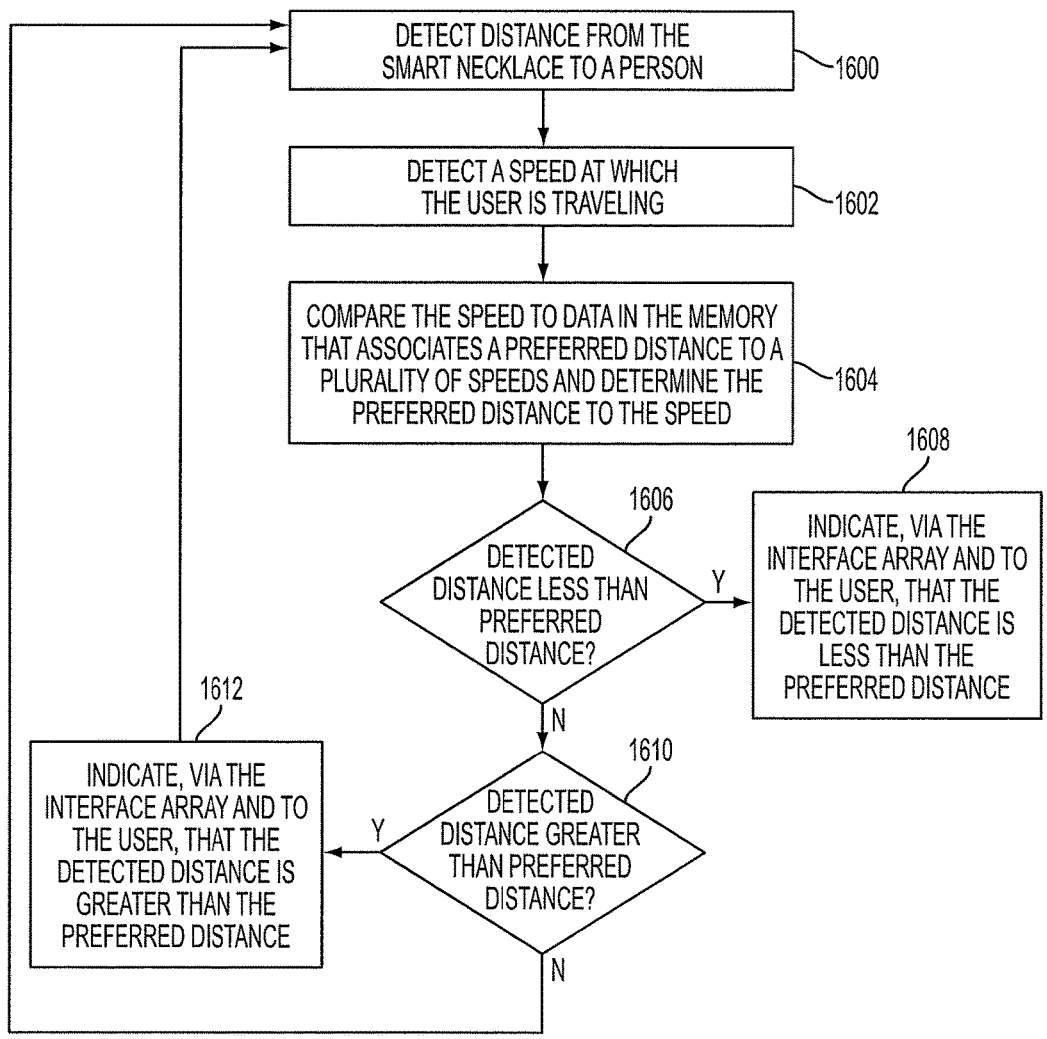
FIG. 16A illustrates an exemplary method for providing navigation assistance to the user of a smart necklace according to an embodiment of the present invention.

FIG. 16A illustrates an exemplary method for providing navigation assistance to the user. This method may be used, for example, to inform a user when he should move forward in line. It may also be used, for example, to inform a user of when he should slow down or speed up based on a another person. This method may also be used, for example, to inform a user of when he should slow down or speed up so that he can walk at the same pace as his friends.

In block 1600, the smart necklace 100, using the sensor array 120, detects a distance from the smart necklace to a moving object, such as a person. The object can be in any relative position to the user so long as it is in the field of view of the camera 122. The smart necklace may also, in some embodiments, determine a speed at which the object is moving.

In block 1602, the smart necklace 100 may determine a speed at which the user is traveling, using the sensor array 120. This speed may include a walking or running speed, or it may be a zero speed. Using the speed data, as well as other data, the processor 111 may determine a set of actions that the user is performing. For example, the user could be walking with friends. He also could be waiting in a line, or walking down the street in a hurry to get to a meeting. The processor may utilize the detected data to determine the action of the user.

In block 1604, the processor 111 compares the speed and other data to data in the memory 112. The data in the memory 112 may, for example, associate speed and other data to a preferred distance of the user to an object. For example, if the user is walking with friends, the preferred distance may be relatively short. As another example, if the user is rushing to a meeting, the preferred distance may be relative long so that the user does not accidentally run into the object.

In block 1606, it is determined whether or not the detected distance is less than the preferred distance. This may be useful, for example, when the user is walking down the street faster than another person, or has prematurely started walking forward when waiting in a line.

If the detected distance is less than the preferred distance, then the method proceeds to block 1608. In block 1608, the smart necklace 100 outputs data to the user, via the interface array 130, indicating that the detected distance is less than the preferred distance. This data may include, for example, audio data or haptic data. For example, the smart necklace 100 may vibrate with increasing frequency as the user approaches the object.

In block 1610, it is determined whether the detected distance is greater than the preferred distance. This may be useful, for example, if the user is walking with friends and is moving at a faster pace.

If the detected distance is greater than the preferred distance, then the process proceeds to block 1612. In block 1612, the smart necklace 100 outputs data to the user, via the interface array 130, indicating that the detected distance is greater than the preferred distance. This data may include, for example, audio data or haptic data. For example, the smart necklace 100 may vibrate with increasing intensity as the distance between the user and the object grows. In some embodiments, there are only certain situations in which the smart necklace 100 will alert the user that the distance is greater than the preferred distance. For example, if the user is walking alone, he will not care if he is far away from other persons and the smart necklace may not provide any data.

Figure 16B:
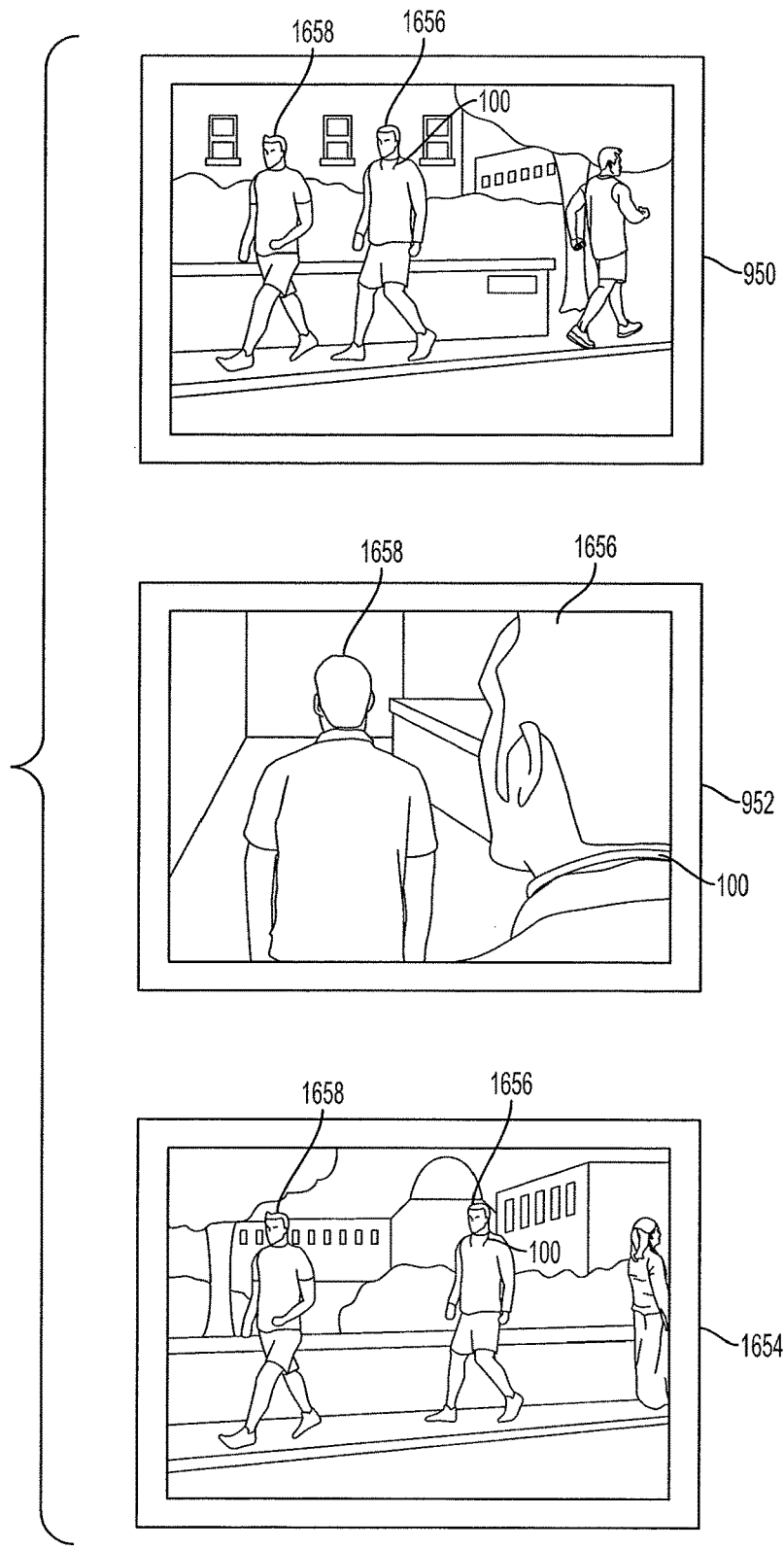
FIG. 16B illustrates an example of the method of FIG. 16A according to an embodiment of the present invention.

FIG. 16B illustrates an exemplary use of the method of FIG. 16A. In frame 1650, the user 1656 is walking down a sidewalk. The user is behind a person 1658. At first, the user 1656 and the person 1658 may be traveling at the same speed. Initially, because of the same speeds, the distance from the user 1656 to the person 958 may be the preferred distance.

As illustrated in frame 952, eventually the person 958 may slow down. In this situation, the detected distance from the user 956 to the person 958 may become less than the preferred distance. The smart necklace 100 may provide data to the user 956 including information that the detected distance is shorter than the preferred distance. The user 956 may then slow down based on the data from the smart necklace 100. By receiving the data from the smart necklace 100, the user 956 may slow until he is at the preferred distance from the person 958, as illustrated in frame 954.

Figure 17:
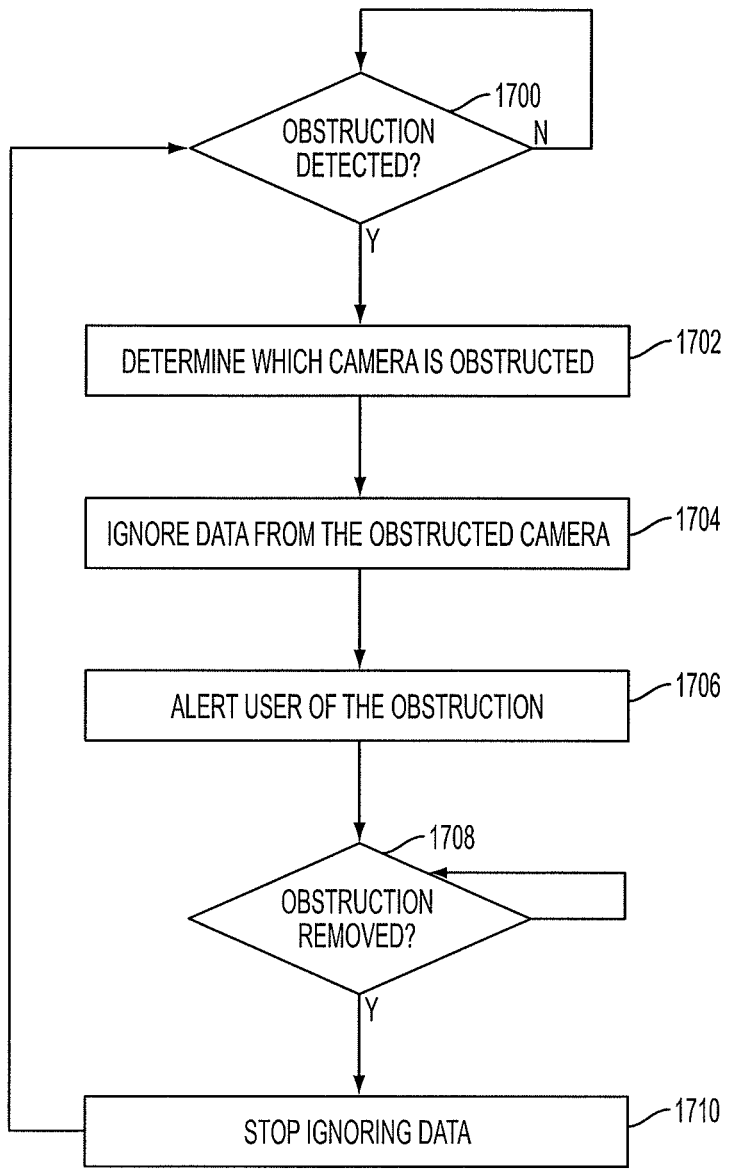
FIG. 17 illustrates an exemplary method for handling an obstructed camera of a smart necklace according to an embodiment of the present invention.

FIG. 17 illustrates an exemplary method for handling an obstruction of a camera 122 (including stereo cameras 121). In reference to FIG. 11, an obstruction can be any occurrence that obstructs the view of either of the stereo cameras 1121 or the camera 1122. For example, a lock of hair or an article of clothing can block the lens of any camera. The smart necklace 1100 can respond to the obstructed camera using the following method.

In block 1700, it is determined whether or not an obstruction is detected. Assuming that the camera 1122 is obstructed, the obstruction may be detected in multiple fashions. Image data from the stereo cameras 1121 may be checked against data from the camera 1122. If the data does not correlate, then the smart necklace 1100 may determine whether the data from the camera 1122 or the stereo cameras 1121 are more likely data that represents the actual information surrounding the user. The camera 1122 may also be adapted to determine the distance to an object. If an object is within a certain range, such as 3 inches, of the camera 1122, then the smart necklace 1100 may determine that an obstruction is occurring. The stereo cameras 1121 may also be able to capture data near the camera 1122 and determine that an object is obstructing the view of the camera 1122.

If an obstruction is not detected, then the method may be placed on hold until an obstruction is detected. If an obstruction is detected, then the smart necklace 1100 may determine, in block 1702, which camera is obstructed. In this example, camera 1122 is obstructed. This determination may be made based on the result of the selected method for determining whether an obstruction has occurred in block 1700.

In block 1704, the smart necklace 1100 ignores data from the obstructed camera (the camera 1122). If the smart necklace 1100 is using data collected from the obstructed camera 1122 as input to functions, then the functions may provide bad output. Because the stereo cameras 1121 are present on the left portion 1151, the smart necklace 1100 can still provide data to the user based on image data captured by the stereo cameras 1121.

In block 1706, the smart necklace 1100 may alert the user of the obstruction. For example, the smart necklace 1100 may provide a spoken alert to the user that the camera 1122 is obstructed. In various embodiments, the smart necklace 1100 may play a specialized tone or vibration instructing the user of the obstruction and/or the location of the obstruction (such as a vibration on the right portion 1152 indicating an obstructed camera on the right portion 1152).

In block 1708, it is determined whether or not the obstruction has been removed. This determination can be made using the same techniques discussed above in reference to block 1700. If the obstruction is not removed, then the method may remain in this state until the obstruction is removed.

If the obstruction is removed, then the smart necklace 1100 may stop ignoring data from the camera 1122 in block 1710.

Figure 18A:
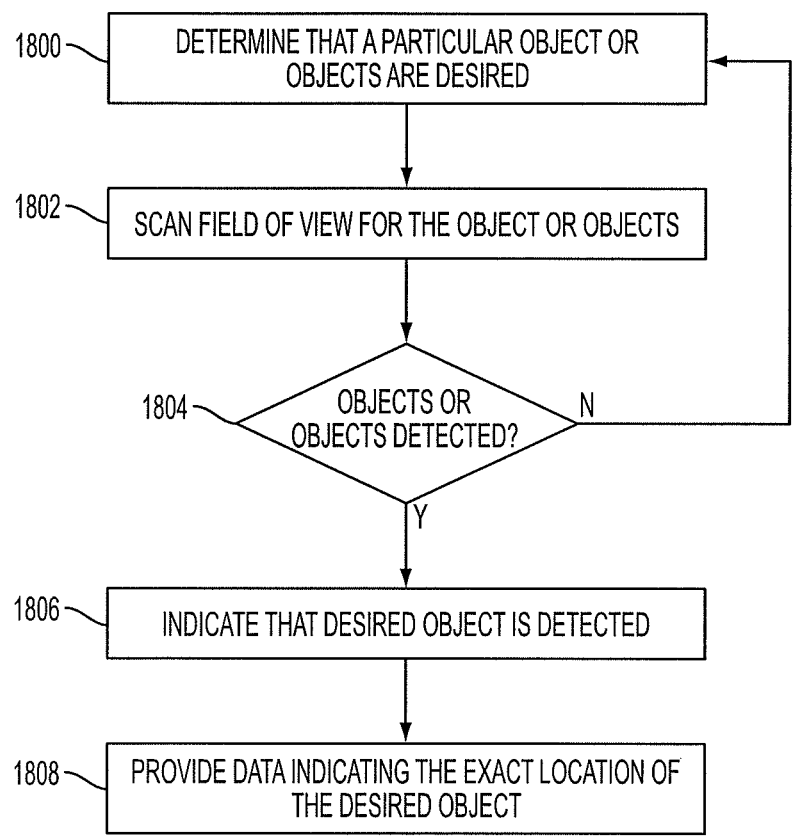
FIG. 18A illustrates an exemplary method for determining the location of a desired object by a smart necklace according to an embodiment of the present invention.

FIG. 18A illustrates an exemplary method for determining the location of a desired object. In block 1800, the smart necklace 100 may determine that a particular object or objects are desired. This may be determined with or without explicit instructions from the user.

For example, the user may be able to click a button while directing the camera 122 at an object to instruct the smart necklace 100 to find the object. The user may also be able to verbally instruct the smart necklace 100 to find the object. For example, the user may direct the camera 122 or the stereo cameras 121 towards an object and say "I want to find this." The camera 122 may then capture image data of the desired object. The smart necklace 100 may detect movement via the IMU 123. A certain movement of the smart necklace 100 may indicate that the user desires to find a particular object. The user may also give a command that includes a description of the object. For example, the user could speak the words "find me a box of X cereal" into the microphone 131. The smart necklace 100 may then be able to recall data from the memory 112 about the object or retrieve data via the antenna 142 or the I/O port 143 about the object. Data associated with the object may be stored in the memory 112 until the smart necklace 100 locates the object.

In block 1802, the smart necklace 100 may scan its field of view 1990 for the object or objects using the camera 122, the stereo cameras 121 or any sensor 125. The smart necklace 100 may continuously scan the field of view 1990 for the object or objects or the smart necklace 100 may be told when to search for the object. For example, the user could make a grocery list at home and scan each of the objects that the user wants to retrieve from the grocery store. It would be a waste of processing power for the smart necklace 100 to scan the field of view 1990 within the user's residence for the object or objects. In this situation, the smart necklace 100 may determine when it is in the grocery store where it is reasonable to scan for the objects.

In block 1804, it is determined whether the object or objects have been detected. The smart necklace 100 may compare the object data in the memory 112 to data sensed by any component in the sensor array 120. If the stored data does not match the sensed data, then the process returns to block 1800. If the object is detected, then the smart necklace 100 may indicate that the desired object is detected. This indication may be in the form of audio output via the speaker 132 or via the vibration unit 133. The smart necklace 100 may, for example, vibrate once when it detects the object. The smart necklace 100 may also output a beep or an audible instruction that the object has been detected.

In block 1808, the clip provides data indicating the exact location of the desired object. For example, the vibration unit 133 may provide vibration or an audio tone with increasing frequency as the user approaches the object. The speaker 132 may also provide precise directions to the user about the location of the object.

Figure 18B:
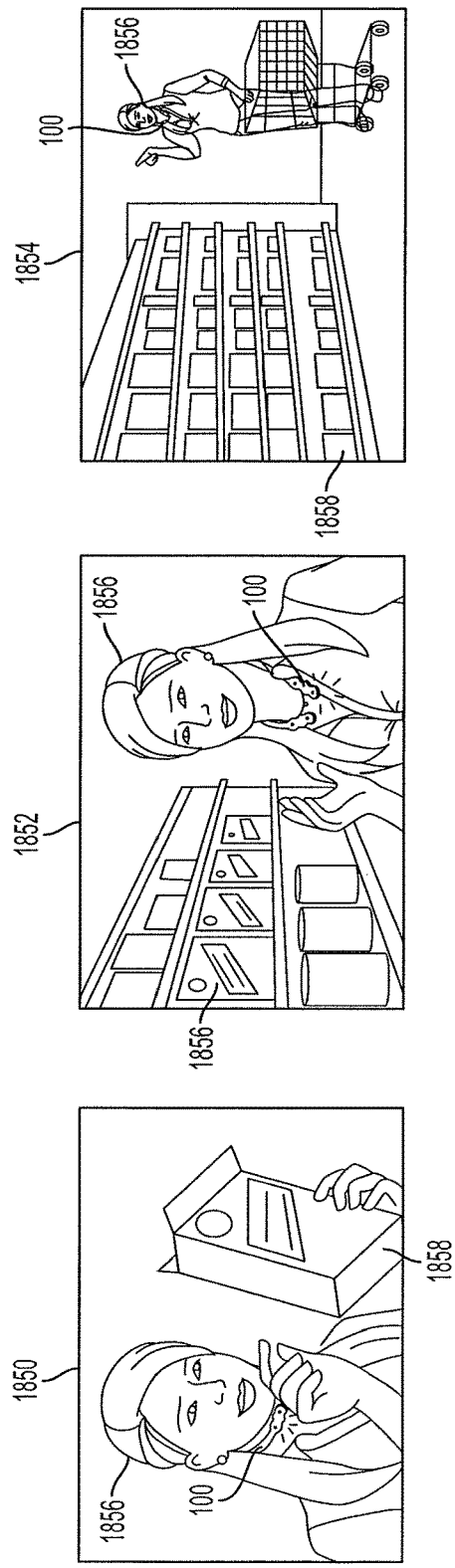
FIG. 18B illustrates an exemplary use of the method of FIG. 18A according to an embodiment of the present invention.

FIG. 18B illustrates an exemplary use of the method of FIG. 18A. In frame 1850, the user 1856 is scanning a box of cereal 1858 with the smart necklace 100. The box of cereal 1858 may be empty, and thus the user 1856 wants to replace the box of cereal 1858. The user 1856 may be using the stereo cameras 121 of the smart necklace 100 to detect data from the box of cereal, such as the name or a barcode of the box of cereal 1858.

In frame 1852, the user 1856 is walking down an aisle in a supermarket. The smart necklace 100 may be scanning the field of view 1990 of the camera 122 and the stereo cameras 121 for the box of cereal 1858. As the smart necklace 100 detects the box of cereal 1858, it indicates this to the user 1856. For example, the smart necklace 100 may provide a beep or a vibration.

In frame 1854, the smart necklace 100 is directing the user 1856 to the precise location of the box of cereal 1858. The smart necklace 100 may provide vibrations or tones of increasing frequency as the user 1856 approaches the box of cereal 1858. The smart necklace 100 can also provide any other type of output to the user 1856 that would direct the user 1856 to the precise location of the box of cereal 1858.

The discussion now turns to advantageous features and process of the present invention for providing output data to a user based on identified characters or images of a document. The smart necklace can perform optical character or image recognition on documents that a blind or low vision person is interested in reading while seated at or standing by a table, desk, counter, or the like. The smart necklace allows the person to keep his/her hands free. The smart necklace allows the person to interact with documents in a very portable manner. The smart necklace provides a portable optical character or image recognition solution that can be worn comfortably while the person reads a document on a table in front of the person. The person does not have to use his/her hands to hold the document. The smart necklace includes a camera that can be automatically directed towards the document in front of the person, scan the document, and perform optical character or image recognition on the document.

Figure 19:
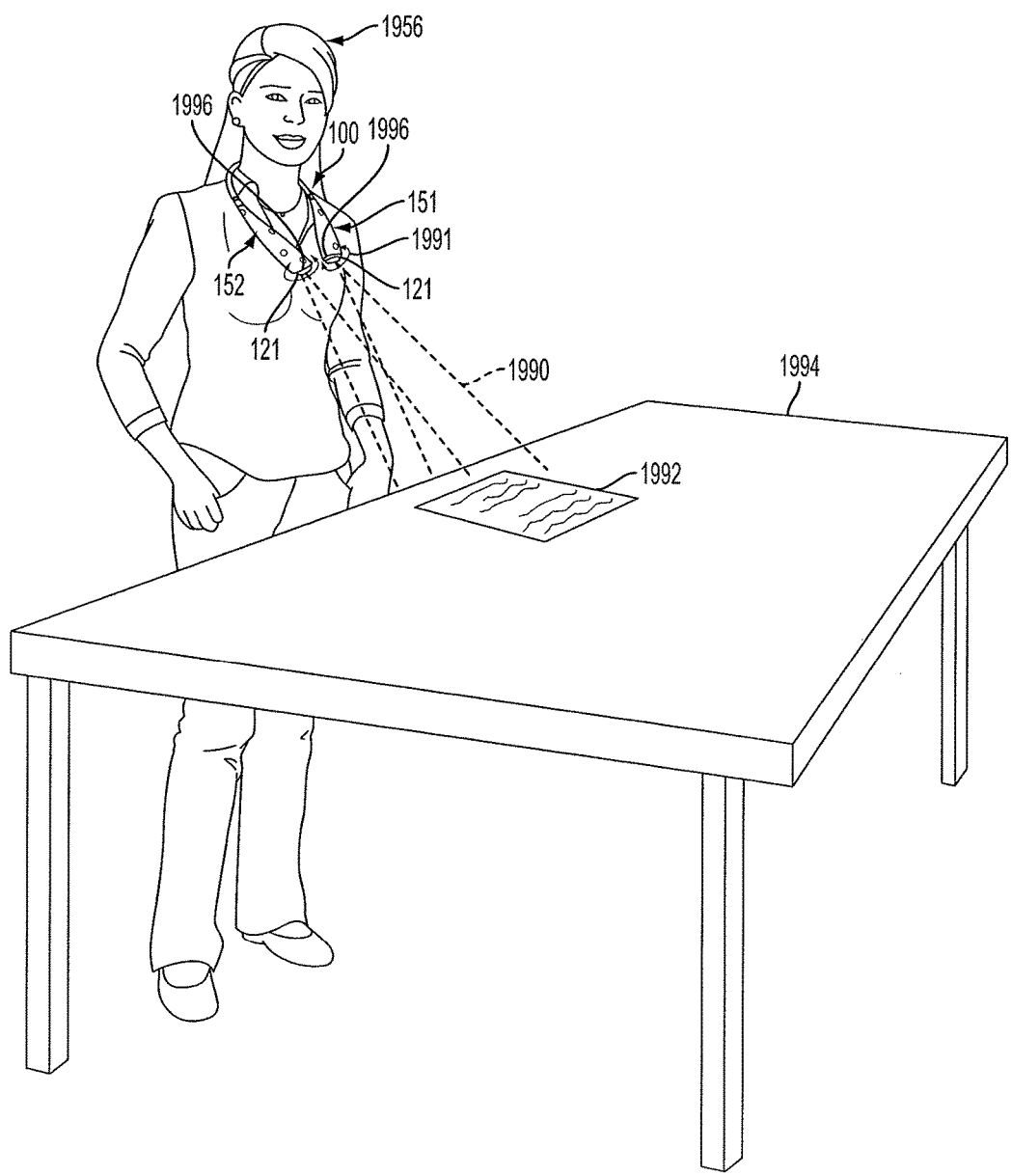
FIG. 19 is a view of a smart necklace used for providing output data to a user based on identified characters or images of a document according to an embodiment of the present invention.

FIG. 19 is a view of a smart necklace 100 used for providing output data to a user 1956 based on identified characters or images of a document 1992. The smart necklace 100 may have any of the features of the smart necklace 100, 500, 600, 700, 800, 900, 1000, and/or 1100 discussed above with respect to FIGS. 1-18B. The user 1956 may press a button of the smart necklace 100 (e.g., button 1034 of FIG. 10 discussed above) to begin learning about a document 1992 and its contents. Alternatively, the user 1956 may utter an audio command to begin the optical character or image recognition process. The audio command can be detected using the microphone 131.

The smart necklace 100 scans or images the document 1992 using image data provided by the stereo cameras 121. "Document" as used herein refers to any book, page, magazine, picture, or the like having characters or images having information that the user 1956 may be interested in. A document may also be a page or an image displayed electronically. That is, images or characters displayed on a tablet computer may be recognized similar to recognizing images or characters of paper documents.

The smart necklace 100 communicates to the user 1956 the contents of the document 1992. The speaker 132 can audibly read the contents of the document 1992 to the user 1956. The smart necklace 100 can also identify where the document 1992 needs to be signed. This feature allows the user 1956 to keep both hands free. That is, one hand can be used to hold the document 1992 in place and the other hand can be used to sign the document 1992.

Figure 20:
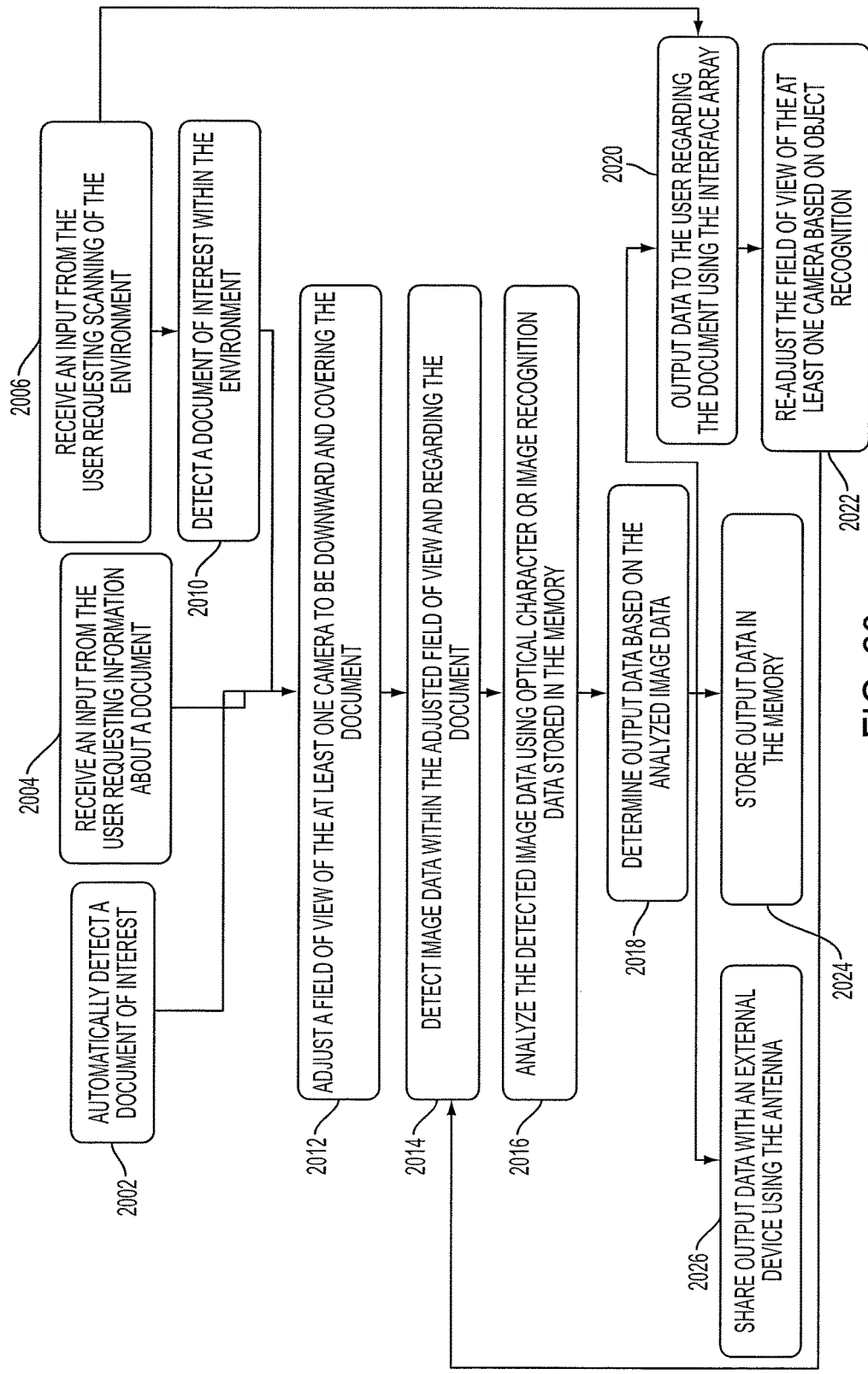
FIG. 20 is a method of operating a smart necklace to provide output data to a user based on identified characters or images of a document according to an embodiment of the present invention.

FIG. 20 is a method of operating the smart necklace 100 to provide output data to the user 1956 based on identified characters or images of a document 1992. In block 2002, the smart necklace 100 automatically detects a document of interest (e.g., document 1992 shown in FIG. 19). Detection of documents and the optical character or image recognition process may be automatically activated depending on data captured using the sensor array 120. This includes image data captured about the surrounding environments and recognized objects therein. Scanning of the environment and the objects therein was discussed above with respect to FIGS. 3A-3C, 6D, and 12-16B. The processor 111 may automatically detect a document of interest, and determine that the user 1956 would like to read the document 1992 or have information about the type of the document 1992. The following example illustrates an application of the foregoing method. If a user 1956 comes home, the processor 111 may recognize the home environment based on GPS location data and previously recorded images corresponding to the home environment. The processor 111 can detect that certain mail documents and envelopes are positioned on the table 1994. The processor 111 would recognize that the user 1956 is sitting down or standing next to the table 1994. As a result, the processor 111 determines that the user 1956 is interested in learning about the mail documents. The processor 111 performs optical character or image recognition on the mail documents, and provides helpful information about the mail documents to the user 1956.

The initial static optical angle of the stereo cameras 121 may or may not be facing downwards initially. When scanning the environment without a focus on documents, the static optical angle of the stereo cameras 121 may be forward-facing. As a result, the processor 111 may not have sufficient image data to recognize the document 1992 and its characters/images. The present invention advantageously adjusts the field of view 1990 of the stereo cameras 121 to accommodate document reading.

In block 2012, the processor 111 adjusts the field of view 1990 of the stereo camera 121 to be downward, thereby covering the document 1992. One or more mechanical rotating devices 1996 may be provided to assist in adjusting the field of view 1990 of the stereo cameras 121. As shown in FIG. 19, a pair of mechanical rotating devices 1996 may be connected to the pair of stereo cameras 121, respectively. The processor 111 is configured to control the mechanical rotating device 1996 to rotate the stereo cameras 121. Exemplary rotation arrows 1991 are shown to illustrate some of the possible directions that the stereo cameras 121 may be turned. As a result of the rotation, the adjusted field of view 1990 faces downward and covers the recognized document 1992. FIG. 19 shows the field of view 1990 after downward adjustment to focus on the document 1992. Prior to the adjustment, the field of view 1990 may have been facing forward to scan the environment.

The mechanical rotating device 1996 may include motors. The processor 111 or a controller connected to the processor 111 can control the mechanical rotating device 1996. The motors can rotate the stereo cameras 121 downward in response to signals received from the processor 111 or the controller. A static friction device may also be utilized to maintain positioning of the stereo cameras 121 after rotation. Alternatively or in addition, a mechanical release device may be utilized for allowing the stereo cameras 121 to switch between different positions for adjusting the field of view 1990. In the mail-reading example discussed above, the processor 111 may rotate the stereo cameras 121 to detect the table 1994 in front of the user 1956. The stereo cameras 121 may then be moved to focus on the mail documents as the user 1956 flips through the mail.

The dynamic field of view 1990 of the stereo cameras 121 advantageously allows identifying a document of interest and providing helpful information about the document to the user 1956. As shown in FIG. 19, the document 1992 can be detected and helpful information can be provided while the user 1956 is standing in front of the table 1994 or standing at the table 1994. This obviates the discomfort of holding the document 1992 in front of the stereo cameras 121. This can be particularly advantageous in applications that are meant to assist users with impaired vision. The user 1956 would need both hands to sign the document 1992. By obviating the need to hold the document 1992, comfort of the user 1956 is enhanced in writing on or signing the document 1992.

Alternatively, the document 1992 may be detected in response to an input received from the user 1956. In block 2004, the smart necklace 100 receives an input from the user 1956, requesting information about surrounding documents. The processor 111 adjusts the field of view 1990, as described above with respect to block 2012.

Alternatively, as shown in block 2006, the document 1992 may be detected in response to an input received from the user 1956. The input may request that the environment be scanned or explored. A scan mode or explorer mode may be selected, as discussed above with respect to FIG. 11. The processor 111 scans the environment and locates the document 1992 on the table 1994.

In block 2010, a document of interest is detected within the environment. The document 1992 can be detected by recognizing the corners of the page and discriminating them from the background (e.g., the table 1994). The document 1992 can be distinguished based on color contrast between the document 1992 and the surrounding objects/environment (e.g., the table 1994). The processor 111 adjusts the field of view 1990, as described above with respect to block 2012.

There may be more than one document in the field of view 1990 of the stereo cameras 121. The processor 111 may select between the documents. The processor may further interact with the user 1956 to select a document, as discussed in further details below with respect to block 2020.

A document-reading mode may also be provided. Upon selection of the mode by the user 1956, the processor 111 provides information to the user 1956 about documents within the field of view 1990 of the stereo cameras 121. A document description may also be provided such that general descriptions of documents are provided. As the user 1956 enters a coffee shop, the output information may distinguish between types of documents, such as advertisement papers versus news magazines.

In block 2014, the processor 111 detects image data within the adjusted field of view 1990 of the stereo camera 121. The image data corresponds to the document 1992 and its characters and images.

In block 2016, the processor 111 is configured to analyze the detected image data using optical character or image recognition software program stored in the memory 112. Characters or images of the document 1992 can be recognized using the optical character or image recognition software program. The recognized image may include a logo or a picture on the document 1992. The characters can be recognized and analyzed in conjunction with another. The processor 111 can infer information that the document 1992 conveys by analyzing the relationship between the recognized characters and/or images. The processor 111 can analyze sentences and paragraphs of the document 1992. The processor 111 can analyze the picture using object recognition as discussed above with respect to FIGS. 3A-3C, 6D, 12, 15A and 15B. The processor 111 may also utilize a translation program to translate text in foreign language to the preferred language of the user 1956.

In block 2018, the processor 111 determines output data based on the analyzed image data. The output data can be based on the information inferred from the recognized characters or images. In block 2020, data is outputted to the user 1956 using the interface array 130. The output data can be provided via an audio output using the speaker 132. For a user with visual impairment, the output information may indicate what documents are there on the table and how close they are if they aligned. The processor 111 may ask the user 1956 via the speaker 132 about type of information that the user 1956 is interested in knowing. The processor 111 may adjust the output information based on user feedback (received, for example, via the microphone 131).

Vibration feedback can also be provided. As discussed above with respect to FIG. 1, the vibration unit 133 may include a left vibration motor in the left portion 151 of the smart necklace 100, and a right vibration motor in the right portion of the smart necklace 100. This advantageously allows various combinations of haptic feedback using a left-side vibration that may differ from a right-side vibration. The vibration output information can be based on the determine output data in block 2018.

When multiple documents are available in the surrounding environment, the processor 111 may interact with the user 1956 and determine which document the user 1956 is interested in reading. The processor 111 may recognize, for example, the first word of a document or a portion of the document that is highlighted (such as a logo). The processor 111 may inform the user 1956 about the types of the documents based on the first word or the logo. If there is a picture on the document, the processor 111 may generate output information descriptive of the picture. This brief general description would allow the user 1956 to decide whether he/she is interested in reading the entire document, or learning more about the document. The user 1956 may provide feedback (e.g., audio feedback or via the buttons) as to which document, if any, the user is interested in reading.

Block 2020 may be interactive and based on feedback provided by the user 1956. Output information would be also based on the user feedback (as shown in block 2006). The processor 111 may ask the user 1956 whether he/she is interested in reading the entire document 1992 or interested in knowing general information about the document 1992. The user 1956 may then provide feedback or via pushing a button of the smart necklace 100 or via the microphone 131.

The processor 111 determines that one or more of the stereo cameras 121 is obstructed. The speaker 132 is configured to output audio information to the user 1956, alerting him/her about the obstruction. This would encourage the user 1956 to remove the obstruction. Alternatively or in addition, the alert is provided to the user 1956 using the vibration unit 133.

In block 2024, the processor 111 may store the output data of block 2018 in the memory 112. The processor 111 may also store the output data in cloud memory. The processor 111 may selectively store information recognized about the documents. The processor 111 may determine that certain information will be useful to the user 1956 in future based on user feedback or based on previously known information about the user 1956. The user 1956 may provide an audio command to the processor 111 via the microphone 131, requesting certain information about the document 1992 to be stored in the memory 112.

Alternatively or in addition, the processor 111 may automatically determine, without a current input from the user 1956, that certain information about the document 1992 will be helpful in future. The following example illustrates an application of the foregoing process. The processor 111 may know that the user 1956 is interested in purchasing a certain type of laptop computer based on prior speech recognition, or based on recognized environmental data about the user 1956. If the document 1992 includes an advertisement for the particular type of laptop, the processor 111 may remind the user 1956 about his/her interest in the laptop. The processor 111 may further store the advertisement information in the memory 112. The processor 111 reminds the user 1956 in future about the advertisement information when the processor 111 determines based on GPS location data that the user 1956 is in proximity of a store offering the particular laptop at the advertised price. This process can be incorporated with the process discussed above with respect to FIG. 12 such that inferred context and interaction key points in block 1224 would be based on previously or currently learned information from detected documents.

In block 2026, the processor 111 may share the output data or learned information about the document 1992 via the antenna 142. The processor 111 may email the information to an email address, as requested by the user 1956. The processor 111 may share the output data with another portable electronic device of the user 1956.

In block 2022, the processor 111 re-adjusts the field of view 1990 of the stereo camera 121 based on object recognition. When a portion of the document 1992 exits the field of view 1990, the field of view 1990 can be adjusted to focus on the document 1992. The processor 111 may detect that the table 1994 is rotated, and adjust the field of view 1990 of the stereo cameras 121 accordingly.

The processor 111 may further provide output information to the user 1956 when the document 1992 cannot be read. If the document 1992 is only partially in view, the processor 111 may output information indicating that the smart necklace 100 can only see part of the document 1992. The processor 111 can ask the user 1956 to realign the document 1992. It may also ask that the user 1956 reposition himself or herself because that would affect the field of view 1990. The processor 111 may minimize burden on user 1956 when the field of view 1990 can be adjusted using mechanical rotation or by focusing on a section of the image data within the field of view 1990, without physical re-positioning of the document 1992 or the user 1956.

In the preferred embodiments discussed above with respect to FIGS. 19 and 20, the smart necklace 100 includes two pairs of stereo cameras 121, which may be positioned on either side of the user's neck. Stereo cameras provide depth information in both indoor and outdoor environments. The stereo cameras 121 may face forward, in front of the user 1956, to establish a field of view 1990. Alternatively, the pair of stereo cameras 121 may be positioned on the left portion 151 or the right portion 152 of the smart necklace 100, for example, as discussed above with respect to FIG. 8.

In the preferred embodiments discussed above with respect to FIGS. 19 and 20, a pair of stereo cameras 121 is utilized in part. They stereo cameras 121 advantageously provide depth information. In addition to or instead of the stereo cameras 121, one or more cameras 122 may be utilized, as discussed above with respect to FIGS. 1-11. The one or more cameras 122 may include an omni-directional camera. The one or more cameras 122 may be wide-angle cameras having at least 120 degrees of field of view 1990. The wide-angle cameras 122 may be utilized in addition to the stereo cameras 121 to increase the field of view 1990 of the smart necklace 100. The cameras 122 may also be placed where needed, such as behind the user's neck to provide data for an area behind the user 1956.

In the embodiments discussed above with respect to FIGS. 19 and 20, the field of view 1990 of the stereo cameras 121 were changed via mechanical rotation. Alternatively, a first camera may be provided that faces forward and a second camera may be provided that faces downwards for document-reading applications. In such a configuration, less adjustment is needed because one camera is always facing downwards. This depends on design concerns such as whether it is power efficient or physically possible to fit an additional camera just for the downward document-reading purpose.

Alternatively, a camera or a set of cameras may be provided with a field of view 1990 that covers forward area and downward area. In this embodiment, mechanical adjustment of the camera may not be needed. Rather, the digital focusing for optical character or image recognition processing can be adjusted.

More particularly, the camera or set of cameras 122 provide video image data covering a broad area. The camera or set of cameras may include an omni-directional camera or a wide-angle camera, as discussed above with respect to FIGS. 1, 5A-6C and 7A-11. Instead of or in addition to mechanical focusing and rotation discussed above, the processor 111 may change the focus of processing. When the document 1992 is underneath the cameras, the downward sub-section of the video image data is processed.

The cameras utilized for the document-reading application discussed in FIGS. 19 and 20 preferably have a non-uniform shape. This allows the user 1956 to feel the stereo cameras 121 and recognize the direction that they are facing. The stereo cameras 121 may be in shape of a cube. The stereo cameras 121 may have raised indents or braille to show direction of the stereo cameras 121 to a blind user. The cameras may be physically adjustable or rotatable to allow the user 1956. This allows the user 1956 to feel the direction of the stereo cameras 121 and manually change its field of view 1990 by his/her fingers.

Figure 21:
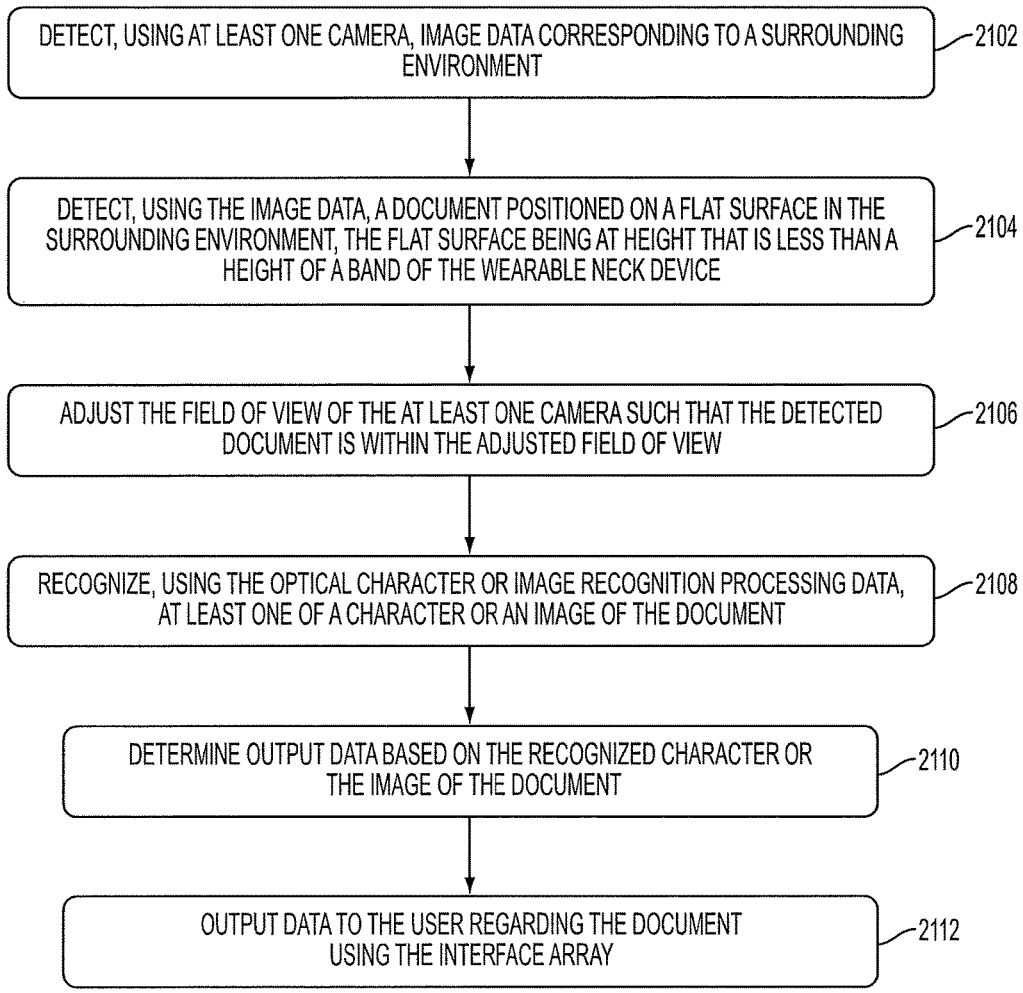
FIG. 21 is a method of operating a smart necklace to provide output data to a user based on identified characters or images of a document according to an embodiment of the present invention.

FIG. 21 is a method of operating the smart necklace 100 to provide output data to the user 1956 based on identified characters or images of a document. In block 2102, the processor 111 detects using at least one camera, image data corresponding to a surrounding environment. The at least one camera may be a pair of stereo cameras 121, for example, as shown in FIG. 19. In addition or alternatively, the at least one camera may include a wide-angle camera and/or an omni-directional camera.

In block 2104, the processor 111 detects a document positioned on a flat surface in the surrounding environment. The document 1992 may be positioned on a table 1994, or any other flat surfaces such as a desk, counter, etc.

In block 2106, the processor 111 adjusts the field of view 1990 of the at least one camera such that the detected document 1992 is within the adjusted field of view 1990, as discussed above with respect to block 2012 of FIG. 20.

In block 2108, the processor 111 recognizes, using the optical character or image recognition processing data, at least one of a character or an image of the document 1992. The image may be a logo having information about general characteristics of the document 1992. The image may be a picture shown on the document 1992.

In block 2110, the processor 111 determines output data based on the recognized at character or the image of the document 1992. In block 2112, the processor 111 outputs data to the user 1956 regarding the document 1992 using the interface array 130, for example, as discussed above with respect to block 2020 of FIG. 20. Information inferred from the combination of the recognized characters and/or images may be communicated to the user 1956 via the speaker 132, the vibration unit 132, and/or the display 135.

The optical character or image recognition processing described above may be performed on-board. Some of the processing may be performed off-board. A wireless connection can be established with another portable electronic device or computer having a second processor using the antenna 142. The processor 111 of the smart necklace 100 and the second processor of the portable electronic device or computer can operate in conjunction with one another to perform the optical character or image recognition processing.

After the optical character or image recognition process is completed, and there is no document of interest for reading, the processor 111 may re-adjust the cameras to be in forward-facing positions. During optical character or image recognition, the stereo cameras 121 may be pointed downwards. The processor 111 recognizes using IMU data that the user 1956 stands up and starts walking. In response to this recognition, the processor 111 re-adjusts the field of view 1990 to be facing forward to focus on the surrounding environment and objects.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device, point of sale device, personal digital assistant (e.g., an Android device, iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by the processor 111, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium, such as the memory 112, is coupled to the processor 111 such that the processor 111 can read information from, and write information to, the storage medium. In the alternative, the storage medium may be integral to the processor 111. The processor 111 and the storage medium may reside in an Application Specific Integrated Circuit (ASIC).

The methods/systems may be described herein in terms of functional block components, screen shots, optional selections and various processing steps. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable neck device for providing optical character or image recognition information to a user, comprising:
   a band having a left portion, a right portion, and a central portion connecting the left portion and the right portion;
   an inertial measurement unit (IMU) that is configured to detect IMU data including a body posture of the user;
   at least one camera connected to the band, having a field of view, and configured to detect image data corresponding to a surrounding environment of the user;
   a memory storing optical character or image recognition processing data corresponding to an algorithm or a set of instructions for identifying characters or images of documents;
   a processor connected to the IMU, the memory and the at least one camera, and configured to:
      determine, using the image data, a location of the user,
      determine, using the IMU data, the body posture of the user,
      detect, using the image data, a plurality of documents in the surrounding environment of the user based on the location of the user,
      determine, using the image data and IMU data, that the plurality of documents are of interest to the user based on the determined location and the determined body posture of the user relative to a location of the plurality of documents in the surrounding environment of the user, and in response:
      recognize a document that is among the plurality of documents that are of interest and in the surrounding environment of the user,
      provide a description of the document that identifies the document to the user,
      receive a user selection of the document that is among the plurality of documents that are of interest and in the surrounding environment of the user in response to providing the description of the document to the user,
      select the document that is among the plurality of documents in the surrounding environment based on the user selection,
      adjust the field of view of the at least one camera such that the document is within the adjusted field of view,
      recognize, using the optical character or image recognition processing data, at least one of a character or an image of the document, and
      determine output data based on the at least one of the character or the image of the document; and
   a speaker configured to provide audio information to the user based on the output data.

2. The wearable neck device of claim 1, wherein the at least one camera includes a first camera connected to the left portion of the band and a second camera connected to the right portion of the band, the first camera and the second camera forming a pair of stereo cameras configured to operate in conjunction with each other to detect the image data.

3. The wearable neck device of claim 1, wherein the at least one camera includes at least one of an omni-directional camera or a wide-angle camera having a field of view of at least 120 degrees.

4. The wearable neck device of claim 3, wherein the processor is configured to adjust the field of view of the at least one camera to be focused on the document by performing optical character or image recognition processing on a portion of the image data that includes the document.

5. The wearable neck device of claim 1, wherein the memory and the processor are positioned within the band.

6. The wearable neck device of claim 1, wherein the processor is further configured to determine whether the at least one camera is obstructed and to control the speaker to output audio alert information to the user for alerting the user that the at least one camera is obstructed in response to determining that the at least one camera is obstructed.

7. The wearable neck device of claim 1, wherein the processor is further configured to re-adjust the field of view of the at least one camera when a portion of the document exits the field of view of the at least one camera.

8. The wearable neck device of claim 1, further comprising a first vibratory motor connected to the left portion of the band and a second vibratory motor coupled to the right portion of the band, the first vibratory motor and the second vibratory motor being configured to provide stereo vibration data based on the output data.

9. The wearable neck device of claim 1, further comprising a mechanical rotating device connected with the at least one camera, wherein the processor is configured to adjust the field of view of the at least one camera to be focused on the document by controlling the mechanical rotating device to rotate the at least one camera in a direction towards the document.

10. The wearable neck device of claim 1, further comprising a wireless communication antenna for establishing a wireless connection with another portable electronic device or computer having a second processor, wherein the processor of the wearable neck device and the second processor of the other portable electronic device or computer are configured to operate in conjunction with each other to analyze the image data based on the optical character or image recognition processing data.

11. The wearable neck device of claim 1, further comprising a microphone coupled to the processor and configured to detect a speech of the user, wherein the processor is further configured to detect the speech in response to input from the user.

12. A method for providing optical character or image recognition information to a user of a wearable neck device having at least one camera with a field of view, the method comprising:
   storing, in a memory, optical character or image recognition processing data corresponding to an algorithm or a set of instructions for identifying characters or images of documents;
   detecting, using the at least one camera, image data corresponding to a surrounding environment of the user;
   detecting, using an inertial measurement unit (IMU), IMU data that includes a body posture of the user;
   determining, using a processor connected to the memory and the at least one camera, a location of the user based on the image data;
   detecting, using the processor connected to the memory and the IMU, a body posture of the user based on the IMU data;
   detecting, using the processor, a plurality of documents in the surrounding environment of the user based on the location of the user;
   determining, using the processor, that the plurality of documents are of interest to the user based on the body posture and the location of the user relative to a location of the plurality of documents in the surrounding environment of the user, and in response:
recognizing, using the processor, a document among the plurality of documents that are of interest and in the surrounding environment of the user;
providing, using the processor, a description of the document to the user;
selecting, using the processor, the document that is among the plurality of documents that are of interest and in the surrounding environment of the user based on a user selection;
adjusting, using the processor, the field of view of the at least one camera such that the document is within the adjusted field of view;
recognizing, using the optical character or image recognition processing data, at least one of a character or an image of the document;
determining, using the processor, output data based on the at least one of the character or the image of the document; and
outputting, using a speaker, audio information to the user based on the output data.

13. The method of claim 12, wherein the at least one camera includes a first camera connected to a left portion of the wearable neck device, and a second camera connected to a right portion of the wearable neck device, the first camera and the second camera forming a pair of stereo cameras configured to operate in conjunction with each other to detect the image data.

14. The method of claim 13, wherein the wearable neck device includes at least one mechanical rotating device connected with the pair of stereo cameras, wherein adjusting, using the processor, the field of view of the at least one camera includes controlling the at least one mechanical rotating device to rotate the pair of stereo cameras in a direction towards the document.

15. The method of claim 13, further comprising re-adjusting, using the processor, the field of view of the pair of stereo cameras when a portion of the document exits the field of view.

16. The method of claim 13, further comprising:
providing, using a vibratory motor, vibration feedback to the user based on the output data.

17. A neck worn device for assisting a user having visual impairment, comprising:
a housing having a left end, a right end and a center portion positioned between the left end and the right end;
an inertial measurement unit (IMU) that is configured to detect IMU data including a body posture of the user;
a left side camera mounted proximal to the left end and configured to detect image data;
a right side camera mounted proximal to the right end and configured to detect image data, the left side camera and the right side camera forming a pair of stereo cameras;
a memory coupled to the housing and configured to store an optical character recognition software program;
a processor positioned within the housing and coupled to the IMU, the left side camera, the right side camera and the memory and configured to:
determine, using the image data detected by the right side and the left side cameras, a location of the user,
determine, using the IMU data, the body posture of the user,
detect a plurality of documents in a surrounding environment of the neck worn device based on the location of the user,
determine, using the image data detected by the right side and the left side cameras and the IMU data, that the plurality of documents are of interest to the user based on the body posture of the user and the location of the user relative to a location of the plurality of documents in the surrounding environment, and in response:
recognize a document that is among the plurality of documents that are of interest and in the surrounding environment,
provide a description of the document that identifies the document to the user,
receive a user selection of the document that is among the plurality of documents that are of interest and in the surrounding environment,
select the document that is among the plurality of documents in the environment based on user selection,
adjust a field of view of at least one of the left side camera or the right side camera such that the document is within the field of view,
identify characters on the document using the optical character recognition software program, and
generate a feedback signal based on the identified characters; and
a speaker configured to provide audio information based on the feedback signal.

18. The neck worn device of claim 17 further comprising a wireless communication antenna configured to establish data communications with another portable electronic device or computer.

19. The neck worn device of claim 17 further comprising a mechanical rotating device connected with the at least one of the left side camera or the right side camera, wherein the processor is configured to control the mechanical rotating device to rotate the at least one of the left side camera or the right side camera to adjust the field of view of the at least one of the left side camera or the right side camera to be focused towards the document.

20. The neck worn device of claim 17 wherein the processor is configured to re-adjust the field of view of the at least one of the left side camera or the right side camera when a portion of the document exits the field of view.

* * * * *